(12) United States Patent
Li et al.

(10) Patent No.: US 10,567,754 B2
(45) Date of Patent: Feb. 18, 2020

(54) HASH TABLE CONSTRUCTION AND AVAILABILITY CHECKING FOR HASH-BASED BLOCK MATCHING

(71) Applicant: Microsoft Technology Licensing, LLC, Redmond, WA (US)

(72) Inventors: Bin Li, Beijing (CN); Jizheng Xu, Beijing (CN); Feng Wu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 379 days.

(21) Appl. No.: 15/029,589

(22) PCT Filed: Mar. 4, 2014

(86) PCT No.: PCT/CN2014/072827
§ 371 (c)(1),
(2) Date: Apr. 14, 2016

(87) PCT Pub. No.: WO2015/131325
PCT Pub. Date: Sep. 11, 2015

(65) Prior Publication Data
US 2016/0277733 A1    Sep. 22, 2016

(51) Int. Cl.
*H04N 19/11*    (2014.01)
*H04N 19/14*    (2014.01)
(Continued)

(52) U.S. Cl.
CPC ......... *H04N 19/105* (2014.11); *H04N 19/176* (2014.11); *H04N 19/593* (2014.11); *H04N 19/91* (2014.11); *H04N 19/96* (2014.11)

(58) Field of Classification Search
CPC .... H04N 19/593; H04N 19/136; H04N 19/46; H04N 19/176; H04N 19/105;
(Continued)

(56) References Cited

U.S. PATENT DOCUMENTS 2,239,538 A * 4/1941 Richter ................. G02B 13/02
                                                     359/748
2,718,173 A * 9/1955 Hacman ................ G02B 13/00
                                                     359/740
(Continued)

FOREIGN PATENT DOCUMENTS

CN    1857001    11/2006
CN    1874487    12/2006
(Continued)

OTHER PUBLICATIONS

ITU-T, "Series H: Audiovisual and Multimedia Systems Infrastructure of audiovisual services—Coding of moving video—High efficiency video coding" (Apr. 2013) (Year: 2013).*

(Continued)

*Primary Examiner* — Philip P. Dang
(74) *Attorney, Agent, or Firm* — Klarquist Sparkman, LLP

(57) ABSTRACT

Innovations in the areas of hash table construction and availability checking reduce computational complexity of hash-based block matching. For example, some of the innovations speed up the process of constructing a hash table or reduce the size of a hash table. This can speed up and reduce memory usage for hash-based block matching within a picture (for block vector estimation) or between different pictures (for motion estimation). Other innovations relate to availability checking during block vector estimation that uses a hash table.

20 Claims, 22 Drawing Sheets

(51) Int. Cl.
*H04N 19/105* (2014.01)
*H04N 19/593* (2014.01)
*H04N 19/176* (2014.01)
*H04N 19/91* (2014.01)
*H04N 19/96* (2014.01)

(58) Field of Classification Search
CPC ...... H04N 19/70; H04N 19/97; H04N 1/4486; H04N 1/4466; H04N 19/44
See application file for complete search history.

(56) References Cited

U.S. PATENT DOCUMENTS

| | | | | |
|---|---|---|---|---|
| 3,059,528 A * | 10/1962 | Allan | | G03B 37/02 348/37 |
| 3,142,236 A * | 7/1964 | Siegmund | | G02B 17/08 359/727 |
| 3,642,351 A * | 2/1972 | Tronnier | | G02B 9/34 359/757 |
| 4,918,583 A * | 4/1990 | Kudo | | G02B 3/005 359/619 |
| 5,016,980 A * | 5/1991 | Waldron | | G02B 3/005 359/833 |
| 5,565,921 A | 10/1996 | Sasaki et al. | | |
| 5,610,841 A | 3/1997 | Tanaka et al. | | |
| 5,613,004 A * | 3/1997 | Cooperman | | G06T 1/0021 380/28 |
| 5,687,236 A * | 11/1997 | Moskowitz | | G06T 1/0021 380/28 |
| 5,689,365 A * | 11/1997 | Takahashi | | A61B 1/00179 359/362 |
| 5,774,271 A * | 6/1998 | Lagerway | | F21L 14/00 359/649 |
| 5,850,312 A * | 12/1998 | Kato | | G02B 15/167 359/689 |
| 6,332,092 B1 * | 12/2001 | Deckert | | G02B 23/2461 600/476 |
| 6,487,440 B2 * | 11/2002 | Deckert | | G02B 23/2407 600/476 |
| 6,618,197 B1 * | 9/2003 | Hayakawa | | G02B 9/60 359/557 |
| 6,879,266 B1 | 4/2005 | Dye et al. | | |
| 6,894,289 B2 * | 5/2005 | Nilson | | A01K 1/031 250/458.1 |
| 6,904,110 B2 * | 6/2005 | Trans | | H04B 1/00 375/229 |
| 6,915,387 B1 * | 7/2005 | Huffman | | G06F 12/0822 711/119 |
| 6,938,128 B1 * | 8/2005 | Kuskin | | G06F 12/0817 711/119 |
| 6,983,020 B2 * | 1/2006 | Christiansen | | G06T 9/004 375/240.16 |
| 6,995,918 B2 * | 2/2006 | Terasawa | | G02B 13/143 359/649 |
| 7,046,460 B2 * | 5/2006 | Nozawa | | G02B 9/12 359/716 |
| 7,206,346 B2 | 4/2007 | Shimizu et al. | | |
| 7,216,232 B1 * | 5/2007 | Cox | | G06T 1/0021 713/176 |
| 7,239,454 B2 * | 7/2007 | Kobayashi | | G02B 5/005 355/71 |
| 7,325,141 B2 | 1/2008 | Chow et al. | | |
| 7,328,153 B2 | 2/2008 | Wells et al. | | |
| 7,349,583 B2 | 3/2008 | Kumar et al. | | |
| 7,379,499 B2 | 5/2008 | Dahlhoff et al. | | |
| 7,400,774 B2 | 7/2008 | Puri et al. | | |
| 7,421,128 B2 | 9/2008 | Venkatesan et al. | | |
| 7,430,670 B1 * | 9/2008 | Horning | | G06F 21/14 713/190 |
| 7,466,418 B2 * | 12/2008 | Nilson | | A01K 1/031 250/458.1 |
| 7,606,974 B2 * | 10/2009 | Dai | | G06F 8/4442 711/118 |
| 7,609,763 B2 | 10/2009 | Mukerjee et al. | | |
| 7,613,364 B2 | 11/2009 | Kang et al. | | |
| 7,636,824 B1 | 12/2009 | Tormasov | | |
| 7,672,005 B1 | 3/2010 | Hobbs et al. | | |
| 7,702,127 B2 * | 4/2010 | Mihcak | | G06T 1/0028 382/100 |
| 7,706,682 B2 * | 4/2010 | Keller | | G03B 13/08 348/341 |
| 7,733,497 B2 * | 6/2010 | Yun | | A61B 5/0059 356/497 |
| 7,747,584 B1 * | 6/2010 | Jernigan, IV | | G06F 16/1748 707/692 |
| 7,761,712 B2 * | 7/2010 | Moskowitz | | G06T 1/0021 713/176 |
| 7,868,792 B2 | 1/2011 | Artan et al. | | |
| 7,870,393 B2 * | 1/2011 | Moskowitz | | G06T 1/0021 713/176 |
| 7,873,786 B1 | 1/2011 | Singh et al. | | |
| 7,912,244 B2 * | 3/2011 | Mihcak | | G06T 1/0028 382/100 |
| 7,949,186 B2 * | 5/2011 | Grauman | | G06K 9/4671 382/159 |
| 7,986,844 B2 | 7/2011 | Diamant et al. | | |
| 8,003,186 B2 * | 8/2011 | Ishizaki | | C03B 11/08 351/159.01 |
| 8,005,142 B2 | 8/2011 | Kim et al. | | |
| 8,041,677 B2 * | 10/2011 | Sumner | | G06F 11/1453 707/640 |
| 8,086,052 B2 * | 12/2011 | Toth | | H04N 19/52 382/232 |
| 8,099,415 B2 * | 1/2012 | Luo | | G06F 16/258 707/736 |
| 8,099,601 B2 * | 1/2012 | Serret-Avila | | G06T 1/0071 713/170 |
| 8,107,527 B1 | 1/2012 | Hobbs et al. | | |
| 8,126,282 B2 * | 2/2012 | Jung | | H04N 19/433 382/233 |
| 8,197,397 B2 * | 6/2012 | Rovegno | | A61B 1/00193 600/111 |
| 8,213,503 B2 | 7/2012 | Tu et al. | | |
| 8,213,515 B2 | 7/2012 | Kudana et al. | | |
| 8,264,489 B2 | 9/2012 | Saint-Hilaire et al. | | |
| 8,284,484 B2 * | 10/2012 | Hoult | | G02B 21/0028 359/385 |
| 8,295,617 B2 | 10/2012 | Collins | | |
| 8,320,683 B2 * | 11/2012 | Konishi | | G06K 9/00442 382/209 |
| 8,335,255 B2 * | 12/2012 | Lee | | H04N 19/51 375/240.16 |
| 8,355,437 B2 | 1/2013 | Hannuksela | | |
| 8,411,750 B2 | 4/2013 | Dane | | |
| 8,417,039 B2 | 4/2013 | Albu et al. | | |
| 8,442,942 B2 | 5/2013 | Leppard | | |
| 8,515,123 B2 * | 8/2013 | Thorwirth | | G06T 1/0092 382/100 |
| 8,619,857 B2 | 12/2013 | Zhao et al. | | |
| 8,644,620 B1 | 2/2014 | Lam | | |
| 8,681,870 B2 | 3/2014 | Takada | | |
| 8,787,460 B1 | 7/2014 | Hobbs | | |
| 8,897,512 B1 | 11/2014 | Bozinovic et al. | | |
| 9,167,020 B2 | 10/2015 | Abdo et al. | | |
| 9,223,534 B1 | 12/2015 | Eilam | | |
| 9,225,979 B1 | 12/2015 | Jia et al. | | |
| 9,235,313 B1 | 1/2016 | Wu et al. | | |
| 9,277,237 B2 | 3/2016 | Abiezzi et al. | | |
| 9,286,862 B2 | 3/2016 | Peacock | | |
| 9,332,270 B2 | 5/2016 | Ju | | |
| 2001/0001614 A1 | 5/2001 | Boice et al. | | |
| 2002/0041629 A1 | 4/2002 | Hannuksela | | |
| 2002/0118755 A1 * | 8/2002 | Karczewicz | | H04N 21/23424 375/240.16 |
| 2003/0179206 A1 | 9/2003 | Emereson et al. | | |
| 2003/0179951 A1 | 9/2003 | Christiansen | | |
| 2003/0187587 A1 | 10/2003 | Swindells et al. | | |
| 2004/0131014 A1 * | 7/2004 | Thompson, III | | H04H 60/06 370/230 |
| 2004/0133548 A1 | 7/2004 | Fielding et al. | | |

(56) References Cited

U.S. PATENT DOCUMENTS

| | | |
|---|---|---|
| 2004/0174570 A1 | 9/2004 | Plunkett et al. |
| 2004/0223549 A1* | 11/2004 | Karczewicz ..... H04N 21/23424 375/240.16 |
| 2005/0060643 A1 | 3/2005 | Glass et al. |
| 2005/0166040 A1* | 7/2005 | Walmsley ............ B41J 2/04505 713/150 |
| 2006/0062303 A1 | 3/2006 | Xu |
| 2006/0132931 A1* | 6/2006 | Epple ..................... G02B 17/08 359/726 |
| 2006/0153295 A1* | 7/2006 | Wang ................... H04N 19/159 375/240.08 |
| 2006/0224594 A1* | 10/2006 | Goyal ................. G06F 16/2308 |
| 2007/0025442 A1 | 2/2007 | Okada et al. |
| 2007/0036226 A1 | 2/2007 | Kim et al. |
| 2007/0041066 A1* | 2/2007 | Yasuda .................... G03H 1/04 359/9 |
| 2007/0053662 A1 | 3/2007 | Tobita et al. |
| 2007/0086526 A1 | 4/2007 | Koto et al. |
| 2007/0116110 A1 | 5/2007 | Diamant et al. |
| 2007/0199011 A1 | 8/2007 | Zhang et al. |
| 2007/0217702 A1 | 9/2007 | Sung |
| 2008/0104652 A1 | 5/2008 | Swenson et al. |
| 2008/0212687 A1 | 9/2008 | Liu |
| 2009/0022374 A1 | 1/2009 | Boult |
| 2009/0115909 A1 | 5/2009 | Walls et al. |
| 2009/0129466 A1* | 5/2009 | Cho ..................... H04N 19/176 375/240.03 |
| 2009/0244299 A1 | 10/2009 | Fukunishi |
| 2010/0057750 A1 | 3/2010 | Aasted et al. |
| 2010/0119170 A1 | 5/2010 | Sengamedu et al. |
| 2010/0166073 A1 | 7/2010 | Schmit et al. |
| 2010/0177893 A1 | 7/2010 | Jeon et al. |
| 2010/0268836 A1* | 10/2010 | Jabri ...................... H04L 47/38 709/231 |
| 2010/0284460 A1 | 11/2010 | Tsai et al. |
| 2010/0284471 A1 | 11/2010 | Tsai et al. |
| 2010/0293248 A1 | 11/2010 | Kamay et al. |
| 2011/0007801 A1 | 1/2011 | Andersson et al. |
| 2011/0010396 A1* | 1/2011 | Zhou ................... G06F 16/9024 707/798 |
| 2011/0044551 A1* | 2/2011 | Lee ..................... H04N 19/105 382/238 |
| 2011/0051809 A1 | 3/2011 | Lee |
| 2011/0128810 A1* | 6/2011 | Sato ........................ G06F 9/345 365/230.06 |
| 2011/0179341 A1 | 7/2011 | Falls et al. |
| 2011/0225114 A1* | 9/2011 | Gotthardt ............ G06F 21/6245 706/50 |
| 2011/0243234 A1* | 10/2011 | Kondo ................... H04N 19/61 375/240.16 |
| 2011/0293013 A1* | 12/2011 | Ma ......................... H04N 19/51 375/240.16 |
| 2011/0299785 A1 | 12/2011 | Albu et al. |
| 2011/0311042 A1* | 12/2011 | Cheddad ............... G06F 21/602 380/28 |
| 2012/0057631 A1 | 3/2012 | Le Leannec |
| 2012/0128064 A1 | 5/2012 | Sato |
| 2012/0170653 A1* | 7/2012 | Panusopone ......... H04N 19/197 375/240.16 |
| 2012/0213282 A1 | 8/2012 | Choi et al. |
| 2012/0245688 A1* | 9/2012 | Vanaclocha Vanaclocha .............. A61F 2/4425 623/17.16 |
| 2012/0294523 A1 | 11/2012 | Abdo et al. |
| 2013/0013618 A1* | 1/2013 | Heller ................... G06F 16/174 707/747 |
| 2013/0022113 A1 | 1/2013 | Chen et al. |
| 2013/0034158 A1 | 2/2013 | Kirchhoffer et al. |
| 2013/0034159 A1 | 2/2013 | Siekmann et al. |
| 2013/0036289 A1* | 2/2013 | Welnicki ................ G06F 3/0608 711/173 |
| 2013/0057646 A1 | 3/2013 | Chen et al. |
| 2013/0057666 A1* | 3/2013 | Fujii ..................... G02B 13/16 348/65 |
| 2013/0067344 A1 | 3/2013 | Ungureanu et al. |
| 2013/0078592 A1* | 3/2013 | McCarthy ................ A61C 7/08 433/3 |
| 2013/0084018 A1 | 4/2013 | Nystad |
| 2013/0114704 A1 | 5/2013 | Chen et al. |
| 2013/0142447 A1 | 6/2013 | Park et al. |
| 2013/0147974 A1 | 6/2013 | Ju et al. |
| 2013/0148721 A1* | 6/2013 | Chen ..................... G09G 5/001 375/240.12 |
| 2013/0176560 A1* | 7/2013 | Wax ...................... G01N 21/49 356/300 |
| 2013/0208810 A1 | 8/2013 | Shen et al. |
| 2013/0243089 A1* | 9/2013 | Lim ..................... H04N 19/176 375/240.12 |
| 2013/0258052 A1 | 10/2013 | Li et al. |
| 2013/0266073 A1* | 10/2013 | MacInnis ................. H04N 7/56 375/240.24 |
| 2013/0266078 A1* | 10/2013 | Deligiannis .......... H04N 19/159 375/240.25 |
| 2013/0268621 A1* | 10/2013 | Mese ................... H04N 19/176 709/217 |
| 2013/0271565 A1* | 10/2013 | Chen ..................... H04N 19/597 348/43 |
| 2013/0272394 A1* | 10/2013 | Brockmann .............. G06T 9/00 375/240.12 |
| 2013/0279564 A1* | 10/2013 | Wang ..................... H04N 19/70 19/70 |
| 2013/0279577 A1 | 10/2013 | Schwarz et al. |
| 2013/0279806 A1 | 10/2013 | Tonisson et al. |
| 2013/0335527 A1 | 12/2013 | Takahashi et al. |
| 2014/0002603 A1 | 1/2014 | Takahashi et al. |
| 2014/0003506 A1 | 1/2014 | Wang et al. |
| 2014/0010294 A1* | 1/2014 | Ye ......................... H04N 19/70 375/240.12 |
| 2014/0016698 A1 | 1/2014 | Joshi et al. |
| 2014/0029668 A1 | 1/2014 | Lim et al. |
| 2014/0050413 A1 | 2/2014 | Sato |
| 2014/0064360 A1 | 3/2014 | Rapaka et al. |
| 2014/0092994 A1* | 4/2014 | Wang ..................... H04N 19/70 375/240.26 |
| 2014/0321553 A1 | 10/2014 | Clark |
| 2014/0369413 A1 | 12/2014 | Clark |
| 2014/0369421 A1 | 12/2014 | Zhu et al. |
| 2015/0054946 A1 | 2/2015 | Zhang |
| 2015/0063451 A1 | 3/2015 | Zhu et al. |
| 2015/0092840 A1 | 4/2015 | Mochizuki et al. |
| 2016/0234530 A1 | 8/2016 | Xu et al. |
| 2016/0241876 A1 | 8/2016 | Xu et al. |
| 2016/0269732 A1 | 9/2016 | Li et al. |
| 2016/0277733 A1 | 9/2016 | Li et al. |
| 2016/0277761 A1 | 9/2016 | Li et al. |
| 2017/0163999 A1 | 6/2017 | Li et al. |
| 2017/0302936 A1 | 10/2017 | Li et al. |
| 2018/0063540 A1 | 3/2018 | Zhu et al. |
| 2018/0152699 A1 | 5/2018 | Kumar et al. |

FOREIGN PATENT DOCUMENTS

| | | |
|---|---|---|
| CN | 1874519 | 12/2006 |
| CN | 101283578 | 10/2008 |
| CN | 101710324 | 5/2010 |
| CN | 101866366 | 10/2010 |
| CN | 102576411 | 7/2012 |
| CN | 103281538 | 9/2013 |
| CN | 103430549 | 12/2013 |
| CN | 103841426 | 6/2014 |
| CN | 104574440 | 4/2015 |
| EP | 1349395 | 10/2003 |
| EP | 2996360 | 3/2016 |
| GB | 2375673 | 11/2002 |
| GB | 2460844 | 12/2009 |
| JP | H11-66301 | 3/1999 |
| JP | 2005-522083 | 7/2005 |
| JP | 2010-508734 | 3/2010 |
| JP | 2013-058873 | 3/2013 |
| RU | 2298226 | 4/2007 |

(56) References Cited

FOREIGN PATENT DOCUMENTS

| WO | WO 00/60874 | 10/2000 |
|---|---|---|
| WO | WO 02/093934 | 11/2002 |
| WO | WO 2010/085899 | 8/2010 |
| WO | WO 2010/086548 | 8/2010 |
| WO | WO 2011/103206 | 8/2011 |
| WO | WO 2011/153005 | 12/2011 |
| WO | WO 2013/068433 | 5/2013 |
| WO | WO 2013/072484 | 5/2013 |
| WO | WO 2013/103376 | 7/2013 |
| WO | WO 2013/159038 | 10/2013 |
| WO | WO 2015/131325 | 9/2015 |
| WO | WO 2015/139165 | 9/2015 |
| WO | WO 2016/018422 | 2/2016 |

OTHER PUBLICATIONS

Gaikar, "Techinline Remote Desktop Software: Access Your Computers Remotely," *Tricks Machine*, 6 pp. (Jan. 2012).
International Preliminary Report on Patentability dated Sep. 15, 2016, from International Patent Application No. PCT/CN2014/072827, 6 pp.
Praveen et al., "Analysis and Approximation of SAO Estimation for CTU-Level HEVC Encoder," *Proc. of Visual Communications and Image Processing*, 5 pp. (Nov. 2013).
Rane, "Hash-Aided Motion Estimation and Rate Control for Distributed Video Coding," EE392J Project Report, 10 pp. (Dec. 2004).
Sangi et al., "Global Motion Estimation Using Block Matching with Uncertainty Analysis," *Signal Processing Conference*, pp. 1823-1827 (Sep. 2007).
Sun et al., "Motion-Embedded Residual Error for Packet Loss Recovery of Video Transmission and Encryption," *Visual Communications and Image Processing*, vol. 6077, 14 pp. (Jan. 2006).
Wu et al., "Linear Hashtable Method Predicted Hexagonal Search Algorithm with Spatial Related Criterion," *Lecture Notes in Computer Science*, pp. 1208-1217 (Jun. 2005).
Zhu et al., "2-D Dictionary Based Video Coding for Screen Contents," *Data Compression Conf.*, pp. 43-52 (Mar. 2014).
Zhu et al., "Screen content coding using 2-D dictionary mode," JCTVC-O0355, 4 pp. (Oct. 2013).
Ascenso et al., "Adaptive Hash-Based Side Information Exploitation for Efficient Wyner-Ziv Video Coding," *IEEE Int'l Conf. on Image Processing*, 4 pp. (Sep. 2007).
Bankoski et al., "VP8 Data Format and Decoding Guide," RFC 6386, 304 pp. (Nov. 2011).
Flynn et al., "High Efficiency Video Coding (HEVC) Range Extensions text specification: Draft 4," JCTVC-N1005, 322 pp. (Apr. 2013).
Flynn et al., "High Efficiency Video Coding (HEVC) Range Extensions text specification: Draft 6," JCTVC-P1005_v1, 355 pp. (Jan. 2014).
International Search Report and Written Opinion dated Dec. 10, 2014, from International Patent Application No. PCT/CN2014/072827, 12 pp.
ISO/IEC 11172-2, "Information technology—Coding of moving pictures and associated audio for digital storage media at up to about 1,5 Mbit/s—Part 2: Video," 122 pp. (Aug. 1993).
ISO/IEC 14496-2, "Information Technology—Coding of Audio-Visual Objects: Visual," ISO/IEC JTC1/SC29/WG11 N2202, 327 pp. (Mar. 1998).
ITU-T Recommendation H.261, "Video Codec for Audiovisual Services at px64 kbits," 29 pp. (Mar. 1993).
ITU-T Recommendation H.262, "Generic Coding of Moving Pictures and Associated Audio Information: Video," 218 pp. (Jul. 1995).
ITU-T Recommendation H.263, "Video coding for low bit rate communication," 167 pp. (Feb. 1998).
ITU-T Recommendation H.264, "Advanced video coding for generic audiovisual services," 680 pp. (Jan. 2012).
ITU-T Recommendation H.265, "High efficiency video coding," 317 pp. (Apr. 2013).
Kwon et al., "AHG5: Fast encoding using early skipping of Intra block copy (IntraBC) search," JCTVC-O0245, 9 pp. (Oct. 2013).
Li et al., "Description of screen content coding technology proposal by Microsoft," JCTVC-Q0035, 27 pp. (Mar. 2014).
Li et al., "Hash-based intraBC search," JCTVC-Q0252, 2 pp. (Mar. 2014).
Li et al., "Hash-based motion search," JCTVC-Q0245, 5 pp. (Mar. 2014).
Li et al., "Low complexity encoders for JCTVC-Q0035," JCTVC-Q0052, 4 pp. (Mar. 2014).
Robert et al., "Improving Intra mode coding in H.264/AVC through block oriented transforms," *IEEE 8th Workshop on Multimedia Signal Processing*, 5 pp. (Oct. 2006).
Shah et al., "HD Resolution Intra Prediction Architecture for H.264 Decoder," *IEEE Int'l Conf. on VLSI Design*, pp. 107-112 (Jan. 2012).
SMPTE Standard, "VC-1 Compressed Video Bitstream Format and Decoding Process," SMPTE 421M-2006, 493 pp. (Feb. 2006).
Yang et al., "MyFinder: Near-Duplicate Detection for Large Image Collections," *ACM Int'l Conf. on Multimedia*, pp. 1013-1014 (Oct. 2009).
Zhu et al., "Screen content coding using 2-D dictionary mode," JCTVC-O0357, 4 pp. (Oct. 2013).
Brasnett et al., "Comments & Results on MPEG-7 Image Signature," MPEG2008/M15863, 4 pp. (Oct. 2008).
Chen et al., "Description of Screen Content Coding Technology Proposal by Qualcomm," JCTVC-Q0031, 18 pp. (Mar. 2014).
Chum et al., "Scalable Near Identical Image and Shot Detection", In Proceedings of International Conference on Image and Video Retrieval, Jul. 9, 2007, pp. 549-556.
Communication pursuant to Article 94(3) EPC dated Aug. 25, 2016, from European Patent Application No. 13895864.0, 7 pp.
Communication pursuant to Article 94(3) EPC dated Feb. 8, 2017, from European Patent Application No. 14884278.4, 5 pp.
Communication pursuant to Article 94(3) dated Jul. 6, 2017, from European Patent Application No. 14895767.3, 8 pp.
Communication pursuant to Article 94(3) dated Jun. 14, 2017, from European Patent Application No. 14885049.8, 7 pp.
Communication pursuant to Article 94(3) EPC dated Apr. 5, 2017, from European Patent Application No. 13895864.0, 4, pp.
Communication pursuant to Article 94(3) EPC dated Jan. 10, 2018, from European Patent Application No. 13895864.0, 4 pp.
Communication pursuant to Article 94(3) EPC dated Mar. 15, 2018, from European Patent Application No. 14895767.3, 5 pp.
Communication pursuant to Article 94(3) EPC dated Apr. 4, 2018, from European Patent Application No. 13896175.0, 6 pp.
Communication pursuant to Article 94(3) EPC dated May 24, 2018, from European Patent Application No. 13895864.0, 5 pp.
Communication pursuant to Rule 164(1) EPC dated Feb. 16, 2017, from European Patent Application No. 14885049.8, 7 pp.
Communication pursuant to Article 94(3) EPC dated Feb. 16, 2018, from European Patent Application No. 14903205.4, 11 pp.
Extended European Search Report dated Aug. 21, 2018, from European Patent Application No. 18176302.0, 5 pp.
Examination Report dated Sep. 29, 2016, from European Patent Application No. 13896175.0, 8 pp.
Final Office Action dated Apr. 6, 2018, from U.S. Appl. No. 15/024,812, 123 pp.
Final Office Action dated Apr. 9, 2018, from U.S. Appl. No. 15/321,536, 58 pp.
First Office Action and Search Report dated Jul. 19, 2018, from Chinese Patent Application No. 201480071892.2, 10 pp.
Gargi et al., "Performance Characterization of Video-Shot-Change Detection Methods", In IEEE Transactions on Circuits and Systems for Video Technology, vol. 10, Issue 1, Feb. 1, 2000, 13 Pages.
International Preliminary Report on Patentability dated May 6, 2016, from International Patent Application No. PCT/CN2013/085939, 6 pp.
International Preliminary Report on Patentability dated May 6, 2016, from International Patent Application No. PCT/CN2013/085937, 7 pp.

(56) References Cited

OTHER PUBLICATIONS

International Preliminary Report on Patentability dated Sep. 15, 2016, from International Patent Application No. PCT/CN2014/072834, 6 pp.
International Preliminary Report on Patentability dated Jan. 5, 2017, from International Patent Application No. PCT/CN2014/080481, 7 pp.
International Preliminary Report on Patentability dated Apr. 13, 2017, from International Patent Application No. PCT/CN2014/087869, 6 pp.
International Search Report and Written Opinion dated Jun. 10, 2014, from International Patent Application No. PCT/CN2013/085937, 12 pp.
International Search Report and Written Opinion dated Jul. 30, 2014, from International Patent Application No. PCT/CN2013/085939, 12 pp.
International Search Report and Written Opinion dated Dec. 3, 2014, from International Patent Application No. PCT/CN2014/072834, 13 pp.
International Search Report and Written Opinion dated Mar. 2, 2015, from International Patent Application No. PCT/CN2014/080481, 13 pp.
International Search Report and Written Opinion dated Jul. 1, 2015, from International Patent Application No. PCT/CN2014/087869, 12 pp.
International Search Report and Written Opinion dated May 3, 2018, from International Patent Application No. PCT/US2017/063164, 30 pp.
International Search Report and Written Opinion dated Jan. 24, 2018, from International Patent Application No. PCT/US2017/057066, 12 pp.
Invitation pursuant to Article 94(3) and Rule 71(1) EPC dated May 31, 2017, from European Patent Application No. 14884278.4, 4 pp.
Invitation pursuant to Article 94(3) and Rule 71(1) EPC dated Oct. 26, 2017, from European Patent Application No. 14885049.8, 5 pp.
Li et al., "A Unified Framework of Hash-based Matching for Screen Content Coding," *IEEE VCIP*, pp. 530-533 (Dec. 2014).
Li et al., "Adaptive Motion Vector Resolution for Screen Content," JCTVC-R0106 r1, ITU-T SG16 WP 3 and ISO/IEC JTC1/SC29/WG11, 18th Meeting, 16 pp. (Jun. 2014).
Li et al., "An HEVC-Based Screen Content Coding Scheme," JCTVC ITU-T SG16 WP3 and ISO/IEC JTC1/SC29/WG11 17th Meeting, 13 pp. (Mar. 27, 2014).
Li et al., "Improvement for hash based inter search," JCTVC-S0089, 4 pp. (Oct. 2014).
Li et al., "RDPCM operation unification and cleanup," JCTVC-O0185, pp. 1-6 (Oct. 2013).
Li et al., "Screen content coding using dictionary based mode," JCTVC-P0214 r1, 5 pp. (Jan. 2014).
Liu et al., "Motion Feature and Hadamard Coefficient-Based Fast Multiple Reference Frame Motion Estimation for H.264," *IEEE Trans. on Circuits and Systems for Video Technology*, vol. 18, No. 5, pp. 620-632 (May 2008).
Monga et al, "Perceptual Image Hashing Via Feature Points: Performance Evaluation and Tradeoffs," *IEEE Transactions Image Processing*, pp. 3452-3465 (Nov. 2006).
Notice on Grant of Patent dated Jun. 5, 2018, from Chinese Patent Application No. 201380080482.X, 4 pp.
Notice on the First Office Action dated Jun. 2, 2017, from Chinese Patent Application No. 201380080482.X, 13 pp.
Notice on the First Office Action dated Jan. 17, 2018, from Chinese Patent Application No. 201480030627.X, 13 pp.
Notice on the First Office Action dated Feb. 5, 2018, from Chinese Patent Application No. 201480029780.0, 14 pp.
Notice on the First Office Action dated Mar. 20, 2018, from Chinese Patent Application No. 201380080483.4, 12 pp.
Notice on the First Office Action dated May 3, 2018, from Chinese Patent Application No. 201480048046.9, 12 pp.
Notice on the Second Office Action dated Jan. 4, 2018, from Chinese Patent Application No. 201380080482.X, 7 pp.
Notice on the Second Office Action dated Sep. 29, 2018, from Chinese Patent Application No. 201480030627.X, 13 pp.
Notice on the Second Office Action dated Oct. 29, 2018, from Chinese Patent Application No. 201480029780.0, 11 pp.
Office Action dated May 1, 2018, from U.S. Appl. No. 15/253,568, 7 pp.
Office Action dated Aug. 27, 2018, from U.S. Appl. No. 15/365,927, 22 pp.
Office action dated Jul. 12, 2018, from Russian Patent Application No. 2017110461, 7 pp.
Office action dated Jun. 26, 2018, from Japanese Patent Application No. 2017-517045, 7 pp.
Office Action dated Oct. 4, 2017, from U.S. Appl. No. 15/024,812, 75 pp.
Office Action dated Oct. 1, 2018, from U.S. Appl. No. 15/024,816, 59 pp.
Office Action dated Oct. 9, 2018, from U.S. Appl. No. 15/321,536, 65 pp.
Pauleve et al., "Locality sensitive hashing: A comparison of hash function types and querying mechanisms," *Pattern Recognition Letters*, vol. 31, No. 11, pp. 1348-1358 (Aug. 2010).
Rapaka et al., "Improved Intra Block Copy and Motion Search Methods for Screen Content Coding," *Visual Communications and Image Procsesing*, vol. 9599, pp. (Sep. 2015).
Ribas-Corbera et al., "Optimizing Motion-Vector Accuracy in Block-Based Video Coding," *IEEE Trans. on Circuits and Systems for Video Technology*, vol. 11, No. 4, pp. 497-511 (Apr. 2001).
Riguer et al., "Real-Time Depth of Field Simulation," *ShaderX2: Shader Programming Tips and Tricks with DirectX 9*, pp. 1-30 (Jan. 2003).
Search Report dated Sep. 27, 2018, from European Patent Application No. 18176304.6, 8 pp.
Supplementary European Search Report dated Jul. 5, 2016, from European Patent Application No. 13895864.0, 4 pp.
Supplementary European Search Report dated Sep. 14, 2016, from European Patent Application No. 13896175.0, 6 pp.
Supplementary European Search Report dated Jan. 31, 2017, from European Patent Application No. 14884278.4, 4 pp.
Supplementary European Search Report dated May 18, 2017, from European Patent Application No. 14885049.8, 6 pp.
Supplementary European Search Report dated Jun. 14, 2017, from European Patent Application No. 14895767.3, 5 pp.
Supplementary Partial European Search Report dated Sep. 27, 2017, from European Patent Application No. 14903205.4, 14 pp.
Supplementary European Search Report dated Jan. 29, 2018, from European Patent Application No. 14903205.4, 9 pp.
Tagliasacchi et al., "Hash-Based Motion Modeling in Wyner-Ziv Video Coding," *IEEE Int'l Conf. on Acoustics, Speech, and Signal Processing*, 4 pp. (Apr. 2007).
Wei et al., "An Efficient Intra-Mode Selection Algorithm for H.264 Based on Edge Classification and Rate-Distortion Estimation," *Signal Processing: Image Communication* vol. 23, No. 9, pp. 699-710, Oct. 1, 2008 (retrieved Aug. 22, 2008).
Wikipedia, "Locality-sensitive Hashing" 6 pp. (document marked: "last modified on Apr. 18, 2013").
Wikipedia, "Locality-sensitive Hashing" 7 pp. (document marked: "last edited on Feb. 6, 2018").
Yu et al., "New Intra Prediction using Intra-Macroblock Motion Compensation," JVT-C151, 10 pp. (May 2002).
Zhou et al., "Motion Vector Resolution Control for Screen Content Coding," JCTVC-P0277, 6 pp. (Jan. 2014).
Notice of Allowance dated Oct. 23, 2018, from U.S. Appl. No. 15/253,568, 8 pp.
Notice on Second Office Action dated Nov. 29, 2018, from Chinese Patent Application No. 201380080483.4, 6 pp.
Notice on Second Office Action dated Jan. 23, 2019, from Chinese Patent Application No. 201480048046.9, 6 pp.
Office Action dated Sep. 28, 2017, from U.S. Appl. No. 15/024,816, 45 pp.
Office Action dated Oct. 2, 2017, from U.S. Appl. No. 15/024,816, 44 pp.
Office Action dated Oct. 13, 2017, from U.S. Appl. No. 15/321,536, 52 pp.

(56) References Cited

OTHER PUBLICATIONS

Office Action dated Oct. 19, 2018, from U.S. Appl. No. 15/029,585, 49 pp.
Office Action dated Nov. 6, 2017, from U.S. Appl. No. 15/029,585, 51 pp.
Communication under Rule 71(3) EPC dated Feb. 22, 2019, from European Patent Application No. 14895767.3, 5 pp.
Decision to Grant dated Jul. 4, 2019, from European Patent Application No. 14895767.3, 2 pp.
Examination Report No. 1 dated Mar. 14, 2019, from Australian Patent Application No. 2014408223, 4 pp.
Final Office Action dated Apr. 16, 2019, from U.S. Appl. No. 15/024,816, 73 pp.
Final Office Action dated May 10, 2019, from U.S. Appl. No. 15/321,536, 63 pp.
Notice on Grant of Patent dated Apr. 4, 2019, from Chinese Patent Application No. 201480048046.9, 4 pp.
Notice on Grant of Patent dated Apr. 18, 2019, from Chinese Patent Application No. 201480029780.0, 4 pp.
Notice on Grant of Patent dated May 14, 2019, from Chinese Patent Application No. 201380080483.4, 4 pp.
Notice on Grant of Patent dated May 29, 2019, from Chinese Patent Application No. 201480030627.X, 4 pp.
Notice on the Third Office Action dated Mar. 13, 2019, from Chinese Patent Application No. 201480030627.X, 6 pp.
Office Action dated Jun. 28, 2019, from U.S. Appl. No. 15/508,067, 18 pp.
Communication under Rule 71(3) EPC dated Jul. 12, 2019, from European Patent Application No. 13896175.0, 7 pp.
Examination Report No. 2 dated Jun. 3, 2019, from Australian Patent Application No. 2014408223, 3 pp.

\* cited by examiner software 180 implementing one or more innovations
for hash table construction and/or availability
checking for hash-based block matching

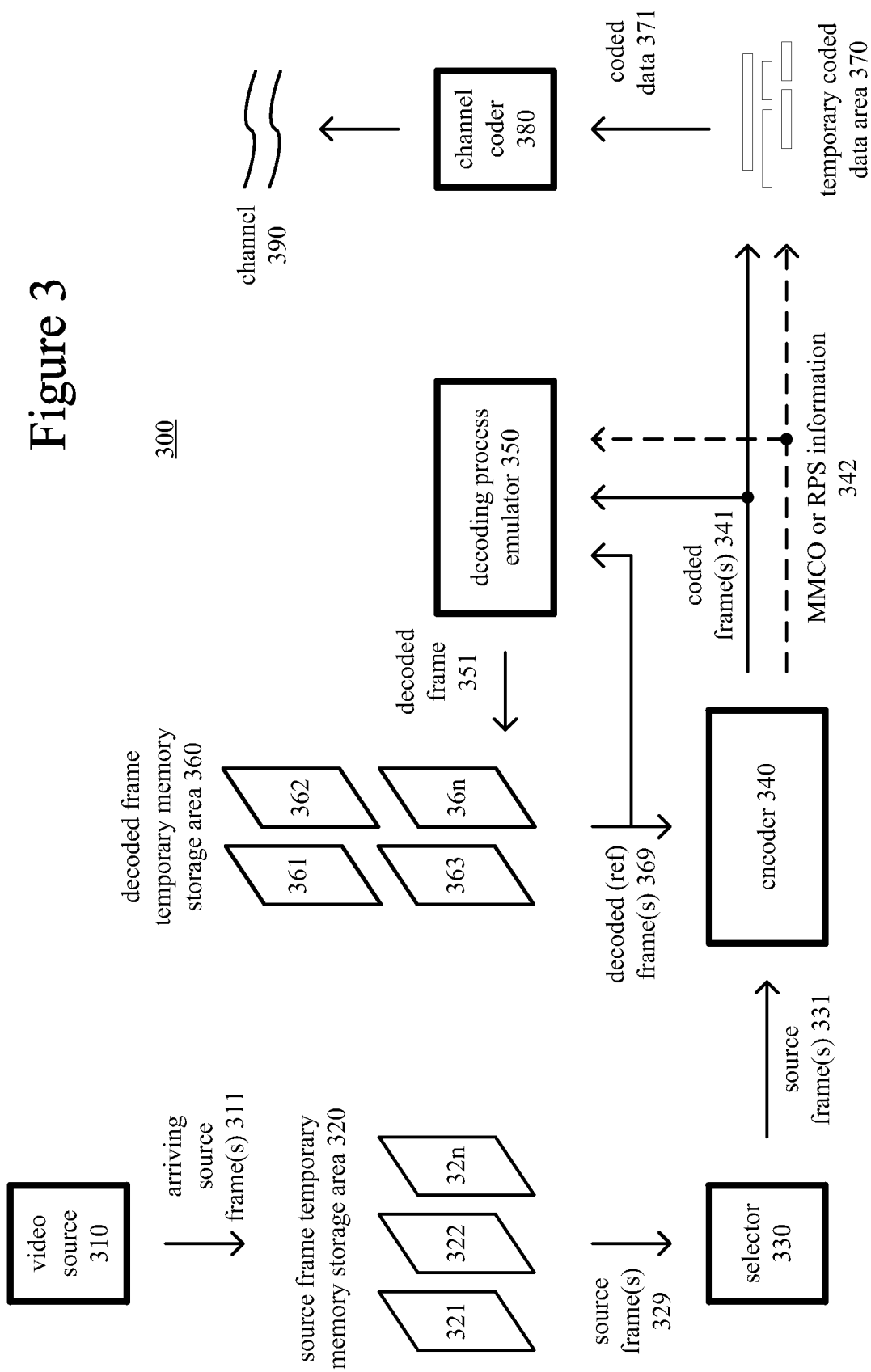

500

600

700 block vector (940) for current block (930) of current frame (910), indicating a displacement to a reference region (950) in the current frame (910)

block vectors (1041, 1042, 1043, 1044) indicating displacements to candidate blocks for current block (1030) of current frame (1010)

Figure 11        1100
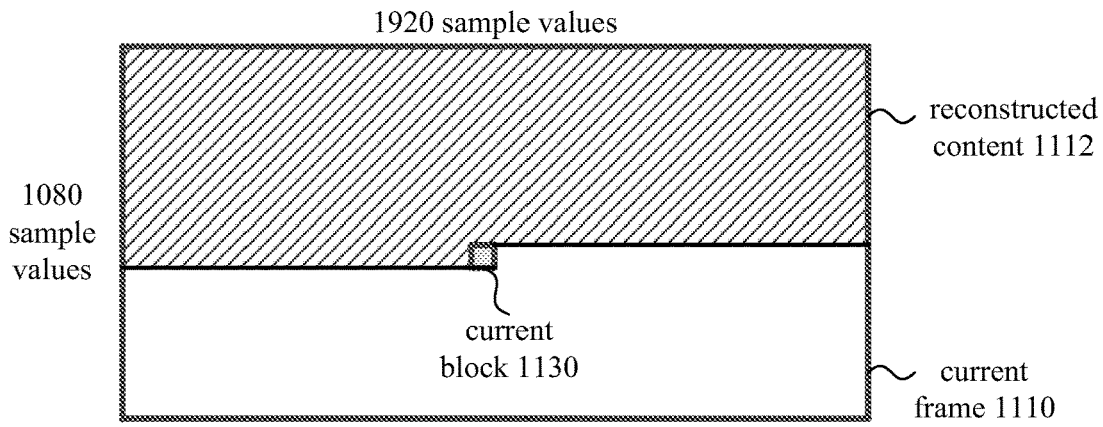
number of candidate 64x64 blocks for block vector estimation
for current 64x64 block at position (896, 576):
(576 − 64 + 1) x (1920 − 64 + 1) + (896 − 64 + 1) x 64 = 1,005,953
Figure 12     1200                    $h(B_{current}) = h_3$
$h_0$ :  $B(1266, 263), B(1357, 365), B(1429, 401), B(502, 464), \ldots$
$h_1$ :  $B(1704, 154), B(1709, 177), B(1158, 242)$
$h_2$ :  $B(1321, 49), B(145, 182), B(599, 490), B(1668, 511), \ldots$
$h_3$ :  $B(569, 73), B(1293, 102), B(401, 290), B(455, 306), \ldots$
$h_4$ :  $B(1119, 46)$
$h_5$ :  $B(1381, 11), B(1676, 53), B(38, 119), B(1633, 184), \ldots$
$h_6$ :  $B(979, 85), B(1013, 177), B(575, 470), B(900, 477), \ldots$
.
.
.
$h_{n-1}$ :  $B(794, 14), B(1479, 17), B(19, 317), B(1338, 374), \ldots$

Figure 13a     1300

$h_0$ :   entry(0, 0), entry(0, 1), entry(0, 2), entry(0, 3), . . .

$h_1$ :   entry(1, 0), entry(1, 1), entry(1, 2), entry(1, 3), . . .

$h_2$ :

$h_3$ :   entry(3, 0), entry(3, 1), entry(3, 2), entry(3, 3)

$h_4$ :   entry(4, 0), entry(4, 1), entry(4, 2), entry(4, 3), . . .

$h_5$ :   entry(5, 0), entry(5, 1), entry(5, 2), entry(5, 3), . . .

$h_6$ :   entry(6, 0), entry(6, 1)

.
.
.

$h_{n-1}$ :   entry(n-1, 0), entry(n-1, 1), entry(n-1, 2), entry(n-1, 3), . . .

Figure 13b     1310

*entry($h_i$, k)* :   address of *B*

Figure 13c     1320

*entry($h_i$, k)* :   address of *B* and hash value *h'(B)* from $2^{nd}$ hash function *h'()*

Figure 14a   1400    $h(B_{current}) = h_2$ $h_0$ :   $h'_0$ list, $h'_1$ list, $h'_2$ list, $h'_3$ list, . . .

$h_1$ :   $h'_0$ list, $h'_1$ list, $h'_2$ list, $h'_3$ list, . . .

$h_2$ :   $h'_0$ list, $h'_1$ list, $h'_2$ list, $h'_3$ list, . . .

$h_3$ :   $h'_0$ list, $h'_1$ list, $h'_2$ list, $h'_3$ list, . . .

.
.
.

$h_{n1-1}$ :   $h'_0$ list, $h'_1$ list, $h'_2$ list, $h'_3$ list, . . .

Figure 14b   1410    $h'(B_{current}) = h'_0$ $h'_0$ :   entry(0, 0), entry(0, 1), entry(0, 2), entry(0, 3), . . .

$h'_1$ :   entry(1, 0), entry(1, 1), entry(1, 2), entry(1, 3), . . .

$h'_2$ :

$h'_3$ :   entry(3, 0), entry(3, 1), entry(3, 2), entry(3, 3)

.
.
.

$h'_{n2-1}$ :   entry(n2-1, 0), entry(n2-1, 1), entry(n2-1, 2), . . .

Figure 14c   1420 entry($h'_i$, k) :   address of $B$ block (2100) with uniform sample values block (2110) whose rows each have uniform sample values block (2120) whose columns each have uniform sample values Figure 23                        2300
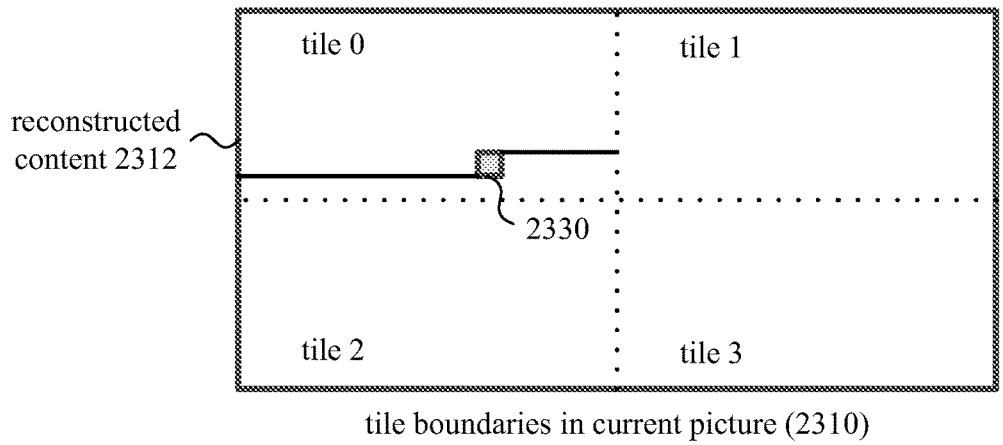
tile boundaries in current picture (2310)
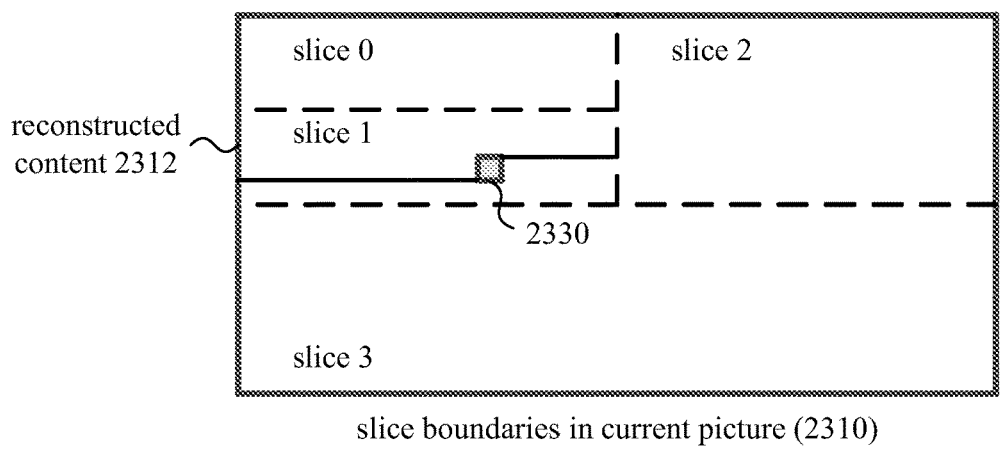
slice boundaries in current picture (2310)
Figure 24
2400
z-scan order for current block and blocks that may include bottom right position of the candidate block
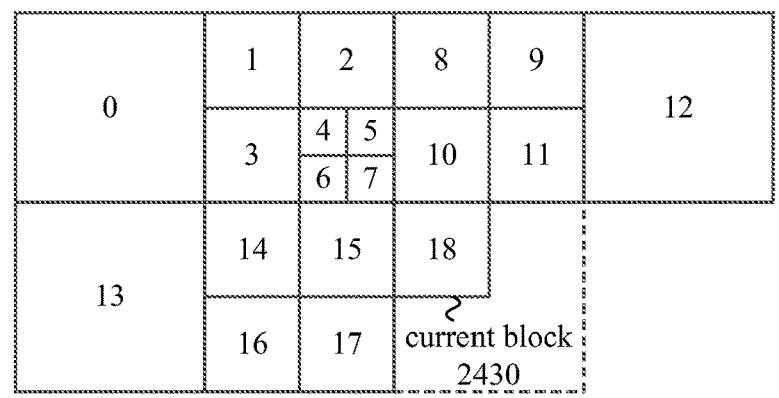

HASH TABLE CONSTRUCTION AND AVAILABILITY CHECKING FOR HASH-BASED BLOCK MATCHING

CROSS REFERENCE TO RELATED APPLICATIONS

This is the U.S. National Stage of International Application No. PCT/CN2014/072827, filed Mar. 4, 2014, which was published in English under PCT Article 21(2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

Intra block copy ("BC") is a prediction mode under development for H.265/HEVC extensions. For intra BC prediction mode, the sample values of a current block of a picture are predicted using previously reconstructed sample values in the same picture. A block vector ("BV") indicates a displacement from the current block to a region of the picture that includes the previously reconstructed sample values used for prediction. The BV is signaled in the bitstream. Intra BC prediction is a form of intra-picture prediction—intra BC prediction for a block of a picture does not use any sample values other than sample values in the same picture.

As currently specified in the H.265/HEVC standard and implemented in some reference software for the H.265/HEVC standard, intra BC prediction mode has several problems. In particular, encoder-side decisions about which BV values to use in intra BC prediction are not made effectively.

SUMMARY

In summary, the detailed description presents innovations in the areas of hash table construction and availability checking for hash-based block matching. For example, some of the innovations relate to ways to speed up the process of constructing a hash table or reduce the size of a hash table used in hash-based block matching during block vector ("BV") estimation or motion estimation. Other innovations relate to availability checking during BV estimation that uses a hash table.

According to a first aspect of the innovations described herein, an image or video encoder determines a block hash value for a given candidate block among multiple candidate blocks. For each of multiple sections (e.g., rows, columns, sub-blocks) of the given candidate block, the encoder finds an intermediate hash value. The multiple sections can include original sample values or reconstructed sample values.

The encoder computes the block hash value for the given candidate block based at least in part on results of hashing the intermediate hash values. The intermediate hash values and the block hash value for the given candidate block can be computed using the same hash function or different hash functions. The encoder retains at least some of the intermediate hash values for reuse in computing block hash values for one or more other candidate blocks. The encoder adds the block hash value for the given candidate block to a hash table. By reusing retained intermediate hash values when computing block hash values for other candidate blocks, the encoder speeds up the process of constructing the hash table.

For example, the multiple sections of the given candidate block are rows of sample values in the given candidate block. Intermediate hash values (for the rows) can be reused in computing block hash values for candidate blocks that partially overlap the given candidate block but are vertically offset by an integer number of sample values. Block hash values can be determined successively for a block column of vertically overlapping blocks that are offset by a single sample vertically, repeating on a block column-by-block column basis for block columns that are offset by a single sample horizontally.

Or, as another example, the multiple sections of the given candidate block are columns of sample values in the given candidate block. Intermediate hash values (for the columns) can be reused in computing block hash values for candidate blocks that partially overlap the given candidate block but are horizontally offset by an integer number of sample values. Block hash values can be determined successively for a block row of horizontally overlapping blocks that are offset by a single sample horizontally, repeating on a block row-by-block row basis for block rows that are offset by a single sample vertically.

Or, as another example, the multiple sections of the given candidate block are sub-blocks of sample values in the given candidate block. Intermediate hash values (for the sub-blocks) can be reused in computing block hash values for candidate blocks that partially overlap the given candidate block but are offset by an integer number of sub-blocks.

A hash table constructed in this way can be used in BV estimation or motion estimation. For example, for BV estimation, a current picture includes the multiple candidate blocks with block hash values in the hash table. The encoder determines a block hash value for a current block of the current picture, then searches the hash table to identify any of the multiple candidate blocks (of the current picture) having a block hash value that matches it. Or, for motion estimation, a reference picture includes the multiple candidate blocks with block hash values in the hash table. The encoder determines a block hash value for a current block of a current picture, then searches the hash table to identify any of the multiple candidate blocks (of the reference picture)

having a block hash value that matches it. In any case, the block hash value for the current block is determined using the same hashing approach as the block hash values in the hash table.

According to another aspect of the innovations described herein, an image or video encoder uses hierarchical hashing to speed up hash table construction. In particular, for each of multiple candidate blocks, the encoder determines a block hash value. For example, the encoder determines the block hash value based at least in part on results of hashing intermediate hash values for sections (e.g., rows, columns, sub-blocks) of the candidate block. The encoder adds the block hash values for the candidate blocks to one or more hash tables.

At least some of the candidate blocks are organized as candidate super-blocks. The encoder also determines, for each of multiple candidate super-blocks, a super-block hash value based at least in part on results of hashing the block hash values for the candidate blocks of the candidate super-block. The encoder adds the super-block hash values for the candidate super-blocks to the one or more hash tables.

For example, the hash table(s) include a first hash table that stores the block hash values for the multiple candidate blocks and a second hash table that stores the super-block hash values for the multiple candidate super-blocks. A hash table constructed in this way can be used in BV estimation or motion estimation for a current block or current super-block of a current picture.

According to another aspect of the innovations described herein, an image or video encoder reduces hash table size by selectively omitting block hash values for some candidate blocks from a hash table. In particular, for each of multiple candidate blocks, the encoder evaluates whether the candidate block satisfies a complexity criterion. If so, the encoder determines a block hash value for the candidate block and adds the block hash value to a hash table. The block hash value can be computed using original sample values or reconstructed sample values. If the candidate block does not satisfy the complexity criterion, the encoder does not determine a block hash value for the candidate block. A hash table constructed in this way can be used in BV estimation or motion estimation.

For example, the complexity criterion is satisfied for a given candidate block if (a) at least one row of the given candidate block has non-uniform sample values, and/or (b) at least one column of the given candidate block has non-uniform sample values. With this criterion, the encoder can screen out uniform blocks, blocks with rows of uniform sample values and blocks with columns of uniform sample values, which likely can be predicted efficiently with intra spatial prediction. More generally, when evaluating whether a given candidate block satisfies the complexity criterion, the encoder can compute a complexity metric for the candidate block and compare the complexity metric to a threshold.

According to another aspect of the innovations described herein, when it uses a hash table for hash-based block matching during BV estimation, an image or video encoder quickly checks whether a matching candidate block is available for use as a reference region. The encoder determines a block hash value for a current block of a current picture. The encoder searches a hash table to identify any of multiple candidate blocks (of the current picture) having a block hash value that matches it. For any given candidate block having a block hash value that matches the block hash value for the current block, the encoder checks availability of the given candidate block for use as a reference region for the current block in intra block copy prediction. For example, the encoder checks that (a) the given candidate block includes only sample values in blocks that precede the current block in coding order (also called decoding order) and (b) the given candidate block and the current block are part of the same slice and part of the same tile.

The innovations for hash table construction and availability checking can be implemented as part of a method, as part of a computing device adapted to perform the method or as part of a tangible computer-readable media storing computer-executable instructions for causing a computing device to perform the method. The various innovations can be used in combination or separately. In particular, during hash table construction, an encoder can reuse retained intermediate hash values in conjunction with hierarchical hashing and/or screening of candidate blocks according to complexity criteria. A hash table produced using any of the innovations for hash table construction can be used in conjunction with the innovations for availability checking.

The foregoing and other objects, features, and advantages of the invention will become more apparent from the following detailed description, which proceeds with reference to the accompanying figures.

BRIEF DESCRIPTION OF THE DRAWINGS

FIG. 3 is a diagram of an example encoder system in conjunction with which some described embodiments can be implemented.

FIG. 11 is a diagram illustrating the number of candidate blocks in block matching for a block of an example frame.

FIG. 12 is a table illustrating hash values for candidate blocks in hash-based block matching.

FIGS. 13a-13c are tables illustrating example data structures that organize candidate blocks for hash-based block matching.

FIGS. 14a-14c are tables illustrating example data structures that organize candidate blocks for iterative hash-based block matching.

FIG. 23 is a diagram illustrating conditions for candidate blocks that may be reference regions during BV estimation.

FIG. 24 is a diagram illustrating example z-scan order for blocks of a picture.

DETAILED DESCRIPTION

The detailed description presents innovations in the areas of hash table construction and availability checking for hash-based block matching. For example, some of the innovations relate to ways to speed up the process of constructing a hash table or reduce the size of a hash table. This can speed up hash-based block matching and reduce memory usage for hash-based block matching within a picture (for block vector ("By") estimation) or between different pictures (for motion estimation). Other innovations relate to availability checking during BV estimation that uses a hash table.

Although operations described herein are in places described as being performed by a video encoder or decoder, in many cases the operations can be performed by another type of media processing tool (e.g., image encoder or decoder).

Some of the innovations described herein are illustrated with reference to syntax elements and operations specific to the H.265/HEVC standard. For example, reference is made to the draft version JCTVC-P1005 of the H.265/HEVC standard—"High Efficiency Video Coding (HEVC) Range Extensions Text Specification: Draft 6," JCTVC-P1005_v1, February 2014. The innovations described herein can also be implemented for other standards or formats.

Some of the innovations described herein (e.g., for hash table construction) are in places described with reference to BV estimation and intra BC prediction. The innovations can also be applied in other contexts (e.g., motion estimation and compensation).

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

Figure 1:
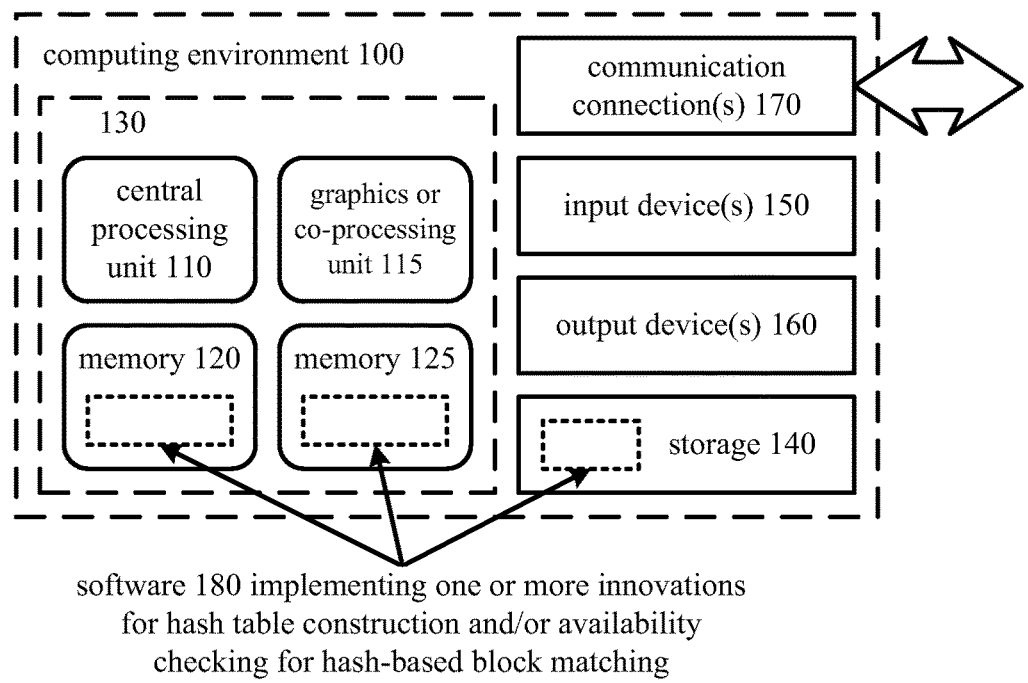
FIG. 1 is a diagram of an example computing system in which some described embodiments can be implemented.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for hash table construction and/or availability checking for hash-based block matching, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for hash table construction and/or availability checking for hash-based block matching.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC (such as an ASIC digital signal processor ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
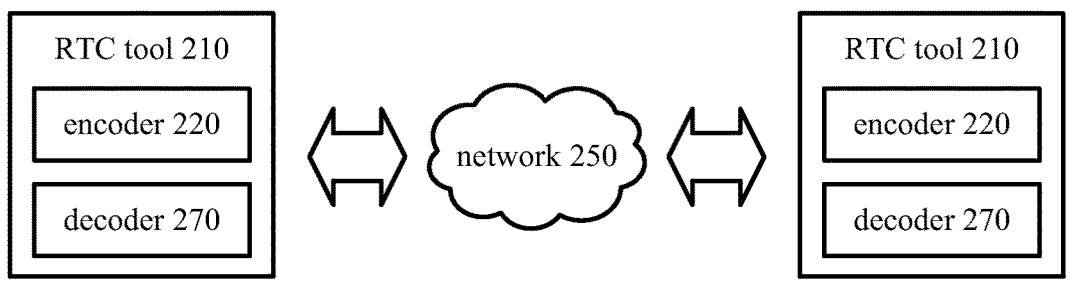
FIGS. 2a and 2b are diagrams of example network environments in which some described embodiments can be implemented.
Figure 2B:
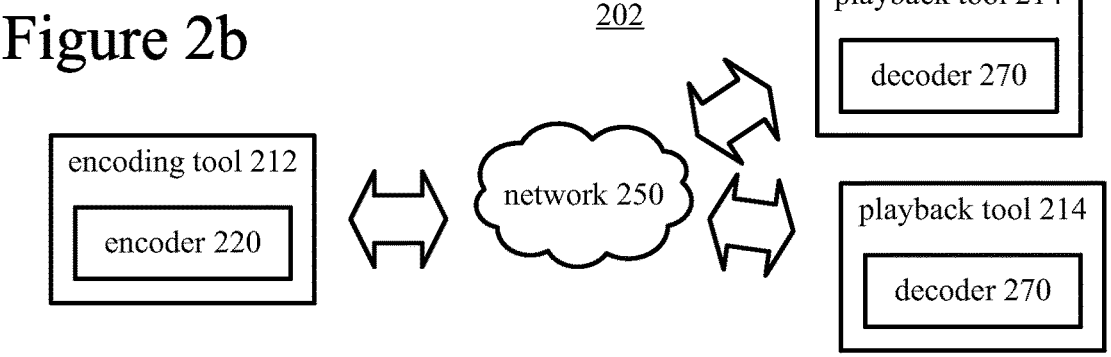

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO-IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-part communication scenario. Although the network environment (201) in FIG. 2a includes two real-time communication tools (210), the network environment (201) can instead include three or more real-time communication tools (210) that participate in multi-party communication.

Figure 4:
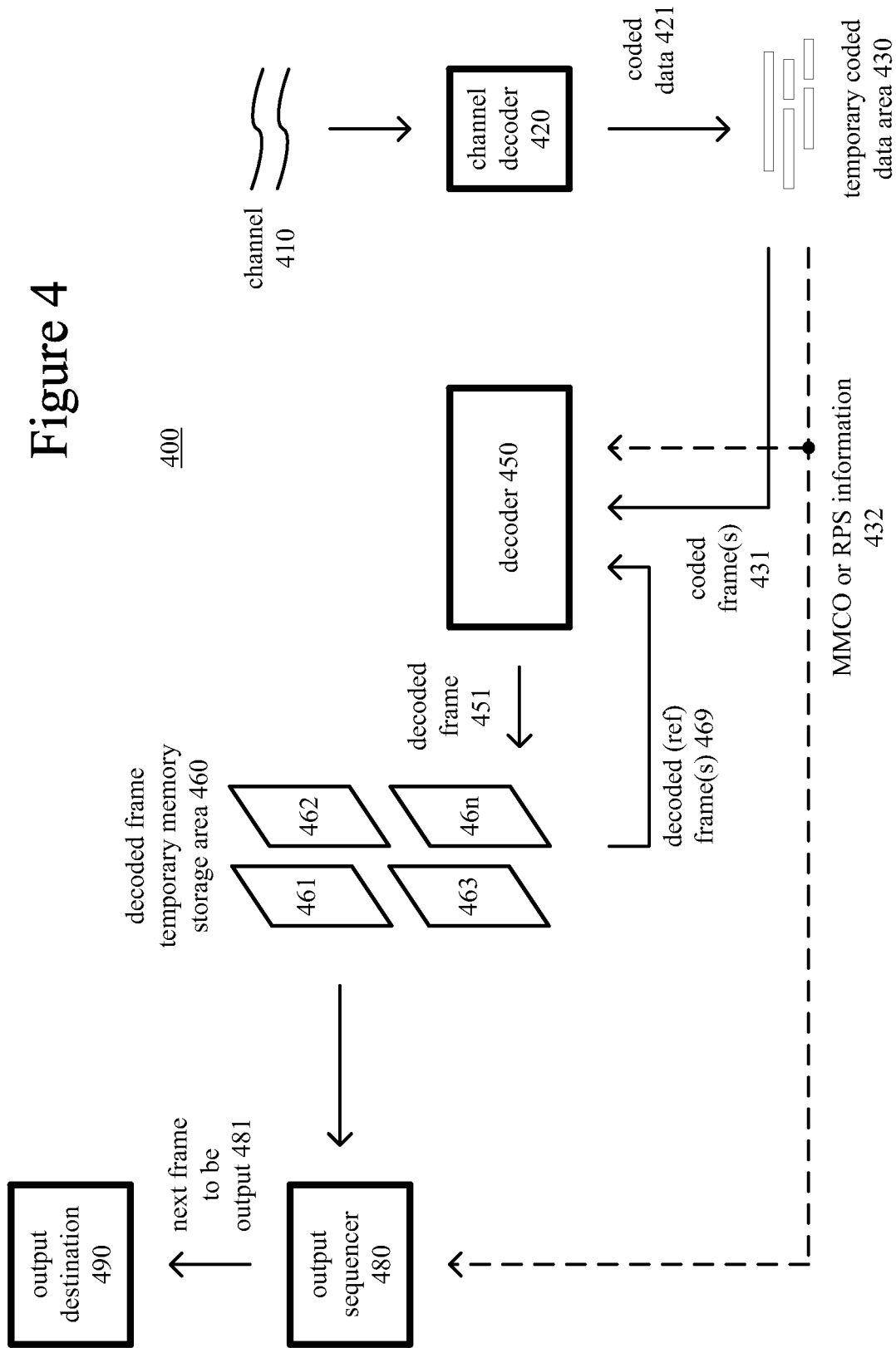
FIG. 4 is a diagram of an example decoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, screen capture module, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be adapted for encoding of a particular type of content (e.g., screen capture content). The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include content encoded using hash-based block matching.

The video source (310) can be a camera, tuner card, storage media, screen capture module, or other digital video source. The video source (310) produces a sequence of video frames at a frame rate of, for example, 30 frames per second. As used herein, the term "frame" generally refers to source, coded or reconstructed image data. For progressive-scan video, a frame is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) selects an individual source frame from the source frame storage area (320). The order in which frames are selected by the frame selector (330) for input to the encoder (340) may differ from the order in which the frames are produced by the video source (310), e.g., the encoding of some frames may be delayed in order, so as to allow some later frames to be encoded first and to thus facilitate temporally backward prediction. Before the encoder (340), the encoder system (300) can include a pre-processor (not shown) that performs pre-processing (e.g., filtering) of the selected frame (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Typically, before encoding, video has been converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format).

The encoder (340) encodes the selected frame (331) to produce a coded frame (341) and also produces memory management control operation ("MMCO") signals (342) or reference picture set ("RPS") information. The RPS is the set of frames that may be used for reference in motion compensation for a current frame or any subsequent frame. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference frames for inter-frame prediction of the content of the current source frame (331). The MMCO/RPS information (342) indicates to a decoder which reconstructed frames may be used as reference frames, and hence should be stored in a frame storage area.

Generally, the encoder (340) includes multiple encoding modules that perform encoding tasks such as partitioning into tiles, intra prediction estimation and prediction, motion estimation and compensation, frequency transforms, quantization and entropy coding. The exact operations performed by the encoder (340) can vary depending on compression format. The format of the output encoded data can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a frame into multiple tiles of the same size or different sizes. For example, the encoder (340) splits the frame along tile rows and tile columns that, with frame boundaries, define horizontal and vertical boundaries of tiles within the frame, where each tile is a rectangular region. Tiles are often used to provide options for parallel processing. A frame can also be organized as one or more slices, where a slice can be an entire frame or region of the frame. A slice can be decoded independently of other slices in a frame, which improves error resilience. The content of a slice or tile is further partitioned into blocks or other sets of sample values for purposes of encoding and decoding.

For syntax according to the H.265/HEVC standard, the encoder splits the content of a frame (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder, and can be, for example, 64×64, 32×32 or 16×16 sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. For an intra-predicted CU, the PU has the same size as the CU, unless the CU has the smallest size (e.g., 8×8). In that case, the CU can be split into four smaller PUs (e.g., each 4×4 if the smallest CU size is 8×8) or the PU can have the smallest CU size, as indicated by a syntax element for the CU. A CU also has one or more transform units for purposes of residual coding/decoding, where a transform unit ("TU") has a transform block ("TB") and two chroma TBs. A PU in an intra-predicted CU may contain a single TU (equal in size to the PU) or multiple TUs. The encoder decides how to partition video into CTUs, CUs, PUs, TUs, etc.

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, prediction unit, residual data unit, or a CB, PB or TB, or some other set of sample values, depending on context.

Returning to FIG. 3, the encoder represents an intra-coded block of a source frame (331) in terms of prediction from other, previously reconstructed sample values in the frame (331). For intra BC prediction, an intra-picture estimator estimates displacement of a block with respect to the other, previously reconstructed sample values. An intra-frame prediction reference region is a region of sample values in the frame that are used to generate BC-prediction values for the block. The intra-frame prediction region can be indicated with a block vector ("BV") value (determined in BV estimation), or, alternatively, a hash value that indicates a reconstruction block in a block hash dictionary (example of hash table). For hash-based block matching during BV estimation, a hash table can be constructed using one or more of the innovations described herein, and the encoder can perform availability checking for candidate blocks as described herein. For intra spatial prediction for a block, the intra-picture estimator estimates extrapolation of the neighboring reconstructed sample values into the block. The intra-picture estimator can output prediction information (such as BV values or hash values for intra BC prediction, or prediction mode (direction) for intra spatial prediction), which is entropy coded. An intra-frame prediction predictor applies the prediction information to determine intra prediction values.

The encoder (340) represents an inter-frame coded, predicted block of a source frame (331) in terms of prediction from reference frames. A motion estimator estimates the motion of the block with respect to one or more reference frames (369). For hash-based block matching during motion estimation, a hash table can be constructed using one or more of the innovations described herein. When multiple reference frames are used, the multiple reference frames can be from different temporal directions or the same temporal direction. A motion-compensated prediction reference region is a region of sample values in the reference frame(s) that are used to generate motion-compensated prediction values for a block of sample values of a current frame. The motion estimator outputs motion information such as motion vector ("MV") information, which is entropy coded. A motion compensator applies MVs to reference frames (369) to determine motion-compensated prediction values for inter-frame prediction.

The encoder can determine the differences (if any) between a block's prediction values (intra or inter) and corresponding original values. These prediction residual values are further encoded using a frequency transform, quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, index values for BV predictors, BV differentials, hash values, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique.

An adaptive deblocking filter is included within the motion compensation loop in the encoder (340) to smooth discontinuities across block boundary rows and/or columns in a decoded frame. Other filtering (such as de-ringing filtering, adaptive loop filtering ("ALF"), or sample-adaptive offset ("SAO") filtering; not shown) can alternatively or additionally be applied as in-loop filtering operations.

The encoded data produced by the encoder (340) includes syntax elements for various layers of bitstream syntax. For syntax according to the H.265/HEVC standard, for example, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture (e.g., one NAL unit for a PPS, and one or more other NAL units for encoded data for a picture). Within the encoded data for a picture, a syntax element indicates which PPS to use for the picture. Similarly, for syntax according to the H.265/HEVC standard, a sequence parameter set ("SPS") is a syntax structure that contains syntax elements that may be associated with a sequence of pictures. A bitstream can include a single SPS or multiple SPSs. A SPS is typically signaled separate from other data for the sequence, and a syntax element in the other data indicates which SPS to use.

The coded frames (341) and MMCO/RPS information (342) (or information equivalent to the MMCO/RPS information (342), since the dependencies and ordering structures for frames are already known at the encoder (340)) are processed by a decoding process emulator (350). The decoding process emulator (350) implements some of the functionality of a decoder, for example, decoding tasks to reconstruct reference frames. In a manner consistent with the MMCO/RPS information (342), the decoding processes emulator (350) determines whether a given coded frame (341) needs to be reconstructed and stored for use as a reference frame in inter-frame prediction of subsequent frames to be encoded. If a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). In a manner consistent with the MMCO/RPS information (342), the decoding process emulator (350) manages the contents of the storage area (360) in order to identify any frame buffers (361, 362, etc.) with frames that are no longer needed by the encoder (340) for use as reference frames. After modeling the decoding process, the decoding process emulator (350) stores a newly decoded frame (351) in a frame buffer (361, 362, etc.) that has been identified in this manner.

The coded frames (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Decoder Systems.

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and a higher-latency decoding mode for media playback from a file or stream, or it can be a special-purpose decoding tool adapted for one such decoding mode. The decoder system (400) can be adapted for decoding of a particular type of content (e.g., screen capture content). The decoder system (400) can be implemented as an operating system module, as part of an application library or as a standalone application. Overall, the decoder system (400) receives coded data from a channel (410) and produces reconstructed frames as output for an output destination (490). The coded data can include content that has been encoded using hash-based block matching.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0|ISO/IEC 13818-1 or an internet real-time transport protocol format such as IETF RFC 3550), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded frame (431) to produce a corresponding decoded frame (451). As appropriate, when performing its decoding process, the decoder (450) may use one or more previously decoded frames (469) as reference frames for inter-frame prediction. The decoder (450) reads such previously decoded frames (469) from a decoded frame temporary memory storage area (460). Generally, the decoder (450) includes multiple decoding modules that perform decoding tasks such as entropy decoding, intra-frame prediction, motion-compensated inter-frame prediction, inverse quantization, inverse frequency transforms, and merging of tiles. The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and, at an appropriate time, makes the received encoded data available to an entropy decoder. The entropy decoder entropy decodes entropy-coded quantized data as well as entropy-coded side information, typically applying the inverse of entropy encoding performed in the encoder. A motion compensator applies motion information to one or more reference frames to form motion-compensated prediction values for any inter-coded blocks of the frame being reconstructed. An intra-frame prediction module can spatially predict sample values of a current block from neighboring, previously reconstructed sample values or, for intra BC prediction, predict sample values of a current block using previously reconstructed sample values of an intra-frame prediction reference region in the frame. The reference region can be indicated with a BV value or, alternatively, a hash value that indicates a reconstruction block in a block hash dictionary. The decoder (450) also reconstructs prediction residual values. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency-domain data into spatial-domain data. For an interframe predicted block, the decoder (450) combines reconstructed prediction residual values with motion-compensated prediction values. The decoder (450) can similarly combine prediction residual values with prediction values from intra prediction. An adaptive deblocking filter is included within the motion compensation loop in the video decoder (450) to smooth discontinuities across block boundary rows and/or columns in the decoded frame (451). Other filtering (such as de-ringing filtering, ALF, or SAO filtering; not shown) can alternatively or additionally be applied as in-loop filtering operations.

The decoded frame temporary memory storage area (460) includes multiple frame buffer storage areas (461, 462, . . . , 46n). The decoded frame storage area (460) is an example of a decoded picture buffer. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) identifies when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders.

Figure 5A:
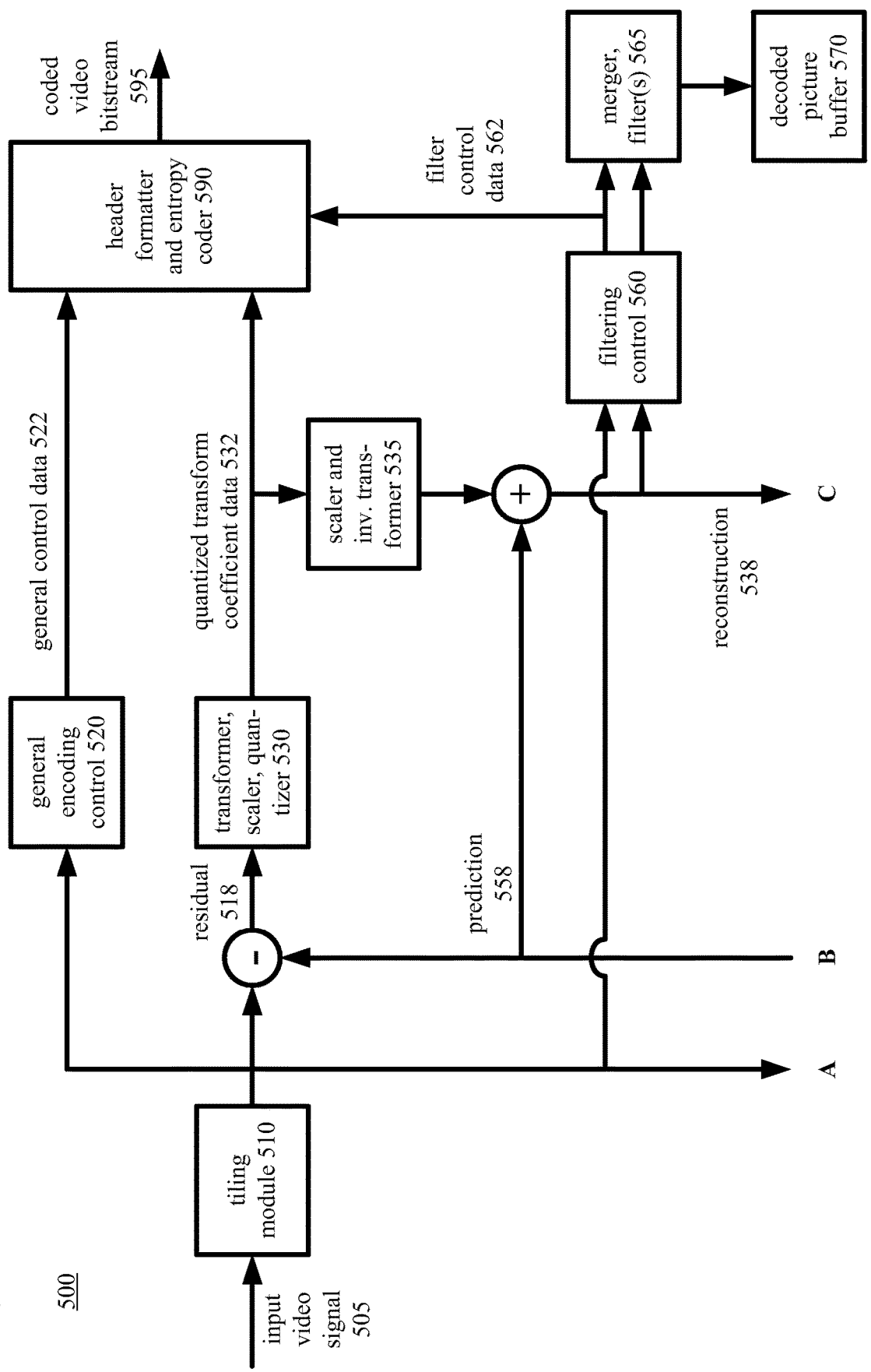
FIGS. 5a and 5b are diagrams illustrating a first example video encoder in conjunction with which some described embodiments can be implemented.
Figure 5B:
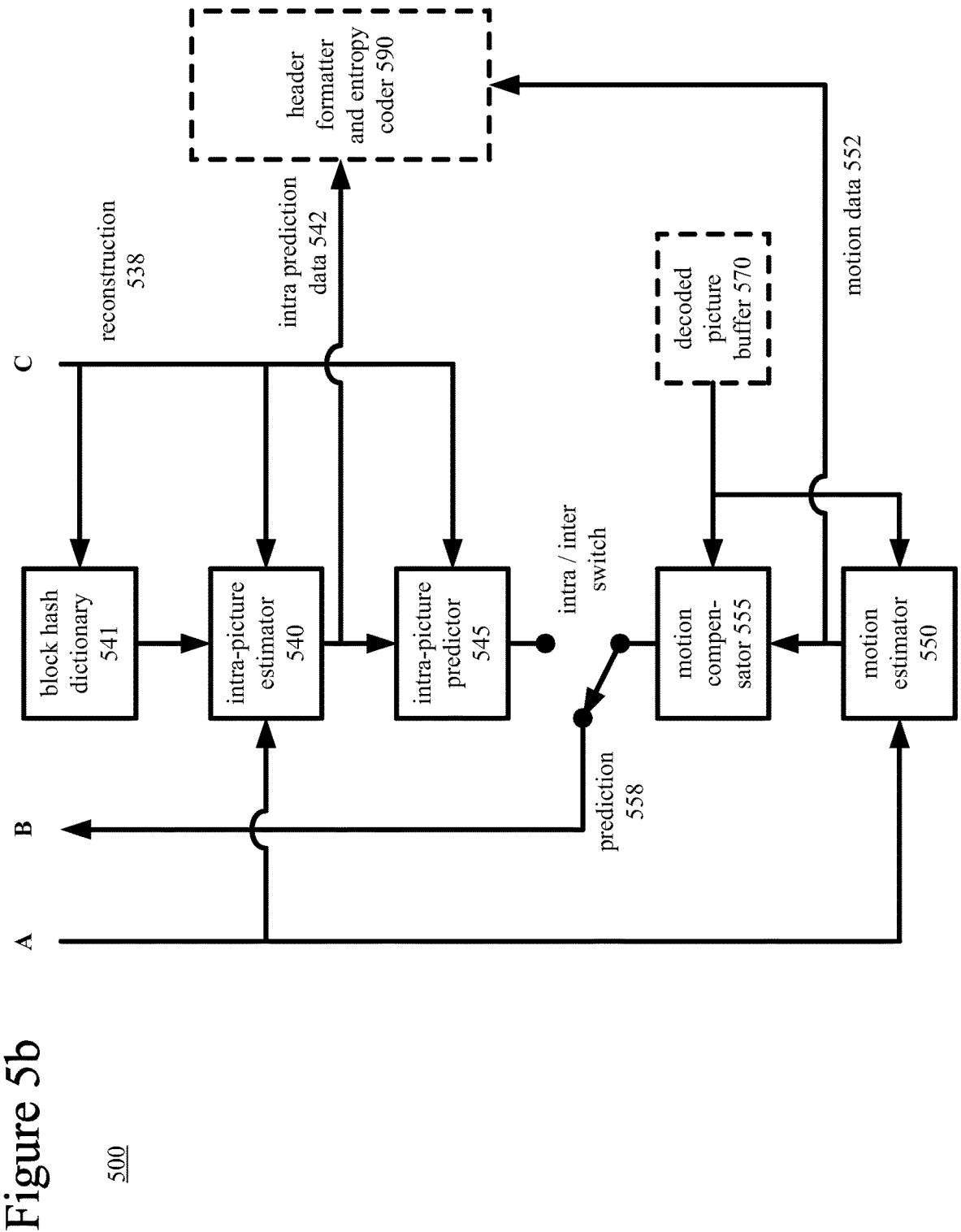

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the H.265/HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. In H.265/HEVC implementations, the encoder (500) partitions a picture into one or more slices, where each slice includes one or more slice segments.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can decide whether and how to use hash-based block matching during encoding. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates the motion of blocks of sample values of the current picture of the input video signal (505) with respect to one or more reference pictures. The decoded picture buffer (570) buffers one or more reconstructed previously coded pictures for use as reference pictures. For hash-based block matching during the motion estimation, the intra-picture estimator (540) can use a block hash dictionary (not shown) to find a MV value for a current block. The block hash dictionary is an example of a hash table. For hash-based block matching during motion estimation, the block hash dictionary (hash table) can be constructed using one or more of the innovations described herein. When multiple reference pictures are used, the multiple reference pictures can be from different temporal directions or the same temporal direction. The motion estimator (550) produces as side information motion data (552) such as MV data, merge mode index values, and reference picture selection data. The motion data (552) is provided to the header formatter/entropy coder (590) as well as the motion compensator (555).

The motion compensator (555) applies MVs to the reconstructed reference picture(s) from the decoded picture buffer (570). The motion compensator (555) produces motion-compensated predictions for the current picture.

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block of the current picture from neighboring, previously reconstructed sample values of the current picture. Or, for intra BC prediction using BV values, the intra-picture estimator (540) estimates displacement of the sample values of the current block to different candidate reference regions within the current picture. In FIG. 5b, the candidate reference regions include reconstructed sample values. For hash-based block matching during the BV estimation, the intra-picture estimator (540) can use a block hash dictionary (541) to find a BV value for a current block. The block hash dictionary (541) is a data structure that organizes candidate blocks for hash-based block matching, as described below (see section VII.C). The block hash dictionary (541) is an example of a hash table. For hash-based block matching during BV estimation, the block hash dictionary (541) (hash table) can be constructed using one or more of the innovations described herein, and the encoder can perform availability checking for candidate blocks as described herein. The block hash dictionary (541) can be updated during encoding to store information about new candidate blocks, as those candidate blocks become available for use in hash-based block matching. (In other implementations (see FIGS. 6a and 6b), a block hash dictionary can be constructed based upon original sample values.) Alternatively, instead of using BV values, intra BC prediction can use hash values that represent blocks. In this case, for hash-based block matching, the intra-picture estimator (540) can use a block hash dictionary (541) to find a hash value to use to represent a current block.

The intra-picture estimator (540) produces as side information intra prediction data (542), such as information indicating whether intra prediction uses spatial prediction or intra BC prediction (e.g., a flag value per intra block), prediction mode direction (for intra spatial prediction), and BV values or hash values (for intra BC prediction). The intra prediction data (542) is provided to the header formatter/entropy coder (590) as well as the intra-picture predictor (545).

According to the intra prediction data (542), the intra-picture predictor (545) spatially predicts sample values of a current block of the current picture from neighboring, previously reconstructed sample values of the current picture. Or, for intra BC prediction, the intra-picture predictor (545) predicts the sample values of the current block using previously reconstructed sample values of an intra-picture prediction reference region, which is indicated by a BV value for the current block (or is indicated by the hash value in a block hash dictionary). In some cases, the BV value can be a BV predictor (predicted BV value). In other cases, the BV value can be different than its predicted BV value, in which case a BV differential indicates the difference between the predicted BV value and BV value. When the chroma data for a picture has the same resolution as the luma data (e.g. when the format is YUV 4:4:4 format or RGB 4:4:4 format), the BV value that is applied for the chroma block may be the same as the BV value applied for the luma block. On the other hand, when the chroma data for a picture has reduced resolution relative to the luma data (e.g. when the format is YUV 4:2:0 format), the BV value that is applied for the chroma block may be scaled down and possibly rounded to adjust for the difference in chroma resolution (e.g. by dividing the vertical and horizontal components of the BV value by two and truncating or rounding them to integer values). When a hash value represents a reconstruction block (from block hash dictionary) for luma sample values of a picture, reconstruction blocks for chroma sample values at corresponding locations in the picture can be used.

The intra/inter switch selects whether the prediction (558) for a given block will be a motion-compensated prediction or intra-picture prediction. The difference (if any) between a block of the prediction (558) and a corresponding part of the original current picture of the input video signal (505) provides values of the residual (518), for a non-skip-mode block. During reconstruction of the current picture, for a non-skip-mode block, reconstructed residual values are combined with the prediction (558) to produce an approximate or exact reconstruction (538) of the original content from the video signal (505). (In lossy compression, some information is lost from the video signal (505).)

In the transformer/scaler/quantizer (530), a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (558) is null), producing blocks of frequency transform coefficients. The encoder (500) may also be able to indicate that such transform step is skipped. The scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis or other basis. The quantized transform coefficient data (532) is provided to the header formatter/entropy coder (590).

In the scaler/inverse transformer (535), a scaler/inverse quantizer performs inverse scaling and inverse quantization on the quantized transform coefficients. An inverse frequency transformer performs an inverse frequency transform, producing blocks of reconstructed prediction residual values or sample values. For a non-skip-mode block, the encoder (500) combines reconstructed residual values with values of the prediction (558) (e.g., motion-compensated prediction values, intra-picture prediction values) to form the reconstruction (538). For a skip-mode block, the encoder (500) uses the values of the prediction (558) as the reconstruction (538).

For intra-picture prediction, the values of the reconstruction (538) can be fed back to the intra-picture estimator (540) and intra-picture predictor (545). Values of the reconstruction (538) can also be used to update the block hash dictionary (541). Also, the values of the reconstruction (538) can be used for motion-compensated prediction of subsequent pictures. The values of the reconstruction (538) can be further filtered. A filtering control (560) determines how to perform deblock filtering and SAO filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562), so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the encoder (500), and the encoder (500) may provide syntax within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). For the intra prediction data (542), the header formatter/entropy coder (590) can select and entropy code BV predictor index values (for intra BC prediction), or a default BV predictor can be used. In some cases, the header formatter/entropy coder (590) also determines BV differentials for BV values (relative to BV predictors for the BV values), then entropy codes the BV differentials, e.g., using context-adaptive binary arithmetic coding.

The header formatter/entropy coder (590) provides the encoded data in the coded video bitstream (595). The format of the coded video bitstream (595) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

In some example implementations, the candidate blocks considered in hash-based block matching include reconstructed sample values. That is, the candidate blocks are part of previously encoded then reconstructed content in a picture. Hash values for the candidate blocks are determined from the reconstructed sample values. During hash-based block matching, the encoder determines the hash value for a current block using input sample values. The encoder compares it (or otherwise uses the hash value) against the hash values determined from reconstructed sample values for candidate blocks.

Alternatively, the candidate blocks considered in hash-based block matching include input sample values. That is, the candidate blocks are part of an input version of a picture. Hash values for the candidate blocks are determined from the input sample values. During hash-based block matching, the encoder determines the hash value for a current block using input sample values. The encoder compares it (or otherwise uses the hash value) against the hash values determined from input sample values for candidate blocks. Even so, a matching block from reconstructed sample values is used to represent the current block. Thus, BC prediction operations still use reconstructed sample values.

Figure 6A:
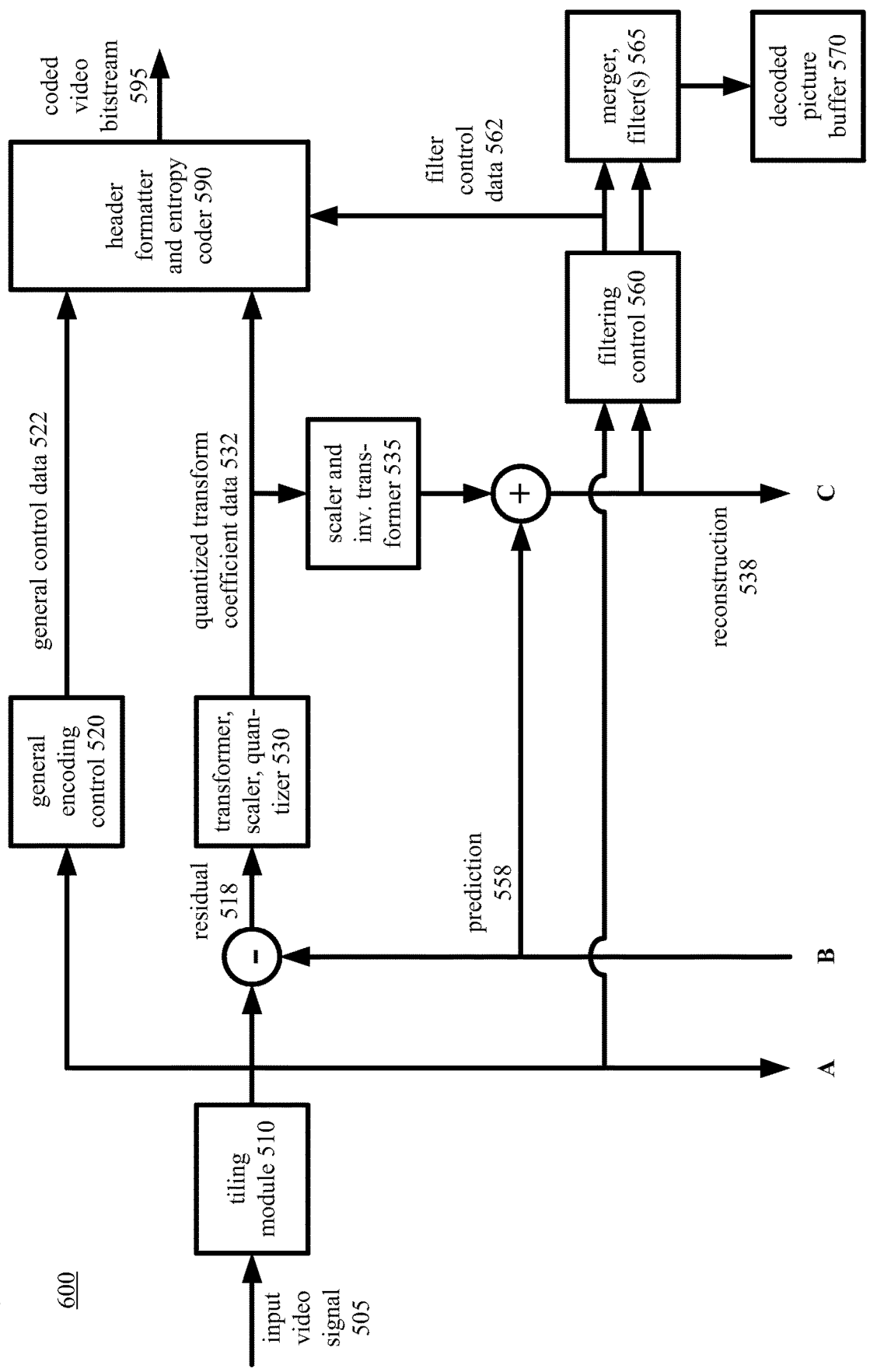
FIGS. 6a and 6b are diagrams illustrating a second example video encoder in conjunction with which some described embodiments can be implemented.
Figure 6B:
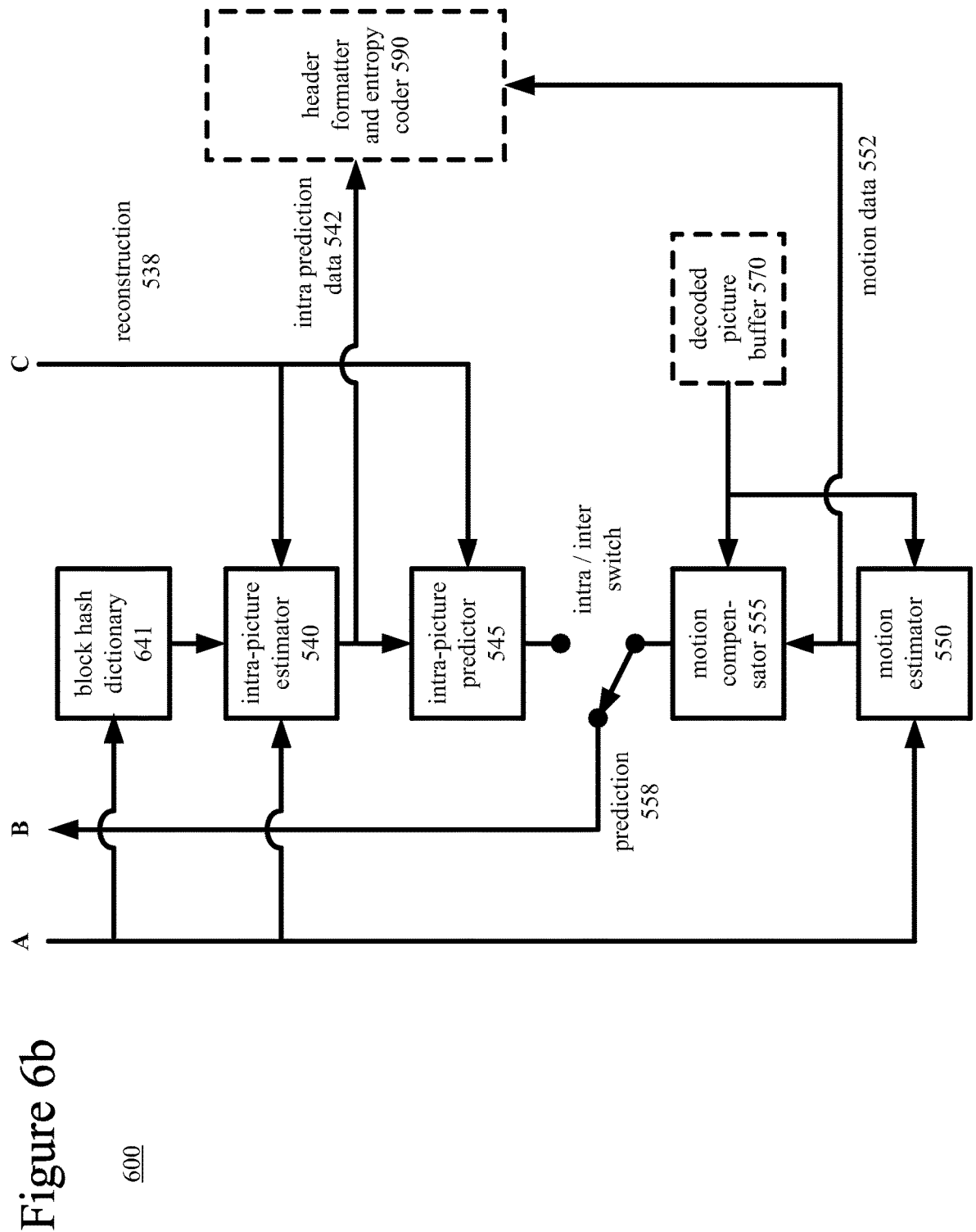

FIGS. 6a and 6b show a generalized video encoder (600) that determines hash values from input sample values. In most respects, the modules of the encoder (600) are identical to the modules of the encoder (500) shown in FIGS. 5a and 5b, and the same reference numerals are used in FIGS. 6a and 6b for such modules. The block hash dictionary (641) is different in FIG. 6b, however. In FIG. 5b, the block hash dictionary (541) stores hash values determined by applying hash functions to reconstructed sample values, and the block hash dictionary (541) is updated using reconstructed sample values. In FIG. 6b, in contrast, the block hash dictionary (641) stores hash values determined by applying hash functions to input sample values from the input video signal (505). For example, for BV estimation by the intra-picture estimator (540), the block hash dictionary (641) stores hash values for candidate blocks in a current picture. For motion estimation by the motion estimator (550), a block hash dictionary (not shown) can store hash values for candidate blocks of one or more reference pictures.

Using hash values determined from input sample values can improve intra BC prediction performance when some blocks are lossy coded. In this case, due to quantization noise, the encoder may be unable to find a matching block that exactly matches the current block if hash values are determined from reconstructed sample values. By determining hash values from input sample values, hash-based block matching is not affected by distortion introduced by lossy coding. The encoder still signals to a decoder which matching block to use for a current block (e.g., using a BV value). Using this information and reconstructed sample values, the decoder reconstructs the current block using a block copy operation.

Depending on implementation and the type of compression desired, modules of an encoder (500, 600) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500, 600). The relationships shown between modules within the encoder (500, 600) indicate general flows of information in the encoder; other relationships are not shown for the sake of simplicity.

VI. Example Video Decoders.

Figure 7:
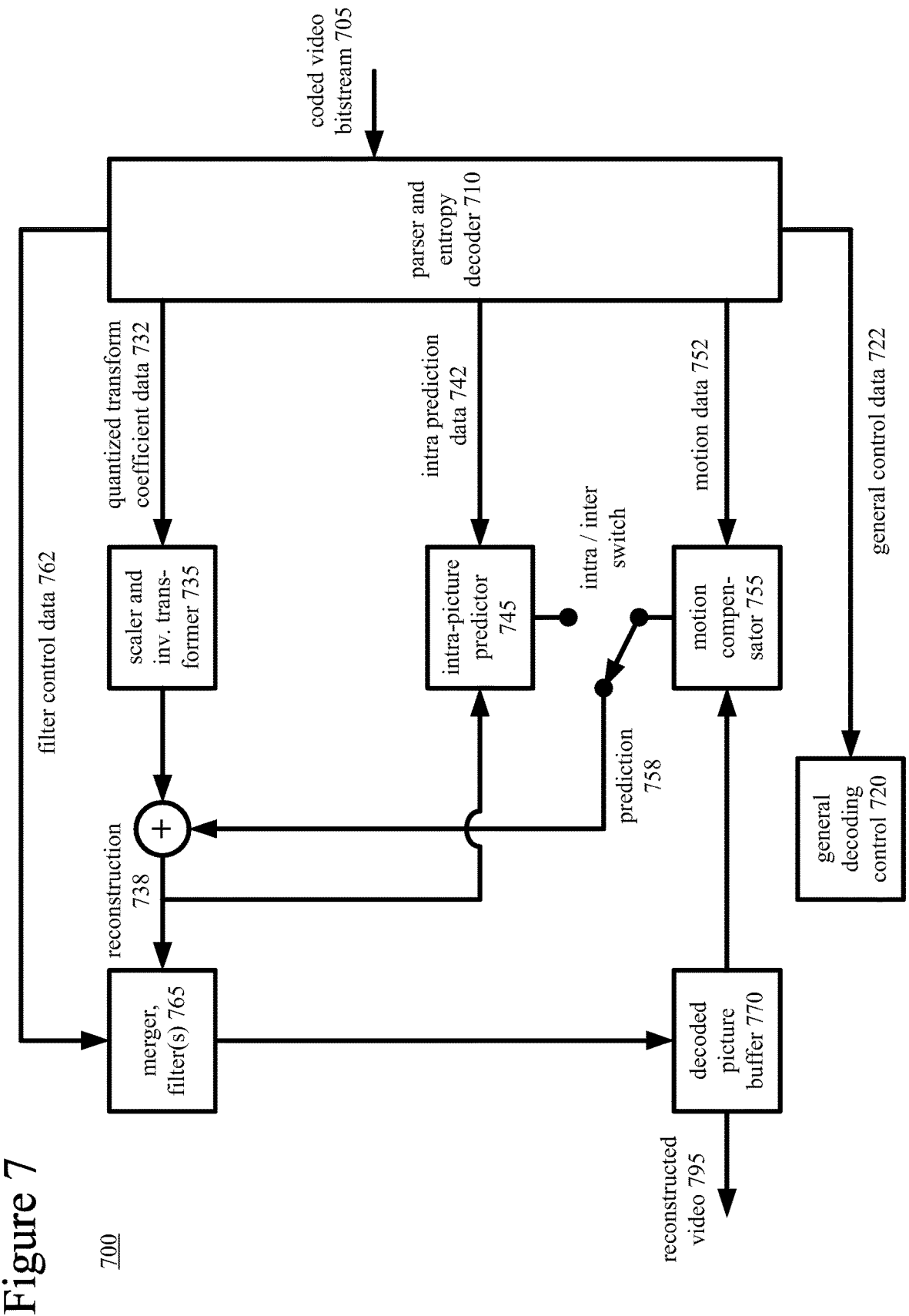
FIG. 7 is a diagram illustrating a first example video decoder in conjunction with which some described embodiments can be implemented.

FIG. 7 is a block diagram of a generalized decoder (700) in conjunction with which some described embodiments may be implemented. The decoder (700) receives encoded data in a coded video bitstream (705) and produces output including pictures for reconstructed video (795). The format of the coded video bitstream (705) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The decoder (700) is block-based and uses a block format that depends on implementation. Blocks may be further sub-divided at different stages. For example, a picture can be divided into 64×64 blocks, 32×32 blocks or 16×16 blocks, which can in turn be divided into smaller blocks of sample values. In implementations of decoding for the H.265/HEVC standard, a picture is partitioned into CTUs (CTBs), CUs (CBs), PUs (PBs) and TU (TBs).

The decoder (700) decompresses pictures using intra-picture decoding and/or inter-picture decoding. Many of the components of the decoder (700) are used for both intra-picture decoding and inter-picture decoding. The exact operations performed by those components can vary depending on the type of information being decompressed.

A buffer receives encoded data in the coded video bitstream (705) and makes the received encoded data available to the parser/entropy decoder (710). The parser/entropy decoder (710) entropy decodes entropy-coded data, typically applying the inverse of entropy coding performed in the encoder (500, 600) (e.g., context-adaptive binary arithmetic decoding). As a result of parsing and entropy decoding, the parser/entropy decoder (710) produces general control data (722), quantized transform coefficient data (732), intra prediction data (742), motion data (752) and filter control data (762). For the intra prediction data (742), the parser/entropy decoder (710) can entropy decode BV predictor index values (for intra BC prediction), or a default BV predictor can be used. In some cases, the parser/entropy decoder (710) also entropy decodes BV differentials for BV values (e.g., using context-adaptive binary arithmetic decoding), then combines the BV differentials with corresponding BV predictors to reconstruct the BV values.

The general decoding control (720) receives the general control data (722) and provides control signals (not shown) to other modules (such as the scaler/inverse transformer (735), intra-picture predictor (745), motion compensator (755) and intra/inter switch) to set and change decoding parameters during decoding.

If the current picture is predicted using inter-picture prediction, a motion compensator (755) receives the motion data (752), such as MV data, reference picture selection data and merge mode index values. The motion compensator (755) applies MVs to the reconstructed reference picture(s) from the decoded picture buffer (770). The motion compensator (755) produces motion-compensated predictions for inter-coded blocks of the current picture. The decoded picture buffer (770) stores one or more previously reconstructed pictures for use as reference pictures.

In a separate path within the decoder (700), the intra-picture prediction predictor (745) receives the intra prediction data (742), such as information indicating whether intra prediction uses spatial prediction or intra BC prediction (e.g., a flag value per intra block), prediction mode direction (for intra spatial prediction), and BV values (for intra BC prediction). For intra spatial prediction, using values of a reconstruction (738) of the current picture, according to prediction mode data, the intra-picture predictor (745) spatially predicts sample values of a current block of the current picture from neighboring, previously reconstructed sample values of the current picture. Or, for intra BC prediction using BV values, the intra-picture predictor (745) predicts the sample values of the current block using previously reconstructed sample values of an intra-picture prediction reference region, which is indicated by a BV value for the current block.

The intra/inter switch selects whether the prediction (758) for a given block is a motion-compensated prediction or intra-picture prediction. For example, when H.265/HEVC syntax is followed, the intra/inter switch can be controlled based on a syntax element encoded for a CU of a picture that can contain intra-predicted CUs and inter-predicted CUs. For a non-skip-mode block, the decoder (700) combines the prediction (758) with reconstructed residual values to produce the reconstruction (738) of the content from the video signal. For a skip-mode block, the decoder (700) uses the values of the prediction (758) as the reconstruction (738).

To reconstruct the residual for a non-skip-mode block, the scaler/inverse transformer (735) receives and processes the quantized transform coefficient data (732). In the scaler/inverse transformer (735), a scaler/inverse quantizer performs inverse scaling and inverse quantization on the quantized transform coefficients. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof).

For intra-picture prediction, the values of the reconstruction (738) can be fed back to the intra-picture predictor (745). For inter-picture prediction, the values of the reconstruction (738) can be further filtered. In the merger/filter(s) (765), the decoder (700) merges content from different tiles into a reconstructed version of the picture. The decoder (700) selectively performs deblock filtering and SAO filtering according to the filter control data (762) and rules for filter adaptation, so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the decoder (700) or a syntax indication within the encoded bitstream data. The decoded picture buffer (770) buffers the reconstructed current picture for use in subsequent motion-compensated prediction.

The decoder (700) can also include a post-processing filter. The post-processing filter (708) can include de-ringing filtering, adaptive Wiener filtering, film-grain reproduction filtering, SAO filtering or another kind of filtering.

In some example implementations, BV values are signaled to the decoder (700) for intra BC prediction, and the decoder (700) need not include a hash table. Alternatively, for intra BC prediction using hash values, the intra-picture predictor (745) determines a reconstruction block for a current block using a signaled hash value for the current block.

Figure 8:
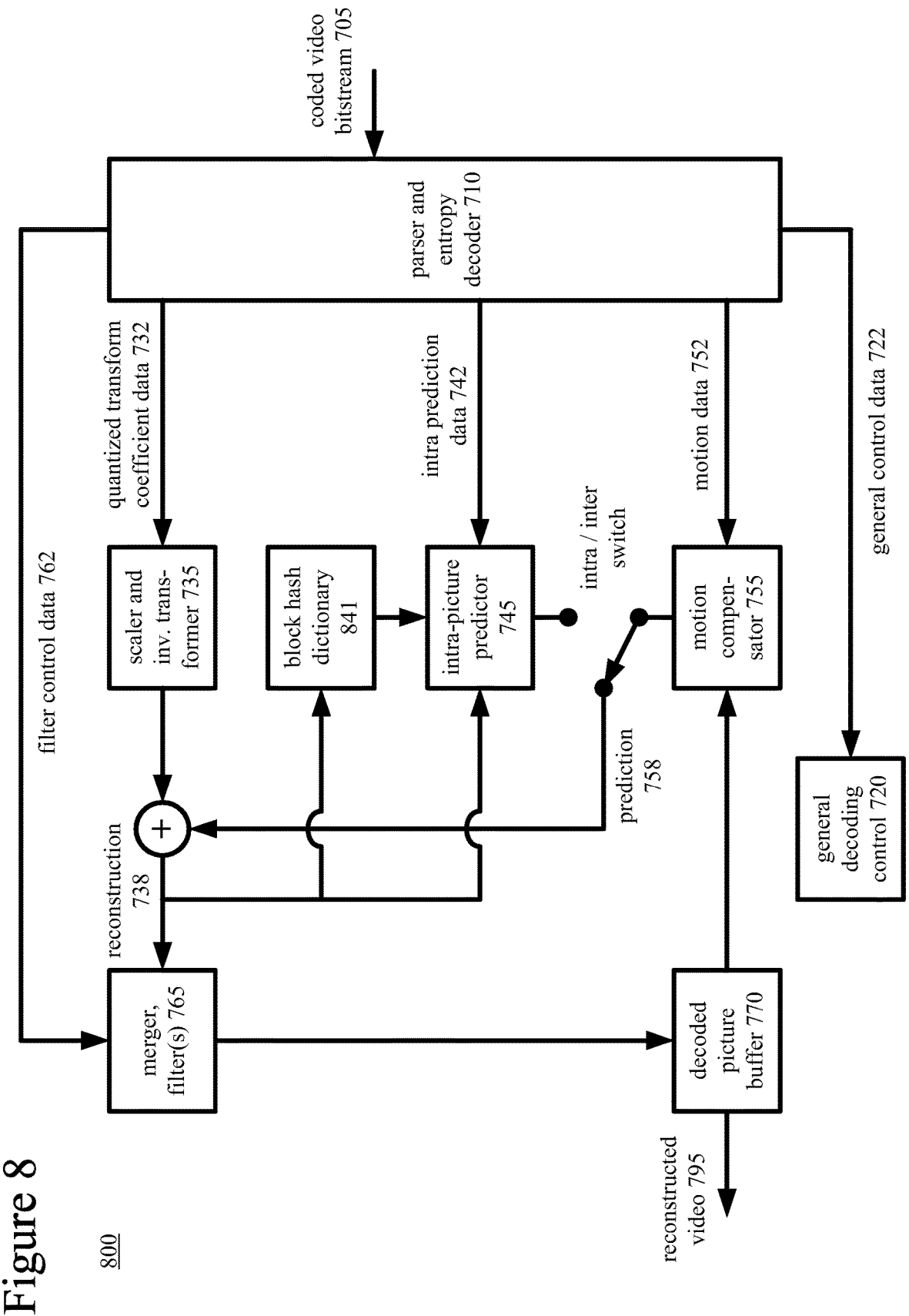
FIG. 8 is a diagram illustrating a second example video decoder in conjunction with which some described embodiments can be implemented.

FIG. 8 shows a generalized video decoder (800) that uses a hash table for intra BC prediction. In most respects, the modules of the decoder (800) are identical to the modules of the decoder (700) shown in FIG. 7, and the same reference numerals are used in FIG. 8 for such modules. A block hash dictionary (841) is added in FIG. 8, however. The block hash dictionary (841) is a data structure that organizes candidate block values according to hash value. In FIG. 8, the block hash dictionary (841) stores hash values determined by applying hash functions to reconstructed sample values. (This assumes use of an encoder (500) such as shown in FIGS. 5a and 5b, which computes hash values from reconstructed sample values as opposed to input sample values.) The intra-picture prediction predictor (745) receives intra prediction data (742), which includes hash values for intra BC prediction. The intra-picture predictor (745) uses a block hash dictionary (841) to find the reconstruction block for a signaled hash value. The values of the reconstruction (738) can be fed back to the intra-picture predictor (745) and used to update the block hash dictionary (841).

Depending on implementation and the type of decompression desired, modules of a decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (700, 800). The relationships shown between modules within the decoder (700, 800) indicate general flows of information in the decoder; other relationships are not shown for the sake of simplicity.

VII. Hash Table Construction and Availability Checking for Hash-Based Block Matching.

This section presents various features of hash table construction and availability checking for hash-based block matching. Some of the features speed up hash table construction by retaining intermediate hash values and/or performing hierarchical hashing. Other features reduce hash table size by screening out candidate blocks with certain patterns when constructing a hash table. Still other features relate to availability checking for reference regions during block vector ("Bv") estimation that uses a hash table.

In particular, the described innovations can improve rate-distortion performance when encoding certain "artificially" created video content such as screen-capture content. Screen-capture content typically includes repeated structures (e.g., graphics, text characters), which provide opportunities for intra BC prediction to improve performance. Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0). Common scenarios for encoding/decoding of screen-capture content include remote desktop conferencing and encoding/decoding of graphical overlays on natural video or other "mixed content" video.

A. Intra BC Prediction Mode and BV Values—Introduction.

For intra BC prediction, the sample values of a current block of a picture are predicted using sample values in the same picture. A BV value indicates a displacement from the current block to a region of the picture (the "reference region") that includes the sample values used for prediction. The reference region provides predicted values for the current block. The sample values used for prediction are previously reconstructed sample values, which are thus available at the encoder during encoding and at the decoder during decoding. The BV value is signaled in the bitstream, and a decoder can use the BV value to determine the reference region of the picture to use for prediction, which is also reconstructed at the decoder. Intra BC prediction is a form of intra-picture prediction—intra BC prediction for a block of a picture does not use any sample values other than sample values in the same picture.

Figure 9:
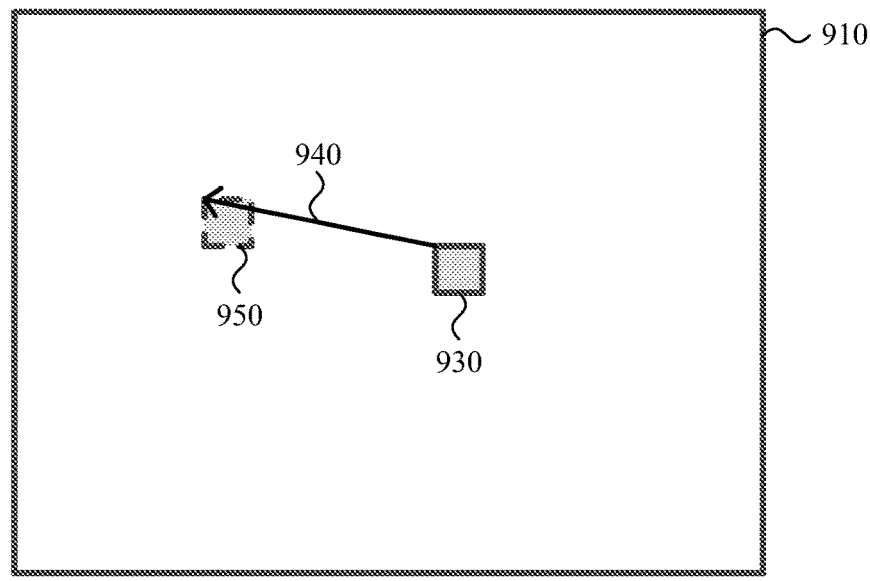
FIGS. 9 and 10 are diagrams illustrating intra BC prediction for a block of a frame and candidate blocks for the block in block matching.

FIG. 9 illustrates intra BC prediction for a current block (930) of a current frame (910). The current block can be a coding block ("CB") of a coding unit ("CU"), prediction block ("PB") of a prediction unit ("PU"), transform block ("TB") of a transform unit ("TU") or other block. The size of the current block can be 64×64, 32×32, 16×16, 8×8 or some other size. More generally, the size of the current block is m×n, where each of m and n is a whole number, and where m and n can be equal to each other or can have different values. Thus, the current block can be square or rectangular, or even a single column or row of sample values. Alternatively, the current block can have some other shape (e.g., triangle, hexagon, arbitrary shape, or an area of a coded video object with a non-rectangular shape).

The BV (940) indicates a displacement (or offset) from the current block (930) to a reference region (950) of the picture that includes the sample values used for prediction. The reference region (950) indicated by the BV (940) is sometimes termed the "matching block" for the current block (930). The matching block can be identical to the current block (930), or it can be an approximation of the current block (930). Suppose the top-left position of a current block is at position $(x_0, y_0)$ in the current frame, and suppose the top-left position of the reference region is at position $(x_1, y_1)$ in the current frame. The BV indicates the displacement $(x_1-x_0, y_1-y_0)$. For example, if the top-left position of the current block is at position (256, 128), and the top-left position of the reference region is at position (126, 104), the BV value is (−130, −24). In this example, a negative horizontal displacement indicates a position to the left of the current block, and a negative vertical displacement indicates a position above the current block.

Intra BC prediction can improve coding efficiency by exploiting redundancy (such as repeated patterns inside a frame) using BC operations. Finding a matching block for a current block can be computationally complex and time consuming, however, considering the number of candidate blocks that the encoder may evaluate. Comparing the sample values of a current block to the sample values of a single candidate block in sample-wise block matching can involve thousands of operations. For example, comparing the sample values of a 64×64 current block and 64×64 candidate block can involve 64×64=4096 comparison operations (e.g., subtraction operations) as well as operations to tally results of the comparison operations.

Figure 10:
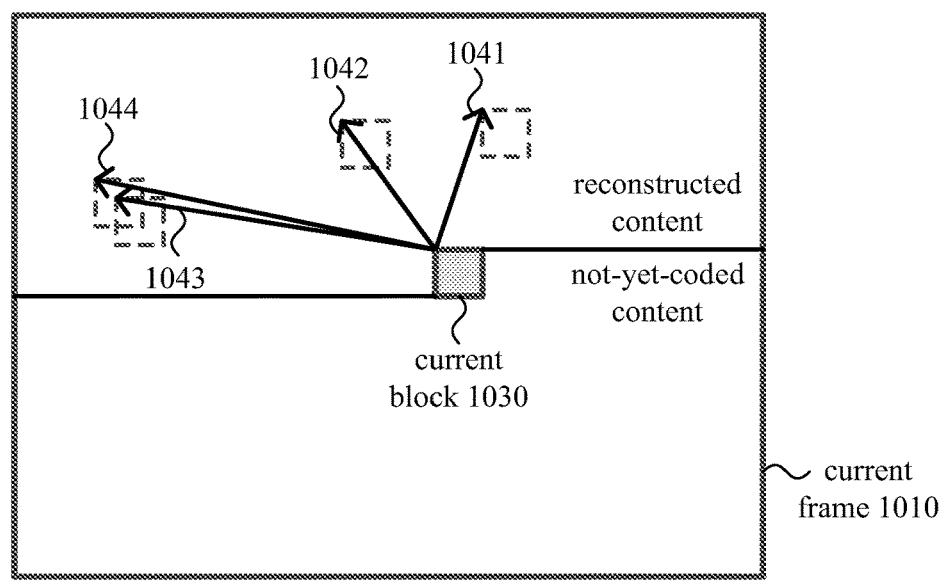

FIG. 10 shows some of the candidate blocks for a current block (1030) of a current frame (1010) in block matching operations. Four BVs (1041, 1042, 1043, 1044) indicate displacements for four candidate blocks. The candidate blocks can be anywhere within the reconstructed content of the frame (1010). (Blocks are generally coded from left-to-right, then from top-to-bottom.) A candidate block can overlap with other candidate blocks, as shown for the candidate blocks indicated by the BVs (1043, 1044). The computational complexity of BV estimation is especially problematic when the search range for BV values encompasses all of the previously reconstructed areas of a frame, due to the large number of candidate blocks against which a current block is compared.

FIG. 11 illustrates the number of candidate blocks for block matching for a block (1130) of an example frame (1110) having a width of 1920 sample values and a height of 1080 sample values. The current block (1130) is a 64×64 block at position (896, 576) in the frame (1110), and the candidate blocks are also 64×64 blocks. The search area for the candidate blocks is shown with hatched lines in FIG. 11. Any 64×64 block within the search area can be considered a candidate block, which assumes no overlap between a candidate block and current block. The number of candidate blocks within the frame (1110) is given by: $(yposition_{block}-height_{block}+1) \times (width_{frame}-width_{block}+1)+(xposition_{block}-width_{block}+1) \times height_{block}$, where $xposition_{block}$ and $yposition_{block}$ indicate the position of the current block (1130) in the frame (1110), $width_{frame}$ is the width of the frame (1110) and $width_{block}$ and $height_{block}$ are the dimensions of the current block (1130). For the values shown in FIG. 11, there are (576−64+1)×(1920−64+1)+(896−64+1)×64=1,005,593 candidate blocks in the search area for the current block (1130). Performing sample-wise block matching operations between the current block (1130) and even a small set of the possible candidate blocks would be very computationally intensive.

If block hash values are computed for candidate blocks of an entire frame, the number of operations is even higher. For example, if an encoder builds a hash table for all of the 8×8 candidate blocks in a 1920×1080 sample frame, the encoder calculates over 2 million hash values. Similarly, if the search range includes another previously reconstructed frame (for motion estimation), the number of operations is potentially very high. For example, for motion estimation that involves a single reference frame (or multiple reference frames), sample-wise block matching can consume a very large number of operations, due to the large number of candidate blocks against which a current block is compared.

B. Hash-Based Block Matching.

When an encoder uses hash-based block matching, the encoder determines a hash value for each of multiple candidate blocks. A hash table stores the hash values for the multiple candidate blocks. The encoder also determines a hash value for a current block by the same hashing approach, and then searches the hash table for a matching hash value. If two blocks are identical, their hash values are the same. Using hash values, an encoder can quickly and efficiently identify candidate blocks that have the same hash value as the current block, and filter out candidate blocks that have different hash values. The encoder can then further evaluate those candidate blocks having the same hash value as the current block. (Different blocks can have the same hash value. Among the candidate blocks with the same hash value, the encoder can identify a candidate block that matches the current block.) Hash-based block matching typically speeds up the process of finding a matching block for a current block.

In some example implementations, the candidate blocks considered in hash-based block matching include input sample values. That is, the candidate blocks are part of an input version of a picture. Hash values for the candidate blocks are determined from the input sample values. During hash-based block matching, the encoder determines the hash value for a current block using input sample values. The encoder compares it (or otherwise uses the hash value) against the hash values determined from input sample values for candidate blocks. Even so, reconstructed sample values from the matching block are used to represent the current block. Thus, BC prediction operations still use reconstructed sample values.

Alternatively, the candidate blocks considered in hash-based block matching include reconstructed sample values. That is, the candidate blocks are part of previously encoded then reconstructed content in a picture. Hash values for the candidate blocks are determined from the reconstructed sample values. During hash-based block matching, the encoder determines the hash value for a current block using input sample values. The encoder compares it (or otherwise uses the hash value) against the hash values determined from reconstructed sample values for candidate blocks. The hash table grows during encoding, as more candidate blocks are added to the reconstructed content of a picture and hence made available for use in hash-based block matching for later blocks of the picture.

FIG. 12 illustrates hash values (1200) for candidate blocks B(x, y) in hash-based block matching, where x and y indicate horizontal and vertical coordinates, respectively, for the top-left position of a given candidate block. The candidate blocks have hash values determined using a hash function h( ). For a candidate block B(x, y) in a search range, the encoder determines a hash value h(B) for the candidate block. The encoder can determine hash values for all candidate blocks in the search range. Or, as described below (see section VII.G), the encoder can screen out candidate blocks with certain patterns.

In general, the hash function h( ) yields n possible hash values, designated $h_0$ to $h_{n-1}$. For a given hash value, the candidate blocks with that hash value are grouped. For example, in FIG. 12, the candidate blocks B(1266, 263), B(1357, 365), B(1429, 401), B(502, 464), . . . have the hash value $h_0$. Groups can include different numbers of candidate blocks. For example, in FIG. 12, the group for hash value $h_4$ includes a single candidate block, while the group for hash value $h_0$ includes more than four candidate blocks.

In this way, the possible candidate blocks are distributed into n categories. For example, if the hash function h( ) produces 12-bit hash values, the candidate blocks in FIG. 9 are split into $2^{12}$=4,096 categories, with each category including an average of 245 candidate blocks. In some implementations, the number of candidate blocks per hash value can be further reduced by eliminating redundant, identical blocks with that hash value, or by screening out candidate blocks with certain patterns. Also, in some implementations, the encoder can iteratively winnow down the number of candidate blocks using different hash functions.

The hash function h( ) can be a cryptographic hash function, cyclic redundancy check ("CRC") function or other hash function. Some types of hash function (e.g., CRC function) map similar blocks to different hash values, which may be efficient when seeking a matching block that exactly corresponds with a current block. Other types of hash function (e.g., locality-sensitive hash function) map similar blocks to the same hash value, which may be suitable when a matching block can approximate the current block. Example hash functions are described below (see section VII.J).

A hash function h( ) can be applied in multiple stages, as described below (see sections VII.E and VII.F). For example, the encoder can determine intermediate hash values in a first stage for sections (e.g., rows, columns, sub-blocks) of a block, then hash the intermediate hash values in a second stage to determine a block hash value for the block. Further, the encoder can hash the block hash values for blocks to determine a super-block hash value for a larger block (super-block) that includes the blocks. Retaining intermediate hash values and using hierarchical hashing operations when computing block hash values can speed up the process of constructing a hash table. The operations for the hashing function h( ) applied at different stages can be the same or different in the different stages, so long as the hashing approach is consistent during hash table construction and hash-based block matching.

During hash-based block matching, with the hash function h( ), the encoder determines the hash value for the current block $B_{current}$. In FIG. 12, the hash value $h(B_{current})$ is $h_3$. Using the hash value of the current block, the encoder can identify candidate blocks that have the same hash value (shown in outlined box in FIG. 12), and filter out the other candidate blocks. When a hash function maps similar blocks to different hash values, the identified candidate blocks (same hash value as the current block) include blocks that might be identical to the current block. When a hash function maps similar blocks to the same hash value, the identified candidate blocks (same hash value as the current block) include blocks that might be identical to the current block or might be close approximations of the current block. Either way, from these identified candidate blocks, the encoder can identify a matching block for the current block (e.g., using sample-wise block matching operations).

Overall, since hash value comparisons are much simpler than sample-wise block matching, hash-based block matching can make the process of evaluating the candidate blocks in a large search range much more efficient. Also, hash values for candidate blocks can be reused in hash-based block matching for different blocks within a picture during encoding. In some cases, the cost of computing the hash values for the candidate blocks can be amortized across hash-based block matching operations for the entire picture.

C. Data Structures for Hash-Based Block Matching.

In some example implementations, the encoder uses a data structure that organizes candidate blocks according to their hash values. The data structure can help make hash-based block matching more computationally efficient. The data structure implements, for example, a block hash dictionary or hash table as described herein.

FIG. 13a illustrates an example data structure (1300) that organizes candidate blocks for hash-based block matching. For the hash function h( ) the n possible hash values are $h_0$ to $h_{n-1}$. Candidate blocks with the same hash value are classified in the same candidate block list. A given candidate block list can include zero or more entries. For example, the candidate block list for the hash value $h_2$ has no entries, the list for the hash value $h_6$ has two entries, and the list for the hash value $h_1$ has more than four entries.

An entry($h_i$, k) includes information for the $k^{th}$ candidate block with the hash value $h_i$. As shown in FIG. 13b, an entry in a candidate block list can include the address of a block B(x, y) (e.g., horizontal and vertical coordinates for the top-left position of the block). Or, as shown in FIG. 13c, an entry in a candidate block list can include the address of a block B(x, y) and a hash value from a second hash function, which can be used for iterative hash-based block matching.

During hash-based block matching for a current block (for BV estimation or motion estimation), the encoder determines the hash value of the current block $h(B_{current})$. The encoder retains the candidate block list with the same hash value and rules out the other n−1 lists. To select the matching block, the encoder can compare the current block with the candidate block(s), if any, in the retained candidate block list. Thus, by a simple lookup operation using the hash value $h(B_{current})$, the encoder can eliminate (n−1)/n of the candidate blocks (on average), and focus on the remaining 1/n candidate blocks (on average) in the retained list, significantly reducing the number of sample-wise block matching operations.

The data structure can be considered a dynamic dictionary in which each entry represents a candidate block. When hash values for candidate blocks are determined from input sample values, the data structure grows as block hash values are computed for more blocks. The number of blocks represented with block hash values can vary, depending on how many blocks the encoder screens out. Also, the number of blocks that have a given block hash value will change from picture-to-picture. When hash values for candidate blocks are determined from reconstructed sample values, the data structure grows during encoding, as more candidate blocks are added to the reconstructed content of a picture and hence made available for use in hash-based block matching for later blocks of the picture. In particular, after a current block is encoded, new candidate blocks that overlap the just-encoded current block are available for use in hash-based block matching. For example, after an 8×8 block is encoded, the 8×8 block is available as a candidate block. The seven 8×8 blocks located at incremental shifts of one sample position left of the current block are also available as candidate blocks. And, for each of the seven rows at incremental shifts of one sample position up from the current block, eight 8×8 blocks are available as candidate blocks. Thus, entries for up to 8×8=64 new candidate blocks can be added to the data structure after a current 8×8 block is encoded. Similarly, after a current 64×64 block is encoded, up to 4096 entries for candidate blocks can be added to the data structure.

Different data structures can be used for different sizes of blocks. For example, one data structure includes hash values for 8×8 candidate blocks, a second data structure includes hash values for 16×16 candidate blocks, a third data structure includes hash values for 32×32 candidate blocks, and so on. The data structure used during hash-based block matching depends on the size of the current block. After a current block of any size is encoded, all data structures can be updated, where new candidate blocks have been made available for hash-based block matching.

Alternatively, a single, unified data structure can be used for different sizes of blocks. A hash function can produce an n-bit hash value, where m bits of the n-bit hash value indicate a hash value among the possible blocks of a given block size according to an m-bit hash function, and the remaining n−m bits of the n-bit hash value indicate the given block size. For example, the first two bits of a 14-bit hash function can indicate a block size, while the remaining 12 bits indicate a hash value according to a 12-bit hash function. Or, a hash function can produce an m-bit hash value regardless of the size of the block, and an entry for a candidate block in the data structure stores information indicating the block size for the candidate block, which can be used in hash-based block matching. Section VII.J includes additional details about example hash functions whose hash values can be organized in a single, unified data structure.

For a high-resolution picture, the data structure can store information representing a very large number of candidate blocks. To reduce the amount of memory used for the data structure, the encoder can eliminate redundant values. For example, the encoder can avoid adding identical blocks to the data structure by using the following approach. Before adding a new candidate block $B_{new}$ to the data structure, the encoder checks if there is already a candidate block represented in the data structure that is identical to $B_{new}$. For this check, the encoder can determine the hash value for the new candidate block, then further evaluate those candidate blocks represented in the data structure that have the same hash value. (Candidate blocks with different hash values are necessarily different than the new candidate block $B_{new}$.) If the data structure already includes a candidate block that is identical to $B_{new}$, then $B_{new}$ is added instead of the previous identical candidate block, or the previous identical candidate block is simply retained. If the data structure does not include a candidate block that is identical to $B_{new}$, then $B_{new}$ is added to the data structure.

In general, reducing the size of the data structure by eliminating identical blocks can hurt coding efficiency. When multiple identical candidate blocks are potentially available, they may result in different BV values for a current block, where one of the BV values can be encoded with fewer bits than the other(s). Also, candidate blocks that have identical original sample values (and hence the same hash value) may have different reconstructed values, in which case using one of the candidate blocks may result in better prediction than using the other(s). If only one of the multiple identical candidate blocks is retained in the data structure, the encoder might not learn of a BV value that would be more efficiently encoded for the current block, or might select a block whose reconstructed values lead to inferior prediction for the current block. Thus, by deciding whether to eliminate identical blocks, the encoder can trade off memory size for the data structure and coding efficiency.

The encoder can also screen out candidate blocks, as described below (see section VII.G), depending on the content of the blocks.

D. Iterative Hash-Based Block Matching.

When the encoder uses a single hash function with n possible hash values, the encoder can rule out n−1 lists of candidate blocks based on the hash value of a current block, but the encoder may still need to perform sample-wise block matching operations for the remaining candidate block(s), if any, for the list with the matching hash value. Also, when updating a data structure that organizes candidate blocks, the encoder may need to perform sample-wise block matching operations to identify identical blocks. Collectively, these sample-wise block matching operations can be computationally intensive.

Therefore, in some example implementations, the encoder uses iterative hash-based block matching. Iterative hash-based block matching can speed up the block matching process and also speed up the process of updating a data structure that organizes candidate blocks.

Iterative hash-based block matching uses multiple hash values determined with different hash functions. For a block B (current block or candidate block), in addition to the hash value h(B), the encoder determines another hash value h'(B) using a different hash function h( ). With the first hash value $h(B_{current})$ for a current block, the encoder identifies candidate blocks that have the same hash value for the first hash function h( ). To further rule out some of these identified candidate blocks, the encoder uses a second hash value h'($B_{current}$) for the current block, which is determined using a different hash function. The encoder compares the second hash value h'($B_{current}$) with the second hash values for the previously identified candidate blocks (which have same first hash value), in order to filter out more of the candidate blocks. A hash table tracks hash values for the candidate blocks according to the different hash functions.

In the example of FIG. 13a, if h($B_{current}$)=$h_3$, the encoder selects the candidate blocks with entry(3, 0), entry (3, 1), entry(3, 2), entry(3, 3), ... for further refinement. As shown in FIG. 13c, for a candidate block B, an entry includes a block address and a second hash value h'(B) from the hash function h( ). The encoder compares the second hash value h'($B_{current}$) for the current block with the second hash values h'(B) for the respective candidate blocks with entry(3, 0), entry (3, 1), entry(3, 2), entry(3, 3), . . . . Based on results of the second hash value comparisons, the encoder can rule out more of the candidate blocks, leaving candidate blocks, if any, that have first and second hash values matching h($B_{current}$) and h'($B_{current}$), respectively. The encoder can perform sample-wise block matching on any remaining candidate blocks to select a matching block.

FIGS. 14a-14c show another example of iterative hash-based block matching that uses a different data structure. The data structure (1400) in FIG. 14a organizes candidate blocks by first hash value from a first hash function h( ), which has n1 possible hash values. The data structure (1400) includes lists for hash values from $h_0$ . . . $h_{n1-1}$. In the example, the encoder determines a first hash value h($B_{current}$)=$h_2$ for the current block, and selects the list for $h_2$ from the structure (1400).

As shown in FIG. 14b, the list (1410) for $h_2$ includes multiple lists that further organize the remaining candidate blocks by second hash value from a second hash function h'( ), which has n2 possible hash values. The list (1410) includes lists for hash values from h'$_0$ . . . h'$_{n2-1}$, each including entries with block addresses (e.g., horizontal and vertical coordinates for top-left positions of respective candidate blocks), as shown for the entry (1420) in FIG. 14c. In the example, the encoder determines a second hash value h'($B_{current}$)=h'$_0$ for the current block, and selects the list for h'$_0$ from the list (1410). For the candidate blocks in the list for h'$_0$, the encoder can perform sample-wise block matching to select a matching block. In this example, the lists for the second hash values are specific to a given list for the first hash value. Alternatively, there is one set of lists for the second hash values, and the encoder identifies any candidate blocks that are (1) in the matching list for the first hash values and also (2) in the matching list for the second hash values.

Aside from hash-based block matching, the second hash function h'( ) can be used to simplify the process of updating a data structure that organizes candidate blocks. For example, when the encoder checks whether a new candidate block is identical to a candidate block already represented in the data structure, the encoder can use multiple hash values with different hash functions to filter out non-identical blocks. For remaining candidate blocks, the encoder can perform sample-wise block matching to identify any identical block.

In the preceding examples, the iterative hash-based block matching and updating use two different hash functions. Alternatively, the encoder uses three, four or more hash functions to further speed up hash-based block matching or filter out non-identical blocks, and thereby reduce the number of sample-wise block matching operations.

Alternatively, for a low-complexity encoder, the encoder can skip sample-wise block matching operations when hash values match. For hash functions with a large number of possible hash values, there is a high probability that two blocks are identical if all hash values for the two blocks match. In particular, instead of using sample-wise block matching to confirm that blocks are identical when updating the data structure, the encoder can rely on hash value comparisons to evaluate whether blocks are identical. The encoder removes a candidate block from the data structure (or does not add a new candidate block) if all hash values match for the two blocks, under the assumption that the new candidate block and existing candidate block are identical. If a hash value does not match, the new candidate block is added to the data structure. This may result in the exclusion of some non-identical blocks from the data structure, but sample-wise block matching operations are avoided.

E. Hash Table Construction with Retained Intermediate Hash Values.

The complexity of building a hash table for hash-based block matching can be reduced by retaining and reusing intermediate hash values. An encoder splits candidate blocks into sections. A candidate block can be a square block or rectangular block (even a single row or column of sample values), or have some other shape (e.g., triangle, hexagon). The sections of a candidate block can be rows, columns, sub-blocks or other portions (e.g., triangles, hexagons, or arbitrary shapes) of the candidate block. The encoder computes intermediate hash values for sections of a candidate block and computes a block hash value for the candidate block using the intermediate hash values for its sections. For at least some of the sections, the encoder retains the intermediate hash values, which are reused in computing block hash values for other candidate blocks.

Figure 15A:
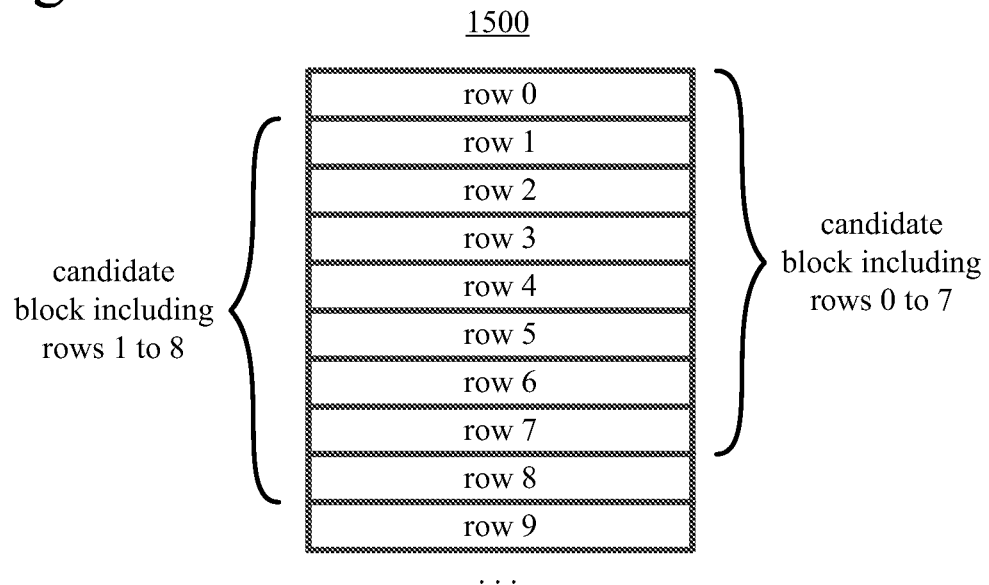
FIGS. 15a and 15b are diagrams illustrating hashing of intermediate hash values for rows of candidate blocks during hash table construction.
Figure 15B:
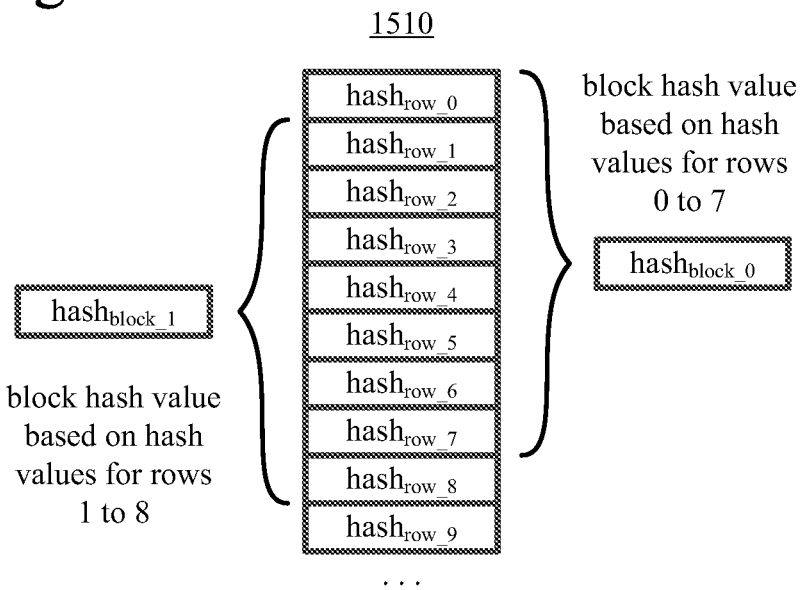

FIGS. 15a and 15b illustrate hashing of intermediate hash values for rows of candidate blocks during hash table construction. FIG. 15a shows rows (1500) of sample values for several 8×8 blocks of a frame, where each row includes eight sample values. A first candidate block includes rows 0 to 7, a second candidate block includes rows 1 to 8, a third candidate block includes rows 2 to 9, and so on. The encoder calculates a hash value for each of the rows. These row hash values are intermediate hash values, in that they are not directly used in hash-based block matching, but instead are used to compute block hash values that are used in hash-based block matching. The encoder calculates an intermediate hash value hash$_{row\_0}$ for row 0, an intermediate hash value hash$_{row\_1}$ for row 1, and so on.

As shown in FIG. 15b, the encoder can group the intermediate hash values as a one-dimensional array (1510), which includes an entry having an intermediate hash value for each of the rows. For the candidate block (block 0) that includes rows 0 to 7, the encoder computes a block hash value hash$_{block\_0}$ by hashing the eight intermediate hash values for rows 0 to 7. For a candidate block (block 1) that is vertically offset by one sample, the encoder computes a block hash value hash$_{block\_1}$ by hashing the eight intermediate hash values for rows 1 to 8. For block 1, the encoder can reuse the intermediate hash values for rows 1 to 7, which were previously calculated for block 0. In this way, block hash values can be calculated successively for overlapping candidate blocks that are offset by one sample vertically. Thus, for any candidate block below block 0, the encoder need not calculate intermediate hash values for seven of the eight rows of the candidate block, which can significantly reduce the computational complexity of hash table construction.

For an entire frame, the encoder can compute block hash values as follows. The encoder computes block hash values successively for a block column of vertically overlapping candidate blocks that are offset by a single sample vertically. The encoder repeats the process on a block column-by-block column basis for block columns that are offset by a single sample horizontally.

Alternatively, the rows have some other number of sample values and/or the candidate blocks have some other number of rows. For example, the candidate blocks are 4×4 blocks, where each candidate block includes four rows each having four sample values. Or, the candidate blocks are 16×16 blocks, where each candidate block includes sixteen rows each having sixteen sample values. Or, the candidate blocks are 4×8 blocks, where each candidate block includes four rows each having eight sample values. Or, the candidate block has some other size.

Figure 16A:
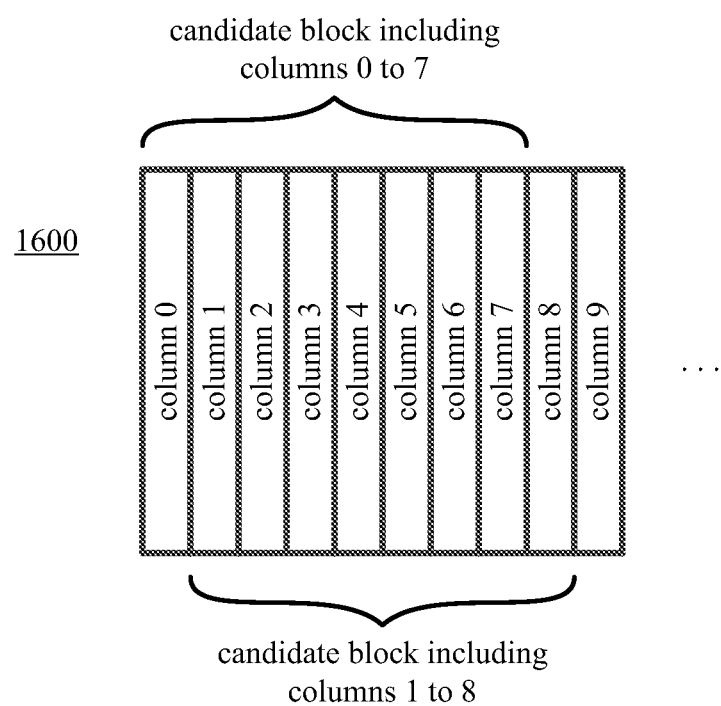
FIGS. 16a and 16b are diagrams illustrating hashing of intermediate hash values for columns of candidate blocks during hash table construction.
Figure 16B:
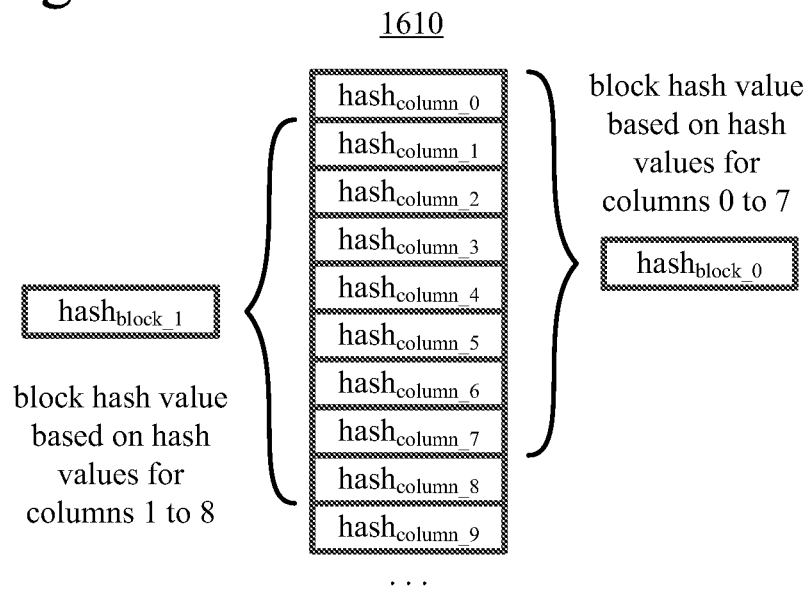

FIGS. 16a and 16b illustrate hashing of intermediate hash values for columns of candidate blocks during hash table construction. FIG. 16a illustrates columns (1600) of sample values for several 8×8 blocks of a frame, where each column includes eight sample values. A first candidate block includes columns 0 to 7, a second candidate block includes columns 1 to 8, a third candidate block includes columns 2 to 9, and so on. The encoder calculates a hash value for each of the columns. These column hash values are intermediate hash values. That is, the encoder calculates an intermediate hash value $hash_{column\_0}$ for column 0, an intermediate hash value $hash_{column\_1}$ for column 1, and so on.

As shown in FIG. 16b, the encoder can group the intermediate hash values as a one-dimensional array (1610), which includes an entry having an intermediate hash value for each of the columns. For the candidate block (block 0) that includes columns 0 to 7, the encoder computes a block hash value $hash_{block\_0}$ by hashing the eight intermediate hash values for columns 0 to 7. For a candidate block (block 1) that is horizontally offset by one sample, the encoder computes a block hash value $hash_{block\_1}$ by hashing the eight intermediate hash values for columns 1 to 8. For block 1, the encoder can reuse the intermediate hash values for columns 1 to 7, which were previously calculated for block 0. Block hash values can be calculated successively for overlapping candidate blocks that are offset by one sample horizontally. Thus, for any candidate block after block 0, the encoder need not calculate intermediate hash values for seven of the eight columns of the candidate block, which can significantly reduce the computational complexity of hash table construction.

For an entire frame, the encoder can compute block hash values as follows. The encoder computes block hash values successively for a block row of horizontally overlapping candidate blocks that are offset by a single sample horizontally. The encoder repeats the process on a block row-by-block row basis for block rows that are offset by a single sample vertically.

Alternatively, the columns have some other number of sample values and/or the candidate blocks have some other number of columns. For example, the candidate blocks are 4×4 blocks, 16×16 blocks, 4×8 blocks, or blocks with some other size.

Figure 17A:
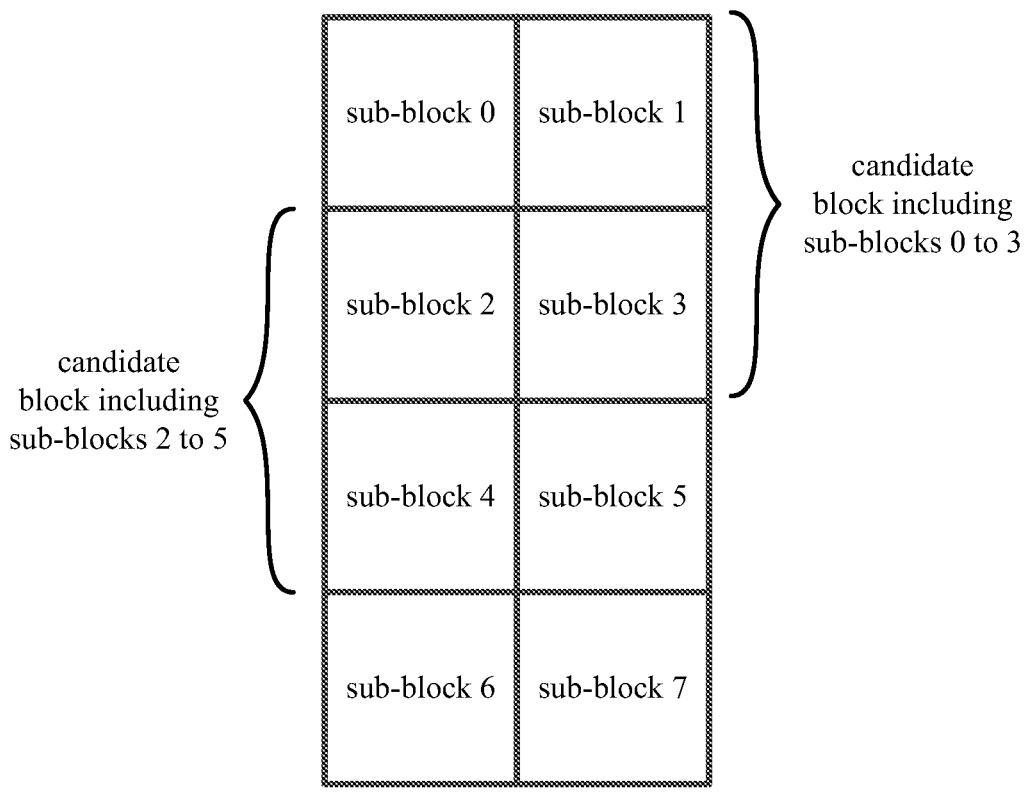
FIGS. 17a and 17b are diagrams illustrating hashing of intermediate hash values for sub-blocks of candidate blocks during hash table construction.
Figure 17B:
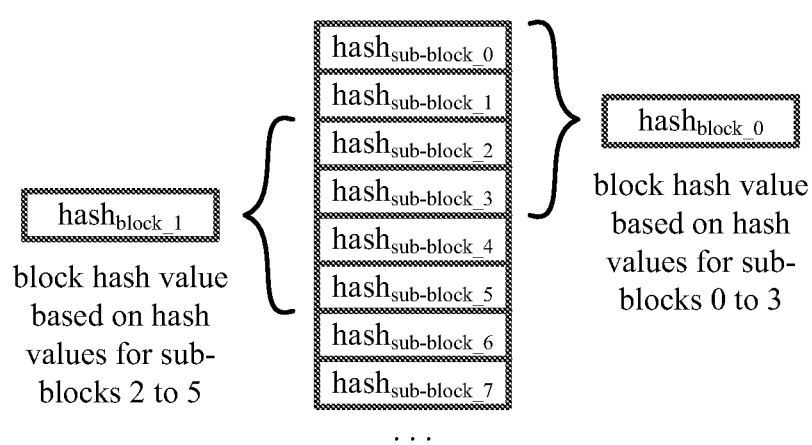

FIGS. 17a and 17b illustrate hashing of intermediate hash values for sub-blocks of candidate blocks during hash table construction. FIG. 17a shows sub-blocks (1700) of sample values for several 8×8 blocks of a frame. A first candidate block includes 4×4 sub-blocks 0 to 3. A second candidate block includes sub-blocks 2 to 5, a third candidate block includes sub-blocks 4 to 7, and so on. The encoder calculates a hash value for each of the sub-blocks. These sub-block hash values are intermediate hash values. The encoder calculates an intermediate hash value $hash_{sub\text{-}block\_0}$ for sub-block 0, an intermediate hash value $hash_{sub\text{-}block\_1}$ for sub-block 1, and so on. The sub-block hash value for a given sub-block can be computed from sample values of the sub-block or from intermediate hash values of rows or columns of the sub-block.

As shown in FIG. 17b, the encoder can group the intermediate hash values for sub-blocks as a one-dimensional array (1710), which includes an entry having an intermediate hash value for each of the sub-blocks. For the candidate block (block 0) that includes sub-blocks 0 to 3, the encoder computes a block hash value $hash_{block\_0}$ by hashing the four intermediate hash values for sub-blocks 0 to 3. Block hash values can be calculated successively for overlapping candidate blocks that are offset by an integer number of sub-blocks vertically and/or an integer number of sub-blocks horizontally. For example, for a candidate block (block 1) that is vertically offset by one sub-block, the encoder computes a block hash value $hash_{block\_1}$ by hashing the four intermediate hash values for sub-blocks 2 to 5. For candidate block 1, the encoder can reuse the intermediate hash values for sub-blocks 2 and 3, which were previously calculated for candidate block 0. Thus, in many case, the encoder need not calculate intermediate hash values for many of the sub-blocks of a candidate block, which can significantly reduce the computational complexity of hash table construction.

For an entire frame, the encoder can compute block hash values as follows. The encoder computes block hash values successively for a block column of vertically overlapping candidate blocks that are offset by a single sub-block vertically, repeating the process on a block column-by-block column basis for block columns that are offset by a single sub-block horizontally. Or, the encoder can compute block hash values successively for a block row of horizontally overlapping candidate blocks that are offset by a single sub-block horizontally, repeating the process on a block row-by-block row basis for block rows that are offset by a single sub-block vertically.

The size of the sub-blocks can be 2×2, 2×4, 4×2, 4×4, 4×8, 8×4, 8×8 or some other size of sub-blocks. In general, the size of sub-blocks relates to the size of a candidate block by a dyadic factor (e.g., ½, ¼ and ⅛) vertically and/or by dyadic factor (e.g., ½, ¼ and ⅛) horizontally. Thus, a candidate block can include 2 sub-blocks, 4 sub-blocks, 8 sub-blocks, 16 sub-blocks, 32 sub-blocks, 64 sub-blocks, or some other number of sub-blocks with intermediate hash values.

Figure 18:
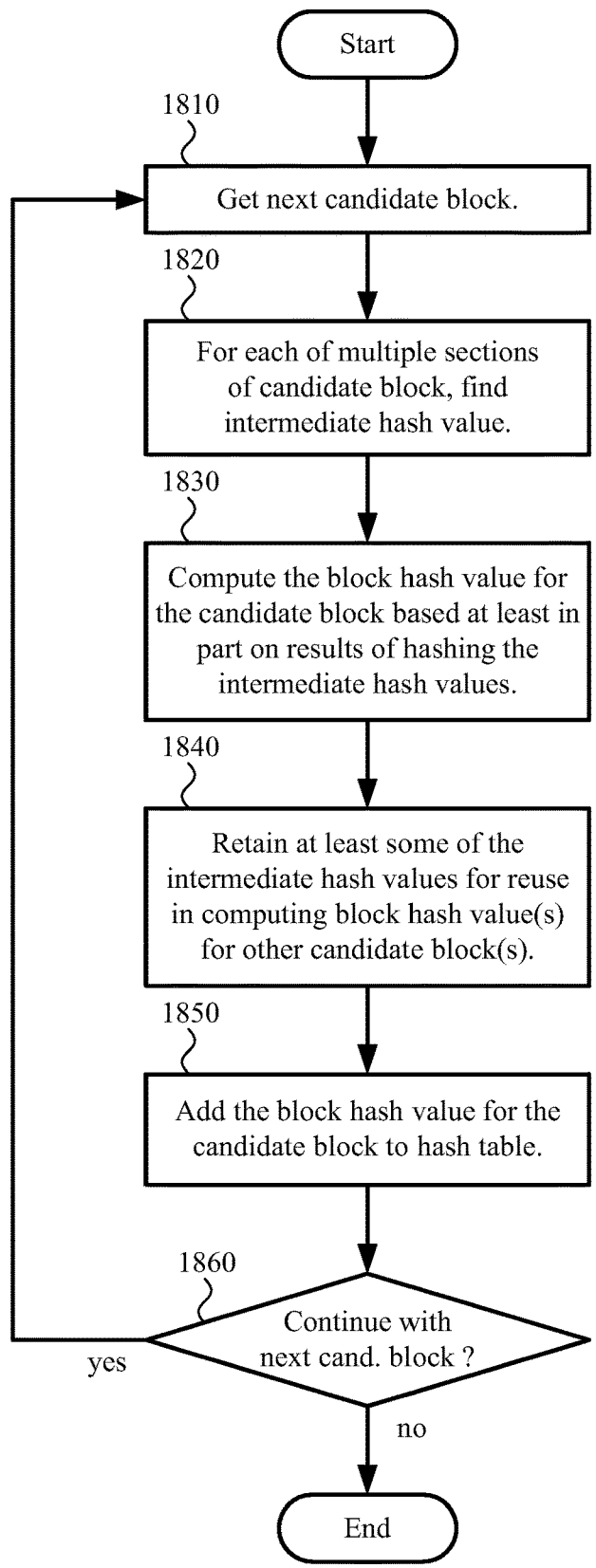
FIG. 18 is a flowchart illustrating a technique for hash table construction with hashing and retention of intermediate hash values.

FIG. 18 shows a technique (1800) for hash table construction with hashing and retention of intermediate hash values. An image encoder or video encoder such as one described with reference to FIG. 3, FIGS. 5a-5b or FIGS. 6a-6b can perform the technique (1800).

For a given candidate block among multiple candidate blocks, the encoder determines a block hash value. Specifically, the encoder gets (1810) the next candidate block to be processed. For each of multiple sections of that candidate block, the encoder finds (1820) an intermediate hash value for the section. The sections can be rows, columns, sub-blocks or some other portions (e.g., triangles, hexagons, or arbitrary shapes) of the given candidate block. If an intermediate hash value has been retained for a given section (e.g., because it was previously computed for another candidate block), the encoder can read the intermediate hash value for the given section from memory. Otherwise, the encoder computes the intermediate hash value for the given section. Example hash functions are described below (see section VII.J). Intermediate hash values can be computed using original sample values or reconstructed sample values for the multiple sections, depending on implementation.

The encoder computes (1830) the block hash value for the candidate block based at least in part on results of hashing the intermediate hash values. For example, the encoder hashes the intermediate hash values. The encoder can use the same hash function when computing the block hash value for the candidate block and when computing intermediate hash values. Or, the encoder can use different hash functions for the block hash value and intermediate hash values. Example hash functions are described below (see section VII.J).

The encoder retains (1840) at least some of the intermediate hash values for reuse in computing block hash value(s) for one or more other candidate blocks among the multiple candidate blocks. The encoder can store the intermediate hash values in a one-dimensional array (as described above in this section) or other data structure.

The encoder adds (1850) for block hash value for the candidate block to a hash table. The hash table can be a data structure organized as described above (see section VII.C) or other data structure.

The encoder determines (1860) whether to continue with the next candidate block. If so, the encoder continues by getting (1810) the next candidate block, finding (1820) intermediate hash values for its sections and computing (1830) the block hash value for the candidate block. In this way, the encoder can determine block hash values for multiple candidate blocks using retained intermediate hash values, which reduces the computational complexity of constructing the hash table.

When the sections of the given candidate block are rows of sample values in the given candidate block, the intermediate hash values are row hash values. At least some of the intermediate hash values can be reused in computing block hash value(s) for candidate block(s) that partially overlap the given candidate block but are vertically offset by an integer number of sample values.

Or, when the sections of the given candidate block are columns of sample values in the given candidate block, the intermediate hash values are column hash values. At least some of the intermediate hash values can be reused in computing block hash value(s) for candidate block(s) that partially overlap the given candidate block but are horizontally offset by an integer number of sample values.

Or, when the sections of the given candidate block are sub-blocks of sample values in the given candidate block, the intermediate hash values are sub-block hash values. At least some of the intermediate hash values can be reused in computing block hash value(s) for candidate block(s) that partially overlap the given candidate block but are offset by an integer number of sub-blocks horizontally and/or vertically.

Block hash values computed as shown in FIG. 18 can in turn be used in computing block hash values for larger candidate blocks (that is, super-block hash values for candidate super-blocks), as described below (see section VII.F). For a candidate super-block that includes multiple candidate blocks, the encoder determines a super-block hash value based at least in part on results of hashing the block hash values for the candidate blocks of the candidate super-block.

The encoder can use a hash table constructed as shown in FIG. 18 for hash-based block matching during BV estimation or motion estimation. For BV estimation, a current picture includes the multiple candidate blocks. The encoder determines a block hash value for a current block of the current picture, then searches the hash table to identify any of the multiple candidate blocks (of the current picture) having a block hash value that matches that of the current block. Or, for motion estimation, a reference picture includes the multiple candidate blocks. The encoder determines a block hash value for a current block of a current picture, then searches the hash table to identify any of the multiple candidate blocks (of the reference picture) having a block hash value that of the current block. For BV estimation or motion estimation, the block hash value for the current block is determined using the same hashing approach as the block hash value for the given candidate block and other block hash values in the hash table.

F. Hash Table Construction with Hierarchical Hashing.

In some example implementations, the size of a current block that is encoded can vary. For example, the current block can be a 4×4, 8×8, 16×16, 32×32 or 64×64 block, or other square block. Or, the current block can be rectangular (e.g., 4×8, 8×4, 8×16, 16×8, 16×32, 32×16, 32×64 or 64×32), or even a single row or column of sample values. Or, the current block can be a triangle, hexagon or arbitrary shape. For hash-based block matching in these implementations, an encoder determines block hash values for different sizes of candidate blocks (same possible sizes as the current block), since the current block can have any of those different sizes. For example, the encoder determines block hash values for 4×4 candidate blocks, for 8×8 candidate blocks, for 16×16 candidate blocks, for 32×32 candidate blocks, for 64×64 candidate blocks, and so on.

The encoder can calculate block hash values in a hierarchical manner. For example, the encoder determines a block hash value for a block by hashing the sub-block hash values of sub-blocks of the block. Or, the encoder determines a super-block hash value for a super-block by hashing the block hash values of blocks of the super-block. The terms sub-block, block and super-block are relative terms indicating blocks of different sizes. A super-block includes blocks, and a block includes sub-blocks. More generally, a super-block or sub-block is an example of a block. Similarly, a sub-block hash value or super-block hash value is an example of a block hash value. The terms sub-block and super-block are used herein to indicate hierarchical relationships between blocks of different sizes.

For example, suppose the sub-blocks (1700) shown in FIG. 17*a* are 4×4 blocks. Four of the 4×4 blocks can be organized as an 8×8 block. To compute a block hash value for the 8×8 block, the encoder can hash the block hash values (sub-block hash values) for the 4×4 blocks (sub-blocks) of the 8×8 block. In this example, a given sub-block can itself be a candidate block for hash-based block matching, or it can be a block smaller than the smallest candidate block.

Figure 19A:
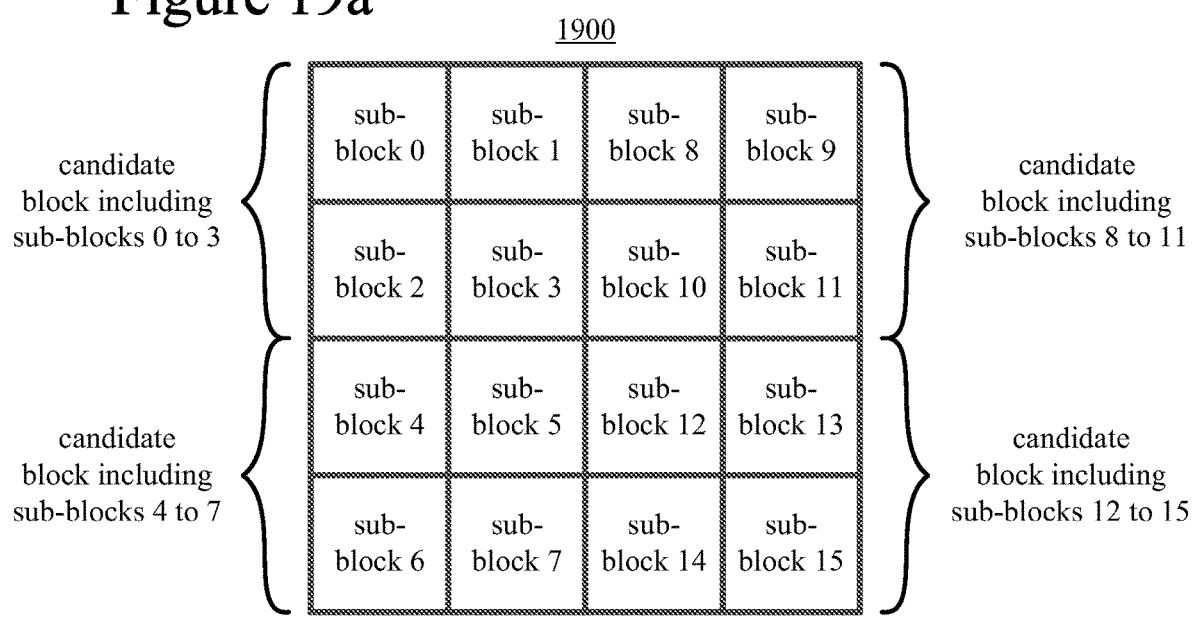
FIGS. 19a and 19b are diagrams illustrating hierarchical hashing during hash table construction.
Figure 19B:
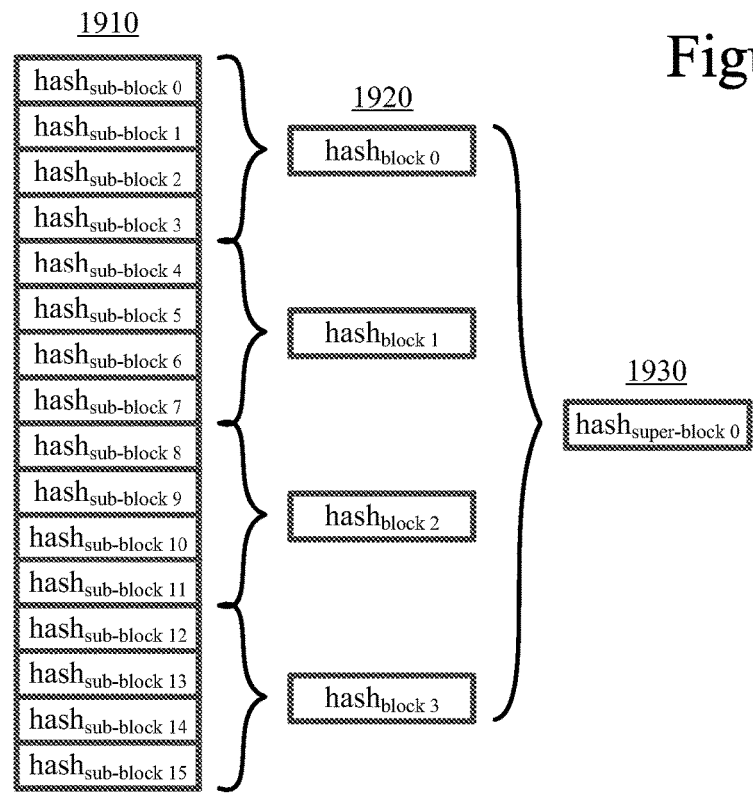

FIGS. 19*a* and 19*b* also illustrate hierarchical hashing during hash table construction. FIG. 19*a* shows sub-blocks (1900) of sample values for several candidate blocks of a frame. Block 0 includes sub-blocks 0 to 3. Block 1 includes sub-blocks 4 to 7, block 2 includes sub-blocks 8 to 11, and block 3 includes sub-blocks 12-15. A candidate super-block includes blocks 0 to 3. For example, the sizes of the sub-blocks, blocks and super-block are 4×4, 8×8 and 16×16, respectively. Or, the sizes are 8×8, 16×16 and 32×32, respectively, or 16×16, 32×32 and 64×64, respectively.

The encoder calculates a hash value for each of the sub-blocks-hash$_{sub\text{-}block\_0}$ for sub-block 0, hash$_{sub\text{-}block\_1}$ for sub-block 1, and so on. The hash value for a given sub-block can be computed from sample values of the sub-block (original sample values or reconstructed sample values, depending on implementation) or from intermediate hash values of rows or columns of the sub-block. The given sub-block can itself be a candidate block for hash-based block matching, or it can be a block smaller than the smallest candidate block. As shown in FIG. 19b, the encoder can group the hash values for sub-blocks as a one-dimensional array (1910), which includes an entry having a hash value for each of the sub-blocks, or otherwise store the hash values for sub-blocks in a hash table.

For the candidate block (block 0) that includes sub-blocks 0 to 3, the encoder computes a hash value hash$_{block\_0}$ by hashing the four hash values for sub-blocks 0 to 3. Similarly, the encoder computes hash values hash$_{block\_1}$, hash$_{block\_2}$ and hash$_{block\_3}$ for candidate blocks 1-3 from the hash values of their respective sub-blocks. The encoder can group the hash values for candidate blocks as a one-dimensional array (1920), which includes an entry having a hash value for each of the candidate blocks, or otherwise store the hash values for the candidate blocks in a hash table. In this way, the encoder can reuse the hash values for the sub-blocks, which can significantly reduce the computational complexity of hash table construction since the encoder need not compute hash values from the sample values of the candidate blocks.

Similarly, for the candidate super-block that includes blocks 0-3, the encoder computes a hash value hash$_{super\text{-}block\_0}$ by hashing the four hash values for blocks 0-3. The encoder can add the hash value for the candidate super-block to a one-dimensional array (1930) or hash table, for use in computing hash values for a larger candidate block.

Alternatively, the encoder can compute the hash value for a candidate super-block directly from the hash values of sub-blocks. For example, the encoder computes the hash value for a 32×32 block by hashing the hash values of sixteen 8×8 blocks of the 32×32 block. Or, as another example, the encoder computes the hash value for a 64×64 block by hashing the hash values of 64 8×8 blocks of the 64×64 block. More generally, the hash value for a candidate block can be computed by hashing the hash values of smaller blocks within the candidate block, where the smaller blocks have a width that is ½, ¼, ⅛ or some other fraction of the width of the candidate block and/or have a height that is ½, ¼, ⅛ or some other fraction of the height of the candidate block. The hash value for a square block can be computed from the hash values of sub-blocks that are square or rectangular. The hash value for a rectangular block can be computed from the hash values of sub-blocks that are square or rectangular.

Figure 20:
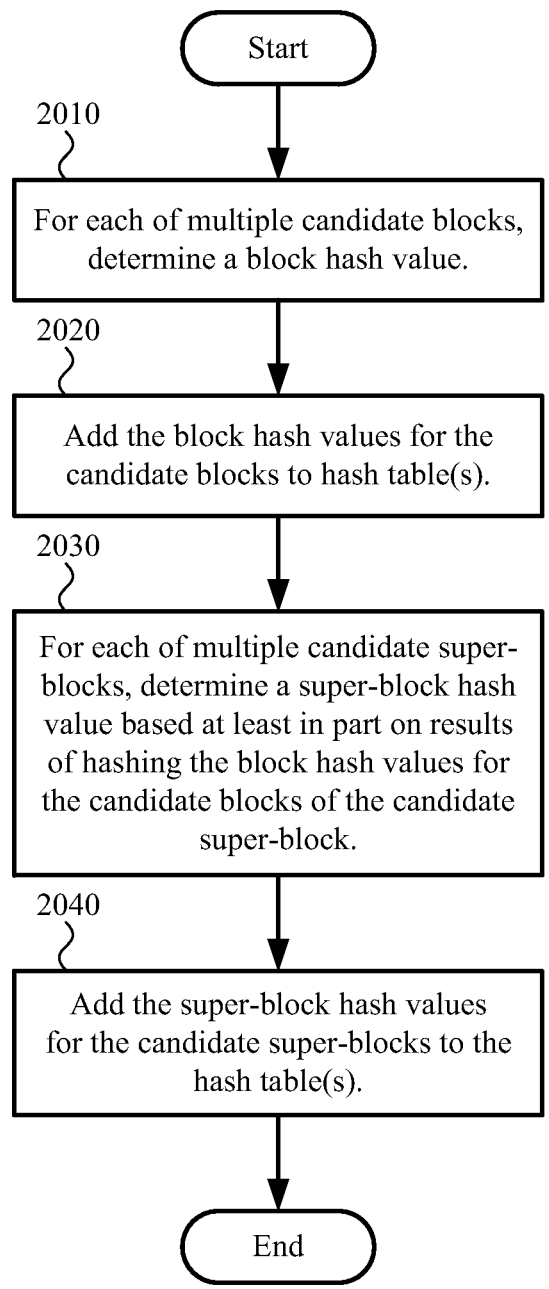
FIG. 20 is a flowchart illustrating a technique for hash table construction with hierarchical hashing.

FIG. 20 shows a technique (2000) for hash table construction with hierarchical hashing. An image encoder or video encoder such as one described with reference to FIG. 3, FIGS. 5a-5b or FIGS. 6a-6b can perform the technique (2000).

For each of multiple candidate blocks, the encoder determines (2010) a block hash value. For example, the encoder determines the block hash value based at least in part on results of hashing intermediate hash values for sections (e.g., rows, columns, sub-blocks) of the candidate block. In this case, for a given candidate block, the encoder can find the intermediate hash values for the respective sections of the candidate block, determine the block hash value from the intermediate hash values, and retain at least some of the intermediate hash values for reuse in computing block hash values for other candidate blocks. Or, the encoder determines the block hash value for the candidate block from the sample values of the candidate block. The encoder adds (2020) the block hash values for the multiple candidate blocks to one or more hash tables.

At least some of the multiple candidate blocks are organized as candidate super-blocks. For each of multiple candidate super-blocks, the encoder determines (2030) a super-block hash value based at least in part on results of hashing the block hash values for the blocks of the candidate super-block. The encoder adds (2040) the super-block hash values for the multiple candidate super-blocks to the hash table(s). For example, the hash table(s) include a first hash table that stores the block hash values for the multiple candidate blocks and a second hash table that stores the super-block hash values for the multiple candidate super-blocks. The two hash tables can be separate data structures or different sections of a single data structure. (See sections VII.C and VII.J for examples of a single, unified data structure that can be used as a hash table for different sizes of candidate blocks.)

Depending on implementation, the block hash values and super-block hash values can be computed using original sample values or reconstructed sample values.

The encoder can use one or more hash tables constructed as shown in FIG. 20 for hash-based block matching during BV estimation or motion estimation. For BV estimation or motion estimation, the hash value for the current block (or super-block) is determined using the same hashing approach as the hash values in the hash table(s).

For BV estimation, for example, a current picture includes the multiple candidate blocks and the multiple candidate super-blocks. The encoder determines a block hash value for a current block of the current picture, then searches the appropriate hash table to identify any of the multiple candidate blocks (of the current picture) having a block hash value that matches that of the current block. Or, the encoder determines a super-block hash value for a current super-block of the current picture, then searches the appropriate hash table to identify any of the multiple candidate super-blocks (of the current picture) having a super-block hash value that matches that of the current super-block.

Or, for motion estimation, a reference picture includes the multiple candidate blocks and the multiple candidate super-blocks. The encoder determines a block hash value for a current block of a current picture, then searches the appropriate hash table to identify any of the multiple candidate blocks (of the reference picture) having a block hash value that matches that of the current block. Or, the encoder determines a super-block hash value for a current super-block of a current picture, then searches the appropriate hash table to identify any of the multiple candidate super-blocks (of the reference picture) having a super-block hash value that matches that of the current super-block.

G. Screening Out Candidate Blocks During Hash Table Construction.

For a large picture, a hash table can include block hash values for millions of candidate blocks. If block hash values are included for multiple block sizes such as 4×4, 16×16, 32×32 and 64×64, the hash table(s) can include even more hash values. In many cases, the memory cost of such large hash tables is unacceptable. A secondary problem associated with large hash tables is that the list of candidate blocks with a hash value that matches the hash value for a current block may be very long. To identify a true matching block among the candidate blocks with the matching block hash value, the encoder may need to perform sample-wise block matching operations for many of the candidate blocks. This second stage of searching can be very time consuming.

To reduce the size of a hash table, the encoder can eliminate identical hash values, as described above (see section VII.C), but there may be a performance penalty in compression efficiency when this is done.

Another option for reducing the size of a hash table is to screen out candidate blocks with certain patterns. In particular, the encoder can screen out candidate blocks that have very simple patterns such as uniform sample values, rows of uniform sample values or columns of uniform sample values. In most cases, a block with such a pattern can be predicted efficiently using intra spatial prediction, without intra BC prediction. In addition to reducing the size of hash tables, this can greatly reduce the number of candidate blocks associated with any given block hash value, which helps avoid time-consuming secondary search operations among candidate blocks with a matching block hash value.

Figure 21A:
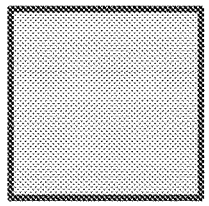
FIGS. 21a-21c are diagrams illustrating patterns of candidate blocks that an encoder screens out during hash table construction.
Figure 21B:
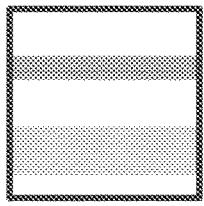
Figure 21C:
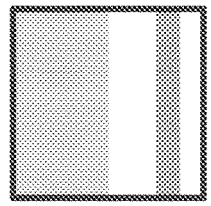

FIGS. 21a-21c show patterns of candidate blocks that an encoder can screen out during hash table construction before a block hash value for a candidate block is added to a hash table. FIG. 21a shows a block (2100) with uniform sample values. FIG. 21b shows a block (2110) whose rows each have uniform sample values, although the values can be different from row to row. FIG. 21c shows a block (2120) whose columns each have uniform sample values, although the values can be different from column to column. For example, to screen out these patterns of candidate blocks, an encoder can check if each row or each column of a candidate block has uniform sample values. If so, no block hash value is added to the hash table for the candidate block.

Figure 22:
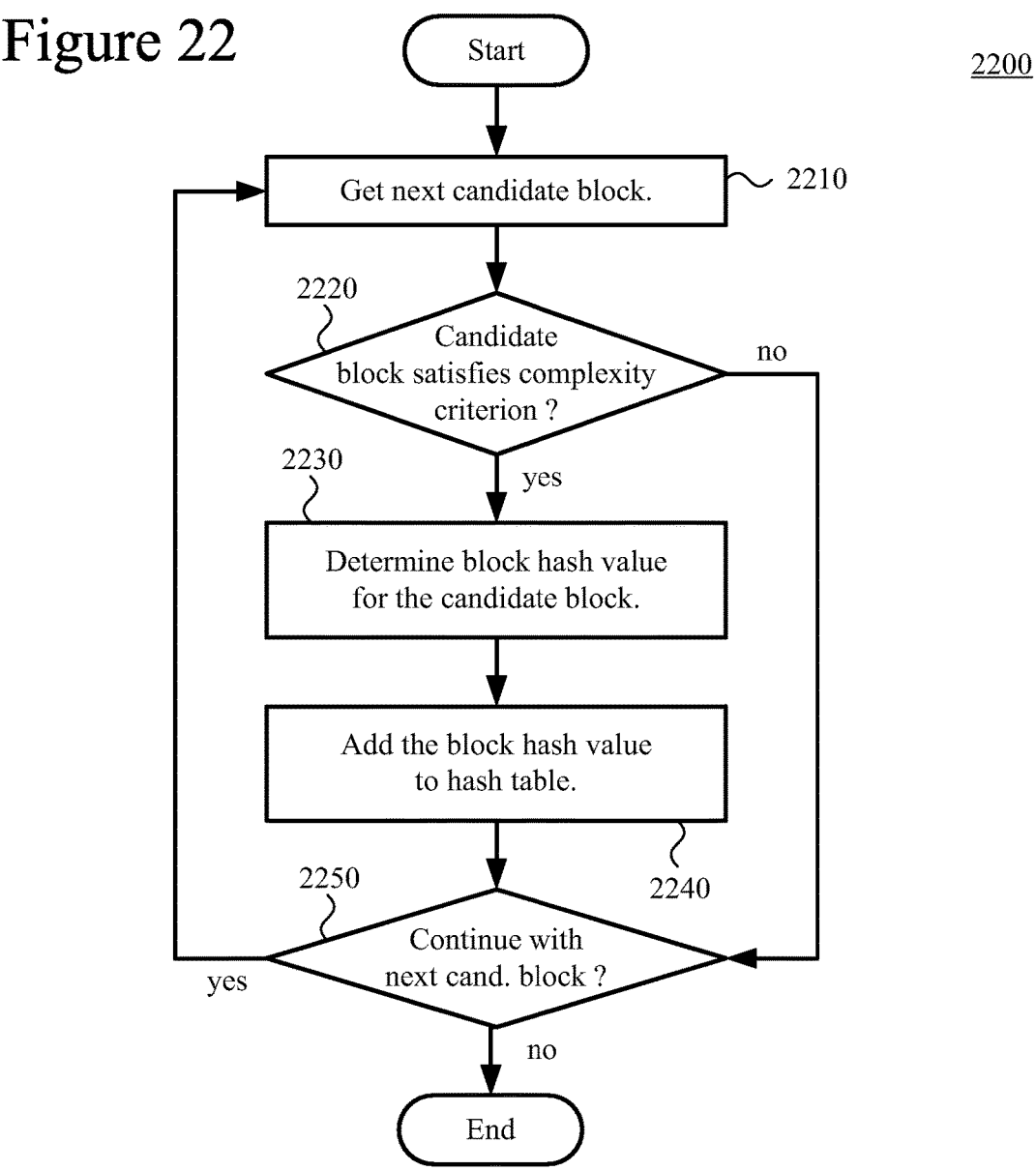
FIG. 22 is a flowchart illustrating a technique for screening out candidate blocks using a complexity criterion during hash table construction.

FIG. 22 shows a technique (2200) for screening out candidate blocks using a complexity criterion during hash table construction. An image encoder or video encoder such as one described with reference to FIG. 3, FIGS. 5a-5b or FIGS. 6a-6b can perform the technique (2200).

The encoder gets (2210) the next candidate block and evaluates (2220) whether the candidate block satisfies a complexity criterion. For example, in some example implementations, the complexity criterion is satisfied if (a) at least one row of the given candidate block has non-uniform sample values, and/or (b) at least one column of the given candidate block has non-uniform sample values. Or, more generally, the encoder can compute a complexity metric for the candidate block, then compare the complexity metric to a threshold. For example, the complexity metric is a count of non-zero AC coefficients at a non-zero horizontal position and/or a non-zero vertical position for the candidate block after a frequency transform (e.g., DCT), and the threshold is zero. The complexity criterion is satisfied if there are any non-zero AC coefficients outside the top row of AC coefficients and left column of AC coefficients for the candidate block. Alternatively, the encoder considers another complexity metric. The complexity criterion can be evaluated, at least in part, by comparing hash values of sections (e.g., rows, columns, sub-blocks) of the candidate block.

If the candidate block satisfies the complexity criterion, the encoder determines (2230) a block hash value for the candidate block and adds (2240) the block hash value to a hash table. The block hash value can be determined using any hashing approach, including approaches in which intermediate hash values are computed and retained (see section VII.E) and/or approaches that use hierarchical hashing (see section VII.F). The hash table can be a data structure organized as described above (see section VII.C) or other data structure. Otherwise (if the candidate block does not satisfy the complexity criterion), no block hash value for the candidate block is added to the hash table.

The encoder determines (2250) whether to continue with the next candidate block. If so, the encoder continues by getting (2210) the next candidate block and evaluating (2220) whether the next candidate block satisfies the complexity criterion. In this way, the encoder can selectively determine block hash values for multiple candidate blocks, depending on whether the respective candidate blocks satisfy the complexity criterion.

Depending on implementation, the block hash values in the hash table can be computed using original sample values or reconstructed sample values. An encoder can use a hash table constructed as shown in FIG. 22 for hash-based block matching during BV estimation or motion estimation, as described above (see, e.g., sections VII.E and VII.F).

H. Availability Checking During Hash-Based Block Matching.

When an encoder uses hash-based block matching during BV estimation, a hash table may include block hash values for candidate blocks throughout a current picture, which are computed from the original sample values of the current picture. In this case, the block hash value for a current block of the current picture may match the block hash value for a candidate block in a later section of the current picture. The reference region for the current block must be part of the previously encoded and reconstructed section of the current picture, however, in order for the reference region to be available during decoding. Thus, the encoder checks block availability during hash-based block matching. When a candidate block has a block hash value that matches the block hash value for the current block, the encoder checks whether that candidate block is available for use as a reference region for the current block.

FIG. 23 illustrates conditions for a candidate block to be a reference region during BV estimation, in example implementations. In FIG. 23, the current picture (2310) includes four tiles—tiles 0 to 3—which are separated at the dotted lines. The current picture (2310) is partitioned into multiple slices, including slices 0 to 3, at the dashed lines in FIG. 23. A slice may include some of the blocks of one tile or include the blocks of an integer number of tiles. Thus, one tile can include multiple slices (e.g., tile 0 includes slices 0 and 1), or a slice and tile can be coextensive (e.g., tile 1 and slice 2), or a slice can include multiple tiles (e.g., slice 3 includes tiles 2 and 3). Blocks before the current block (2330), at least within the same tile and same slice, are part of previously encoded and reconstructed content (2312), which is separated from the rest of the picture (2310) by a solid line in FIG. 23. For intra BC prediction, a reference region is part of the reconstructed content (2312). (In some implementations, the reference region can also partially overlap the current block (2330).) During hash-based block matching for BV estimation, when a candidate block has a block hash value that matches the block hash value for the current block (2330), the encoder checks that the candidate block and the current block (2330) are part of the same slice and part of the same tile. For example, for the current block (2330) shown in FIG. 23, the encoder checks that the candidate block is part of slice 1 and tile 0. The encoder also checks that the candidate block includes only sample values in blocks that precede the current block in coding order (also called decoding order). For example, for the current block (2330) shown in FIG. 23, the encoder checks that the candidate block includes only sample values within the reconstructed content (2312).

In example implementations for H.265/HEVC encoding, the encoder can check availability as follows for a candidate block and current block. The x and y position of the top-left corner of the current block are $xposition_{current\_block}$, $yposition_{current\_block}$, respectively, which indicate offsets relative to the top-left corner of the current picture. The width and height of the current block (and candidate block in hash-based block matching) are $width_{block}$ and $height_{block}$ respectively. The top-left corner of the candidate block in the current picture is $xposition_{candidate\_block}$, $yposition_{candidate\_block}$. The CTU size is $size_{CTU}$. The candidate block is available for use as a reference region if the following two conditions are both satisfied.

First condition. The current block and the candidate block are part of the same slice and part of the same tile. More formally, this condition has two parts (a) and (b), both of which must be satisfied. Part (a)—the top-left corner ($xposition_{current\_block}$, $yposition_{current\_block}$) of the current block and top-left corner ($xposition_{candidate\_block}$, $yposition_{candidate\_block}$) of the candidate block are part of the same slice and part of the same tile. Part (b)—the top-left corner ($xposition_{current\_block}$, $yposition_{current\_block}$) of the current block and bottom-right corner ($xposition_{candidate\_block}$+$width_{block}$−1, $yposition_{candidate\_block}$+$height_{block}$−1) of the candidate block are part of the same slice and part of the same tile.

Second condition. The candidate block includes only sample values in blocks that precede the current block in coding order. More formally, this condition has three parts (c), (d) and (e), one of which must be satisfied. That is, the second condition is satisfied if (c) or (d) or (e) is satisfied. The conditions depend on CTU alignment for the current block and candidate block.

Part (c)—the vertical CTU position for a bottom position of the candidate block is above the vertical CTU position for a top position of the current block. For example, ($yposition_{candidate\_block}$+$height_{block}$−1)/$size_{CTU}$<$yposition_{current\_block}$/$size_{CTU}$.

Part (d)—the vertical CTU position for the bottom position of the candidate block equals the vertical CTU position for the top position of the current block, and the horizontal CTU position for a right position of the candidate block is left of the horizontal CTU position for a left position of the current block. For example, ($yposition_{candidate\_block}$+$height_{block}$−1)/$size_{CTU}$=$yposition_{current\_block}$/$size_{CTU}$ AND ($xposition_{candidate\_block}$+$width_{block}$−1)/$size_{CTU}$<$xposition_{current\_block}$/$size_{CTU}$.

Part (e)—the vertical CTU position for the bottom position of the candidate block equals the vertical CTU position for the top position of the current block, and the horizontal CTU position for the right position of the candidate block equals the horizontal CTU position for the left position of the current block, and the z-scan order for the bottom-right corner position of the candidate block is lower than the z-scan order for the top-left corner position of the candidate block. For example, when ($yposition_{candidate\_block}$+$height_{block}$−1)/$size_{CTU}$ $yposition_{current\_block}$/$size_{CTU}$ AND ($xposition_{candidate\_block}$+$width_{block}$/$size_{CTU}$=$xposition_{current\_block}$/$size_{CTU}$, then the z-scan order of the position ($xposition_{candidate\_block}$+$width_{block}$−1, $yposition_{candidate\_block}$+$height_{block}$−1) is smaller than the z-scan order of the position ($xposition_{current\_block}$, $yposition_{current\_block}$).

In general, the z-scan order follows a sequentially specified ordering of blocks that partition a picture. FIG. 24 shows example z-scan order (2400) for a current block (2430) and blocks that might include the bottom-right position of a candidate block. The z-scan orders are generally assigned to blocks sequentially from left-to-right in a row, repeating in successive rows from top-to-bottom. When a block is split, z-scan orders are assigned within the split block, recursively. For implementations of encoding/decoding for the HEVC standard, the z-scan order proceeds CTB-to-CTB by a CTB raster scan (left-to-right in a CTB row, repeating in successive CTB rows from top-to-bottom). If a CTB is split, the z-scan order follows a raster scan pattern for CBs of a quadtree within the split CTB. And, if a CB is split (e.g., into multiple CBs, or into multiple PBs), the z-scan order follows a raster scan pattern for blocks within the split CB.

Figure 25:
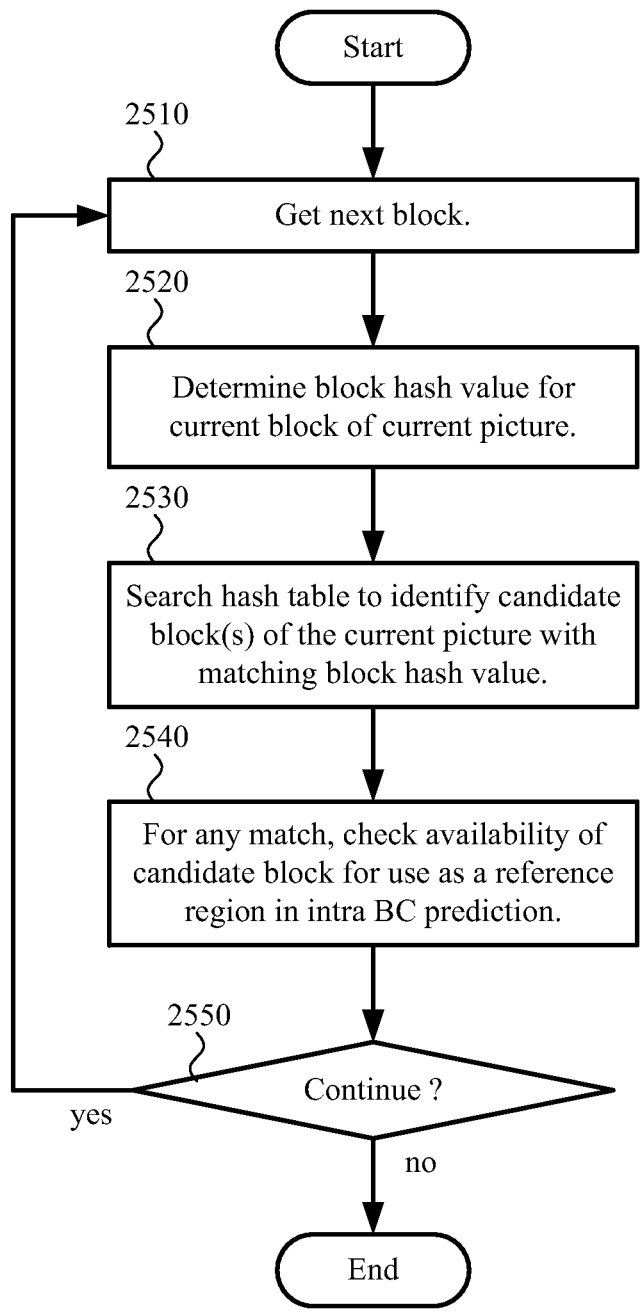
FIG. 25 is a flowchart illustrating a technique for block availability checking during BV estimation.

FIG. 25 shows a technique (2500) for block availability checking during BV estimation. An image encoder or video encoder such as one described with reference to FIG. 3, FIGS. 5a-5b or FIGS. 6a-6b can perform the technique (2500).

The encoder gets (2510) the next block (current block) of a current picture and determines (2520) a block hash value for the current block. The block hash value can be determined using any hashing approach. In general, the block hash value for the current block is determined using the same hashing approach as the block hash values in the hash table used for hash-based block matching. The block hash values for the current block and in the hash table are determined using original sample values.

The encoder searches (2530) a hash table to identify any candidate blocks of the current picture having a block hash value that matches that of the current block. For any given candidate block (among the candidate blocks) with a block hash value that matches the block hash value for the current block, the encoder checks (2540) availability of the given candidate block for use as a reference region for the current block in intra BC prediction. For example, the encoder can check that the given candidate block includes only sample values in blocks that precede the current block in coding order. The encoder can also check that the given candidate block and current block are part of the same set of blocks (e.g., part of the same slice and part of the same tile, part of the same CTU, or part of a particular set of CTUs such as the current CTU and CTU to its left).

The encoder determines (2550) whether to continue with the next block. If so, the encoder continues by getting (2510) the next block and determining (2220) a block hash value for the next block. In this way, the encoder can perform hash-based block matching during BV estimation for multiple blocks of the current picture, with fast operations to check availability of candidate blocks as reference regions for intra BC prediction.

I. Representing Blocks with Hash Values.

In some example implementations, instead of sending a BV value for the matching block for a current block, an encoder signals the hash value of the matching block that represents the current block. A decoder, using the signaled hash value, reconstructs the current block using its own data structure that organizes candidate blocks according to hash value. In this approach, the decoder creates and updates the data structure that organizes the candidate blocks, for example, using one of the approaches described with reference to FIG. 18, 20 or 22. Using the signaled hash value for the current block, the decoder finds the appropriate block in the data structure, then uses that block for the current block. In some cases, signaling hash values consumes fewer bits than signaling BV values.

In this approach, the encoder and decoder determine the hash values for the candidate blocks using reconstructed sample values, so the hash values are the same at the encoder and decoder. The organization of the data structure depends on implementation. The encoder can signal multiple hash values per current block, to iteratively filter out non-matching blocks. Or, the encoder can signal a single hash value per current block. Or, in addition to one or more hash values, the encoder can signal an index value that indicates a matching block among multiple remaining candidate blocks.

J. Example Hash Functions.

The hash function used for hash-based block matching (and/or hash-based block reconstruction; see section VII.I) depends on implementation.

A hash function can produce hash values with 8 bits, 12 bits, 16 bits, 24 bits, 32 bits, or some other number of bits. If a hash value has fewer bits, the data structure includes fewer categories, but each category may include more candidate blocks. On the other hand, using hash values with more bits tends to increase the size of the data structure that organizes candidate blocks. If a hash value has more bits, the data structure includes more categories, but each category may include fewer candidate blocks.

In some example implementations, the hash function used in hash-based block matching (and/or hash-based block reconstruction) is a cyclic redundancy check ("CRC") function or part of a CRC. CRC functions are fast and widely implemented, since they are commonly used for error checking purposes. A CRC function tends to produce very different hash values when applied to similar input values. That is, changing the sample values of a block slightly can lead to different CRC hash values. A CRC function can produce hash values with 8 bits, 12 bits, 16 bits, 24 bits, 32 bits, or some other number of bits.

When used for hash-based block matching, CRC functions work well to find a matching block that is exactly identical to a current block. A CRC function typically does not help find a matching block that only approximates a current block, however.

In other example implementations, the hash function used in hash-based block matching (or hash-based block reconstruction) is a cryptographic hash function or part thereof. For example, the hash value can be a MD5 value, SHA value, part of a MD5 value or part of a SHA value.

In other example implementations, the hash function used in hash-based block matching (or hash-based block reconstruction) uses averaging and XOR operations to determine the signature of a candidate block or current block. A hash value includes a component based on average of the block and one or more components based on directional XOR operations.

For example, for an 8×8 block B[i,j] with 8-bit sample values, the hash value is a 24-bit value with three 8-bit components. The first 8-bit component is the average $\mu$ of the sample values in the block.

$$\mu = \frac{\sum_{0 \leq i < 8, 0 \leq j < 8} B[i, j]}{64}.$$

For the second and third 8-bit components, a level map L[i,j] of sample values is derived using the average value $\mu$ for the block.

$$L[i, j] = \begin{cases} 1, & \text{when } B[i, j] > \mu \\ 0, & \text{otherwise} \end{cases},$$

$0 \leq i < 8$, and $0 \leq j < 8$.

The second 8-bit component r is based on XOR operations along rows of the level map L[i,j]. For each row $0 \leq j < 8$ of the level map L[i,j], a bit r[j] of the second component is determined.

$r[j]=L[0,j] \oplus L[1,j] \oplus L[2,j] \oplus L[3,j] \oplus L[4,j] \oplus L[5,j] \oplus L[6,j] \oplus L[7,j],$ where $\oplus$ represents an XOR operation.

The third 8-bit component c is based on XOR operations along columns of the level map L[i,j]. For each column $0 \leq i < 8$ of the level map L[i,j], a bit c[i] of the third component is determined.

$c[i]=L[i,0] \oplus L[i,1] \oplus L[i,2] \oplus L[i,3] \oplus L[i,4] \oplus L[i,5] \oplus L[i,6] \oplus L[i,7].$ Thus, for the second component r, the $j^{th}$ bit is the XOR of the $j^{th}$ row's level map. And, for the third component c, the $i^{th}$ bit is the XOR of the $i^{th}$ column's level map. The 24-bit hash value is $(\mu<<16)+(r<<8)+c$, where << represents a left shift operation.

For this hash function, the second and third components (based on XOR operations) are sensitive to small variations in sample values. When used for hash-based block matching, hash functions based on averaging and XOR operations work well to find a matching block that is exactly identical to a current block, however.

Instead of 8×8 blocks, a hash function that uses averaging and XOR operations can be used for a different size of block, e.g., computing XOR operations along pairs of rows or pairs of columns for a 16×16 block to determine an 8-bit component r or c, computing XOR operations along groups of four rows or four columns for a 32×32 block to determine an 8-bit component r or c, and so on. Alternatively, a hash function that uses averaging and XOR operations can produce hash values with a different number of bits.

In other example implementations, the hash function used in hash-based block matching (or hash-based block reconstruction) is a locality-sensitive hash function. A locality-sensitive hash function tends to produce the same hash value when applied to similar input values. That is, changing the sample values of a block slightly typically does not lead to different hash values. A locality-sensitive hash function can produce hash values with 8 bits, 12 bits, 16 bits, 24 bits, 32 bits, or some other number of bits.

For example, for an 8×8 block B, a 64-dimension vector $\vec{b}$ is generated from the 64 sample values of the block B. Another 64-dimension vector $\vec{v}$ is randomly generated. The hash function depends on the product $\vec{b} \cdot \vec{v}$. For example, the hash function can be $$h(\vec{b}) = \left\lfloor \frac{\vec{v} \cdot \vec{b} + d}{d_{range}} \right\rfloor,$$

where d is a real number chosen from the range $0 \ldots d_{range}$. If two blocks are similar, then their vectors $\vec{b}_1$ and $\vec{b}_2$ are similar, and their hash values $h(\vec{b}_1)$ and $h(\vec{b}_2)$ should also be the same or similar.

In some example implementations, the hash function used in hash-based block matching (or hash-based block reconstruction) includes block width and block height as input. For example, the hash function can be a modified CRC function, modified cryptographic hash function, modified hash function that uses averaging and XOR operations, or modified locality-sensitive hash function, for which the hash value depends in part on block height and block width as inputs. With this variation of hash function, candidate blocks of different sizes (such as 64×64, 32×32, 16×16 and 8×8) can be organized within a single data structure. A modified hash function can produce an n-bit hash value, of which m bits indicate a hash value according to an underlying m-bit hash function. The remaining n-m bits of the n-bit hash value indicate a block size. For example, suppose a modified hash function produces a 14-bit hash value, where the first two bits indicate a block size among four options, and the remaining 12 bits indicate a hash value among blocks of that size. A block is hashed, yielding a 12-bit hash value in the range 0 . . . 4095. If the block size is 4×4, 0<<12 is added to the 12-bit hash value. If the block size is 8×8, 1<<12 is added to the 12-bit hash value. If the block size is 16×16, 2<<12 is added to the 12-bit hash value. And, if the block size is 32×32, 3<<12 is added to the 12-bit hash value. This yields a 14-bit hash value in the range 0 . . . 16383, where hash values in the range 0 . . . 4095 are for 4×4 blocks, hash values in the range 4096 . . . 8191 are for 8×8 blocks, hash values in the range of 8192 . . . 12287 are for 16×16 blocks, and hash values in the range of 12288 . . . 16383 are for 32×32 blocks. If more block sizes are possible, 3, 4 or more bits can be assigned to indicate the block size of a block. Alternatively, the n-m bits that indicate the block size can be the least significant bits of the n-bit hash value, with the m-bit value being left shifted by n-m bits before adding the n-m bits for block size.

Alternatively, a hash function works for different sizes of blocks, but the hash function produces an m-bit hash value regardless of the size of the block. Candidate blocks of different block sizes can still be organized within a single data structure, but an entry for a candidate block includes information indicating the block size for that block. The block size information may be used during hash-based block matching to check the block size of a candidate block, compared to the block size of the current block.

Alternatively, another hash function is used for hash-based block matching.

K. Intra BC Prediction Mode—Implementation Options.

A block with prediction mode of intra BC prediction can be a CB, PB or other block. When the block is a CB, the BV value for the block can be signaled at CU level (and other CBs in the CU use the same BV value or a scaled version thereof). Or, when the block is a PB, the BV value for the block can be signaled at PU level (and other PBs in the PU use the same BV value or a scaled version thereof). More generally, the BV value for an intra-BC prediction block is signaled at an appropriate syntax level for the block.

The block copying operations of prediction according to the intra BC prediction mode can be performed at the level of CB (when a BV value is signaled per CB) or PB (when a BV value is signaled per PB). For example, suppose a 16×16 CB has a single 16×16 PB. The BV value (for the PB) is applied to block copy a 16×16 region. Alternatively, the block copying operations can be performed at the level of TBs within a PB or CB, even when the BV value is signaled for the PB or CB. In this way, a BV value, as applied for a TB, can reference positions of other TBs in the same PB or CB.

In some implementations, for an intra BC predicted CU, intra BC prediction for a chroma block in a PU uses the same BV value as intra BC prediction for the luma block in the PU, possibly after scaling and rounding when the chroma data has reduced resolution relative to the luma data (e.g. when the format is YUV 4:2:0 format). Alternatively, different BV values can be signaled for the luma block and chroma blocks of a PU.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing device that implements a video encoder, a method comprising:
reconstructing sample values available for use in encoding at least part of a current picture, wherein a given candidate block among multiple candidate blocks in the current picture or a reference picture partially overlaps one or more other candidate blocks among the multiple candidate blocks; and
updating a hash table for a hash-based block matching, wherein the updating the hash table includes, for the given candidate block:
evaluating whether the given candidate block satisfies a complexity criterion, including:
computing a complexity metric for the given candidate block; and
comparing the complexity metric to a threshold; and
selectively screening out the given candidate block, including:
if the given candidate block satisfies the complexity criterion, determining a block hash value for the given candidate block and adding the block hash value to the hash table; and
otherwise, the given candidate block failing the complexity criterion, omitting the block hash value for the given candidate block from the hash table.

2. The method of claim 1 wherein the complexity criterion is satisfied if:
at least one row of the given candidate block has non-uniform sample values; and/or
at least one column of the given candidate block has non-uniform sample values.

3. The method of claim 1 wherein the complexity metric is count of non-zero AC coefficients at a non-zero horizontal position and/or a non-zero vertical position, and wherein the threshold is zero.

4. The method of claim 1 wherein the determining the block hash value includes:
for each of multiple sections of the given candidate block, finding an intermediate hash value;
computing the block hash value for the given candidate block based at least in part on results of hashing the intermediate hash values; and
retaining at least some of the intermediate hash values for reuse in computing other block hash values for the one or more other candidate blocks among the multiple candidate blocks.

5. The method of claim 1 wherein at least some of the multiple candidate blocks are organized as candidate super-blocks, the method further comprising:
for one of multiple candidate super-blocks, determining a super-block hash value based at least in part on results of hashing the block hash values for candidate blocks of the candidate super-block.

6. The method of claim 1 wherein block hash values in the hash table are computed using original sample values.

7. The method of claim 1 wherein block hash values in the hash table are computed using the reconstructed sample values.

8. The method of claim 1 wherein the reconstructed sample values are part of the current picture, the method further comprising, as part of the hash-based block matching:

determining a block hash value for a current block of the current picture; and searching the hash table to identify any of the multiple candidate blocks having a block hash value that matches the block hash value for the current block.

9. The method of claim 1 wherein the reconstructed sample values are part of the reference picture, which is different than the current picture, the method further comprising, as part of the hash-based block matching:

determining a block hash value for a current block of the current picture; and searching the hash table to identify any of the multiple candidate blocks having a block hash value that matches the block hash value for the current block.

10. A computing device comprising:

one or more buffers configured to store a current picture; and a video encoder configured to perform operations comprising:

determining a block hash value for a current block of the current picture;

searching a hash table to identify any of multiple candidate blocks of the current picture having a block hash value that matches the block hash value for the current block; and for any given candidate block among the multiple candidate blocks having a block hash value that matches the block hash value for the current block, checking availability of the given candidate block for use as a reference region for the current block in an intra block copy prediction that uses a block vector value to indicate a displacement from the current block to the reference region within the current picture, the reference region including previously reconstructed sample values of the current picture, including:

checking that the given candidate block and the current block are part of a same slice and part of a same tile; and checking that the given candidate block includes only sample values in blocks that precede the current block in a coding order.

11. The computing device of claim 10 wherein the checking that the given candidate block includes only sample values in blocks that precede the current block in the coding order includes checking that one of following conditions is satisfied:

(a) a vertical coding tree unit ("CTU") position for a bottom position of the given candidate block is above the vertical CTU position for a top position of the current block;

(b) the vertical CTU position for the bottom position of the given candidate block equals the vertical CTU position for the top position of the current block, but a horizontal CTU position for a right position of the given candidate block is left of the horizontal CTU position for a left position of the current block; and (c) the vertical CTU position for the bottom position of the given candidate block equals the vertical CTU position for the top position of the current block, and the horizontal CTU position for the right position of the given candidate block equals the horizontal CTU position for the left position of the current block, but a z-scan order for a bottom-right corner position of the given candidate block is lower than the z-scan order for a top-left corner position of the current block.

12. The computing device of claim 10 wherein the checking that the given candidate block and the current block are part of the same slice and part of the same tile includes:

checking that a top-left corner position of the given candidate block and a top-left corner position of the current block are part of the same slice and part of the same tile; and checking that a bottom-right corner position of the given candidate block and the top-left corner position of the current block are part of the same slice and part of the same tile.

13. The computing device of claim 10 wherein the block hash value for the current block is determined using a same hashing approach as the block hash values in the hash table, and wherein block hash values in the hash table are determined using original sample values.

14. One or more non-volatile memory or storage devices storing computer-executable instructions for causing a computing device, when programmed thereby, to perform operations comprising:

determining a block hash value for a current block of a current picture;

searching a hash table to identify any of multiple candidate blocks of the current picture having a block hash value that matches the block hash value for the current block; and for any given candidate block among the multiple candidate blocks having a block hash value that matches the block hash value for the current block, checking availability of the given candidate block for use as a reference region for the current block in an intra block copy prediction that uses a block vector value to indicate a displacement from the current block to the reference region within the current picture, the reference region including previously reconstructed sample values of the current picture, including:

checking that the given candidate block and the current block are part of a same slice and part of a same tile; and checking that the given candidate block includes only sample values in blocks that precede the current block in a coding order.

15. The one or more non-volatile memory or storage devices of claim 14 wherein the checking that the given candidate block includes only sample values in blocks that precede the current block in the coding order includes checking that one of following conditions is satisfied:

(a) a vertical coding tree unit ("CTU") position for a bottom position of the given candidate block is above the vertical CTU position for a top position of the current block;

(b) the vertical CTU position for the bottom position of the given candidate block equals the vertical CTU position for the top position of the current block, but a horizontal CTU position for a right position of the given candidate block is left of the horizontal CTU position for a left position of the current block; and (c) the vertical CTU position for the bottom position of the given candidate block equals the vertical CTU position for the top position of the current block, and the horizontal CTU position for the right position of the given candidate block equals the horizontal CTU position for the left position of the current block, but a z-scan order for a bottom-right corner position of the given candidate block is lower than the z-scan order for a top-left corner position of the current block.

16. The one or more non-volatile memory or storage devices of claim 14 wherein the checking that the given candidate block and the current block are part of the same slice and part of the same tile includes:

checking that a top-left corner position of the given candidate block and a top-left corner position of the current block are part of the same slice and part of the same tile; and checking that a bottom-right corner position of the given candidate block and the top-left corner position of the current block are part of the same slice and part of the same tile.

17. The one or more non-volatile memory or storage devices of claim 14 wherein the block hash value for the current block is determined using a same hashing approach as block hash values in the hash table.

18. The one or more non-volatile memory or storage devices of claim 14 wherein block hash values in the hash table are determined using original sample values.

19. The one or more non-volatile memory or storage devices of claim 14 wherein the hash table further includes block hash values for multiple candidate blocks of a reference picture different than the current picture.

20. The computing device of claim 10 wherein the hash table further includes block hash values for multiple candidate blocks of a reference picture different than the current picture.

\* \* \* \* \*